(12) United States Patent
Yoshida et al.

(10) Patent No.: US 9,206,278 B2
(45) Date of Patent: Dec. 8, 2015

(54) CYCLIC OLEFIN COPOLYMER AND CROSSLINKED POLYMER THEREOF

(75) Inventors: Yasunori Yoshida, Ichihara (JP); Takashi Unezaki, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 19 days.

(21) Appl. No.: 13/823,156

(22) PCT Filed: Oct. 4, 2011

(86) PCT No.: PCT/JP2011/005608
§ 371 (c)(1),
(2), (4) Date: Mar. 14, 2013

(87) PCT Pub. No.: WO2012/046443
PCT Pub. Date: Apr. 12, 2012

(65) Prior Publication Data
US 2013/0178575 A1 Jul. 11, 2013

(30) Foreign Application Priority Data
Oct. 6, 2010 (JP) .................................. 2010-226926

(51) Int. Cl.
*C08F 236/20* (2006.01)
*C08F 210/18* (2006.01)

(52) U.S. Cl.
CPC ............. *C08F 236/20* (2013.01); *C08F 210/18* (2013.01); *C08F 2810/20* (2013.01)

(58) Field of Classification Search
None
See application file for complete search history.

(56) References Cited

U.S. PATENT DOCUMENTS 5,756,623 A 5/1998 Kreuder et al.

FOREIGN PATENT DOCUMENTS

| CN | 1108264 A | 9/1995 |
|----|-----------|--------|
| JP | 62-34924 A | 2/1987 |
| JP | 06-228237 A | 8/1994 |
| JP | 07-224122 A | 8/1995 |
| JP | 08-059744 A | 3/1996 |
| JP | 11-343310 A | 12/1999 |
| JP | 2005-047991 A | 2/2005 |
| JP | 2006-313660 A | 11/2006 |
| JP | 2010-100843 A | 5/2010 |
| WO | WO 2006/067950 A1 | 6/2006 |
| WO | WO 2006/118261 A1 | 11/2006 |
| WO | WO 2006/121086 A1 | 11/2006 |

OTHER PUBLICATIONS

Machine translation of Matsui et al. (WO 2006/118261). (Original document provided by Applicant.).*

Office Action issued in corresponding Chinese Application No. 201180048475.2 on Sep. 15, 2014 (6 pages).
*International Search Report (PCT/ISA/210) issued on Dec. 27, 2011, by the Japanese Patent Office as the International Searching Authority for International Application No. PCT/JP2011/005608.

* cited by examiner

Primary Examiner — Ling Choi
Assistant Examiner — Catherine S Branch
(74) Attorney, Agent, or Firm — Buchanan, Ingersoll & Rooney PC

(57) ABSTRACT

The cyclic olefin copolymer of the present invention contains (A) a repeating unit derived from one or more kinds of olefins represented by the following General Formula (I), (B) a repeating unit derived from a cyclic non-conjugated diene represented by the following General Formula (III), and (C) a repeating unit derived from one or more kinds of cyclic olefins represented by the following General Formula (V), wherein when a total mole number of the repeating units is regarded as 100 mol %, the (B) repeating unit derived from a cyclic non-conjugated diene is contained in an amount of 19 mol % to 36 mol %.

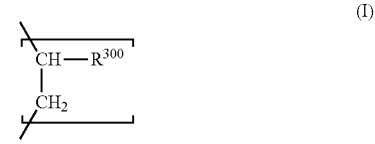

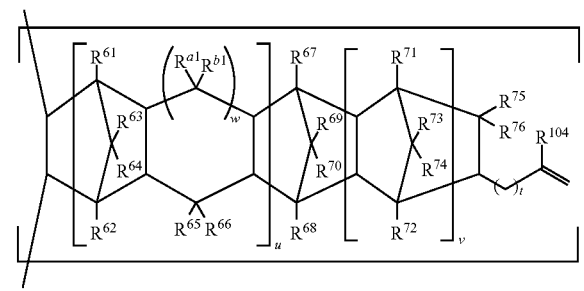

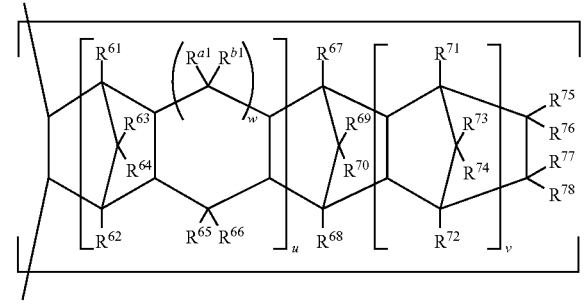

16 Claims, No Drawings

CYCLIC OLEFIN COPOLYMER AND CROSSLINKED POLYMER THEREOF

TECHNICAL FIELD

The present invention relates to a cyclic olefin copolymer having a crosslinkable group and to a crosslinked cyclic olefin copolymer thereof.

BACKGROUND ART

A cyclic olefin copolymer has excellent thermal resistance, mechanical characteristics, transparency, dielectric characteristics, solvent resistance, moldability, dimensional stability, and the like, and is used in various fields. However, depending on use, sometimes a higher degree of thermal resistance, solvent resistance, or mechanical strength is required. An attempt at further improving thermal resistance, solvent resistance, and mechanical strength by crosslinking the cyclic olefin copolymer by various methods such as crosslinking using sulfur, crosslinking using an organic peroxide, crosslinking using electron beams, and crosslinking using radiation has been made (Patent Documents 1 and 2).

However, recently, in the field of molding materials represented by electronic parts, a higher degree of thermal resistance has been required. In order to satisfy the requirement, a method of adding a large amount of inorganic substances (Patent Document 3), or a method of performing addition polymerization using only cyclic olefin monomers (Patent Document 4) has been proposed. However, generally, inorganic fillers have a problem that they greatly decrease toughness, dielectric characteristics, and transparency of organic materials. In addition, since a polymer obtained by performing addition polymerization by using only cyclic olefins has a glass transition temperature (Tg) that is excessively high, it is practically impossible to mold the polymer by melt processing, and molding the polymer into an arbitrary shape is industrially difficult. Moreover, when the polymer is used as a substrate for a liquid crystal display or a solar cell, vapor barrier properties or processability thereof needs to be improved.

Patent Document 5 discloses an α-olefin.cyclic olefin..polyene copolymer. However, it does not disclose a crosslinked polymer in detail, and still leaves scope for improvement in respect of improving thermal resistance, vapor barrier properties, and processability while maintaining excellent dielectric characteristics, transparency, and moldability.

Patent Document 6 discloses an α-olefin.non-conjugated cyclic polyene copolymer and a crosslinked polymer thereof, but the content of a constituent unit derived from the non-conjugated cyclic polyene is as small as 0.01% by weight to 20% by weight. Patent Document 7 discloses a crosslinked polymer of a curable resin that contains C2-20 α-olefin and a cyclic olefin having two or more C=C double bonds as constituent units, but does not discloses the content of the cyclic olefin having two or more C=C double bonds. Moreover, although the present inventors tried to polymerize the curable resin according to the method described in Patent Document 7, the thermosetting resin could not be obtained. Therefore, regarding the above, the crosslinked polymer disclosed in Patent Documents 6 and 7 still leaves scope for improvement.

In addition, Patent Document 8 discloses a cyclic olefin copolymer having a crosslinkable group that contains a repeating unit derived from olefin and a repeating unit derived from a cyclic non-conjugated diene in a predetermined molar ratio and a crosslinked polymer thereof. However, dielectric characteristics of the crosslinked polymer obtained from the cyclic olefin copolymer disclosed in Patent Document 8 sometimes deteriorate over time.

RELATED DOCUMENT

Patent Document

[Patent Document 1] Japanese Unexamined Patent Publication No. 62-34924
[Patent Document 2] Japanese Unexamined Patent Publication No. 2006-313660
[Patent Document 3] Japanese Unexamined Patent Publication No. 2005-47991
[Patent Document 4] Pamphlet of International Publication WO2006/067950
[Patent Document 5] Pamphlet of International Publication
[Patent Document 6] Pamphlet of International Publication WO2006/121086
[Patent Document 7] Japanese Unexamined Patent Publication No. 11-343310
[Patent Document 8] Japanese Unexamined Patent Publication No. 2010-100843

DISCLOSURE OF THE INVENTION

An object of the present invention is to provide a cyclic olefin copolymer that has a crosslinkable group and can produce a crosslinked polymer which shows excellent stability of dielectric characteristics over time and excellent thermal resistance and has excellent transparency, mechanical characteristics, dielectric characteristics, and gas barrier properties, and to provide a crosslinked polymer that is excellent terms of the above characteristics.

In order to achieve the above object, the present inventors conducted thorough investigation. As a result, they found that if the amount of double bonds contained in the crosslinked polymer is small, the stability of dielectric characteristics over time is improved. Therefore, the inventors reduced the amount of double bonds by reducing the amount of cyclic non-conjugated diene as a monomer, but this led to a problem that the thermal resistance of the crosslinked polymer deteriorated. Accordingly, the present inventors further conducted thorough investigation, and found that in a cyclic olefin copolymer which contains a repeating unit derived from a predetermined olefin, a repeating unit derived from a cyclic non-conjugated diene, and a repeating unit derived from a predetermined cyclic olefin, if the amount of the repeating unit derived from a cyclic non-conjugated diene is set to be a specific molar amount, it is possible to obtain a crosslinked polymer excellent in terms of both the stability of dielectric characteristics over time and thermal resistance and to achieve the above object. The present inventors completed the present invention in this manner.

The present invention is as follows.

[1] A cyclic olefin copolymer having a crosslinkable group including:
  (A) a repeating unit derived from one or more kinds of olefins represented by the following General Formula (I);
  (B) a repeating unit derived from a cyclic non-conjugated diene represented by the following General Formula (III); and
  (C) a repeating unit derived from one or more kinds of cyclic olefins represented by the following General Formula (V), wherein in the case where a total mole number of the repeating units is regarded as 100 mol %, the (B) repeating unit derived from a cyclic non-conjugated diene is contained in an amount of 19 mol % to 36 mol %.

[Chem. 1]

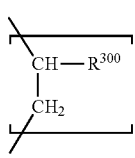
(I)

[In the General Formula (I), $R^{300}$ represents a hydrogen atom or a linear or branched hydrocarbon group having 1 to 29 carbon atoms.]

[Chem. 2]

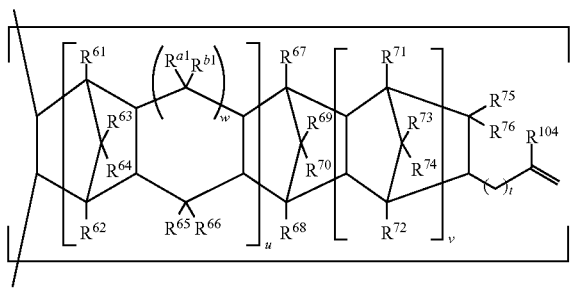
(III)

[In General Formula (III), u represents 0 or 1; v represents 0 or a positive integer; w represents 0 or 1; $R^{61}$ to $R^{76}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; $R^{104}$ represents a hydrogen atom or an alkyl group having 1 to 10 carbon atoms; t represents a positive integer of 0 to 10; and $R^{75}$ and $R^{76}$ may form a monocyclic or polycyclic ring by binding to each other.]

[Chem. 3]

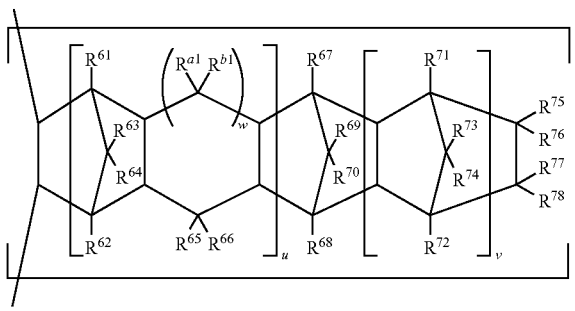
(V)

[In General Formula (V), u represents 0 or 1; v represents 0 or a positive integer; w represents 0 or 1; $R^{61}$ to $R^{78}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; and $R^{75}$ to $R^{78}$ may form a monocyclic or polycyclic ring by binding to each other. It should be noted that, in the case where both u and v represent 0, at least one of $R^{67}$ to $R^{70}$ and $R^{75}$ to $R^{78}$ is a substituent other than a hydrogen atom.]

[2] The cyclic olefin copolymer according to aspect [1], wherein the cyclic non-conjugated diene constituting the (B) repeating unit derived from a cyclic non-conjugated diene is 5-vinyl-2-norbornene

[3] The cyclic olefin copolymer according to aspect [1], wherein the cyclic non-conjugated diene constituting the (B) repeating unit derived from a cyclic non-conjugated diene is 5-vinyl-2-norbornene.

[4] The cyclic olefin copolymer according to aspect [1], wherein the cyclic olefin constituting the (C) repeating unit derived from a cyclic olefin is bicyclo[2.2.1]-2-heptene or tetracyclo[[4.4.0.1$^{2,5}$.1$^{7,10}$]-3-dodecene.

[5] The cyclic olefin copolymer according to aspect [1], wherein the cyclic olefin constituting the (C) repeating unit derived from a cyclic olefin is tetracyclo[4.4.0.1$^{2,5}$.1$^{7,10}$]-3-dodecene.

[6] The cyclic olefin copolymer according to aspect [1], wherein the cyclic non-conjugated diene constituting the (B) repeating unit derived from a cyclic non-conjugated diene is 5-vinyl-2-norbornene, and the cyclic olefin constituting the (C) repeating unit derived from a cyclic olefin is tetracyclo [4.4.0.1$^{2,5}$.1$^{7,10}$]-3-dodecene.

[7] A method of producing a cyclic olefin copolymer, including performing addition polymerization of a monomer containing one or more kinds of olefins represented by the following General Formula (Ia), a cyclic non-conjugated diene represented by the following General Formula (IIIa), and a cyclic olefin represented by the following General Formula (Va), in the presence of a catalyst including a transition metal compound (K) represented by the following General Formula (IX) and at least one kind of compound (M) selected from a group consisting of an organic metal compound (m-1), an organic aluminum oxy compound (m-2), and a compound (m-3) forming an ion pair by reacting with the transition metal compound (K).

[Chem. 4]

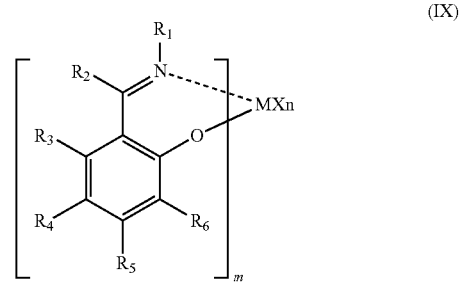
(IX)

[In General Formula (IX), M represents a transition metal of groups 3 to 11. m represents an integer of 1 to 4; $R_1$ to $R_6$ may be the same as or different from each other and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these may form a ring by being linked to each other. In addition, in the case where m is 2 or greater, one group among $R_1$ to $R_6$ contained in one ligand may be linked to one group among $R_1$ to $R_6$ contained in another ligand (here, $R_1$s do not bind to each other). $R_1$s, $R_2$s, $R_3$s, $R_4$s, $R_5$s, and $R_6$s may be the same as or different from each other; n represents a number satisfying the valency of M; X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. in the case where n is 2 or greater, plural groups represented by X may be the same as or different from each other, or plural groups represented by X may form a ring by binding to each other.]

[Chem. 5]

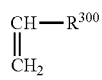

(Ia)

[In the General Formula (Ia), $R^{300}$ represents a hydrogen atom or a linear or branched hydrocarbon group having 1 to 29 carbon atoms.]

[Chem. 6]

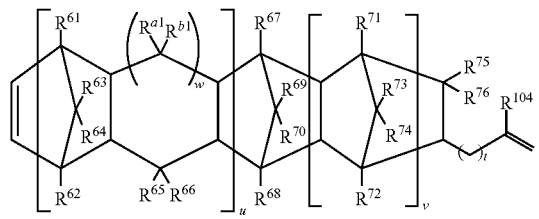

(IIIa)

[In General Formula (IIIa), u represents 0 or 1; v represents 0 or a positive integer; w represents 0 or 1; $R^{61}$ to $R^{76}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; $R^{104}$ represents a hydrogen atom or an alkyl group having 1 to 10 carbon atoms; t represents a positive integer of 0 to 10; and $R^{75}$ and $R^{76}$ may form a monocyclic or polycyclic ring by binding to each other.]

[Chem. 7]

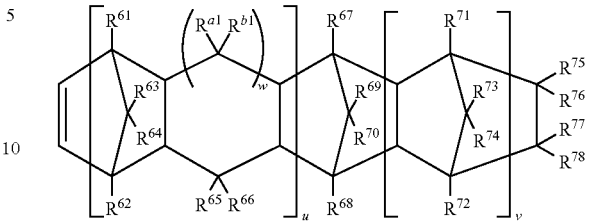

(Va)

[In General Formula (Va), u represents 0 or 1; v represents 0 or a positive integer; w represents 0 or 1; $R^{61}$ to $R^{78}$ as well as $R^a$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; and $R^{75}$ to $R^{78}$ may form a monocyclic or polycyclic ring by binding to each other.]

[8] The method of producing a cyclic olefin copolymer according to aspect [7], wherein the cyclic non-conjugated diene represented by the General Formula (IIIa) is 5-vinyl-2-norbornene, and the cyclic olefin represented by the General Formula (Va) is tetracyclo[4.4.0.1$^{2,5}$.1$^{7,10}$]-3-dodecene.

[9] A varnish containing the cyclic olefin copolymer according to any one of aspects [1] to [6] and an organic solvent.

[10] A crosslinked polymer obtained by crosslinking the cyclic olefin copolymer according to any one of aspects [1] to [6].

[11] A crosslinked polymer produced by heating the cyclic olefin copolymer according to any one of aspects [1] to [6] in the presence of a radical polymerization initiator.

[12] The crosslinked polymer according to aspect [11], wherein the radical polymerization initiator is bibenzyl compounds.

[13] The crosslinked polymer y according to aspect [10] that has a maximum value of a loss tangent (tan δ) in a temperature range of 30° C. to 300° C. of not more than 0.6, which is a value measured by solid dynamic viscoelasticity measurement performed at a frequency of 1 Hz in a tension mode.

[14] The crosslinked polymer according to aspect [10] that has a storage elastic modulus (E') of 0.1 GPa or greater which is measured by solid dynamic viscoelasticity measurement performed at a frequency of 1 Hz in a tension mode at 260° C.

[15] The crosslinked polymer according to aspect [10] that satisfies a formula A/B≥0.05 in the case where a storage elastic modulus (E') at 260° C. is denoted as A and a storage elastic modulus (E') at 30° C. is denoted as B in solid dynamic viscoelasticity measurement performed at a frequency of 1 Hz in a tension mode.

[16] A molded product containing the crosslinked polymer according to aspect [10].

[17] The molded product according to aspect [16] that is a film or a sheet.

[18] The molded product according to aspect [16] that is a high-frequency circuit board.

[19] The molded product according to aspect [16] that is a substrate for a liquid crystal display.

The cyclic olefin copolymer of the present invention contains a repeating unit derived from an olefin, a repeating unit derived from a predetermined cyclic non-conjugated diene, and a repeating unit derived from a predetermined cyclic olefin, and contains the repeating unit derived from a cyclic non-conjugated diene in a molar amount within a predetermined range. Accordingly, the cyclic olefin copolymer can provide a crosslinked polymer which shows excellent stability of dielectric characteristics over time and excellent thermal resistance and has excellent transparency, mechanical characteristics, dielectric characteristics, and gas barrier properties.

DESCRIPTION OF EMBODIMENTS

Hereinafter, the present invention will be described in detail.

[Cyclic Olefin Copolymer (P)]

A cyclic olefin copolymer (P) of the present invention contains (A) a repeating unit derived from one or more kinds of olefins represented by the following General Formula (I), (B) a repeating unit derived from a cyclic non-conjugated diene represented by the following General Formula (III), and (C) a repeating unit derived from one or more kinds of cyclic olefins represented by the following General Formula (V).

[Chem. 8]

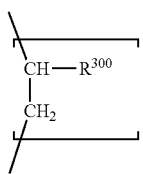
(I)

In the General Formula (I), $R^{300}$ represents a hydrogen atom or a linear or branched hydrocarbon group having 1 to 29 carbon atoms.

[Chem. 9]

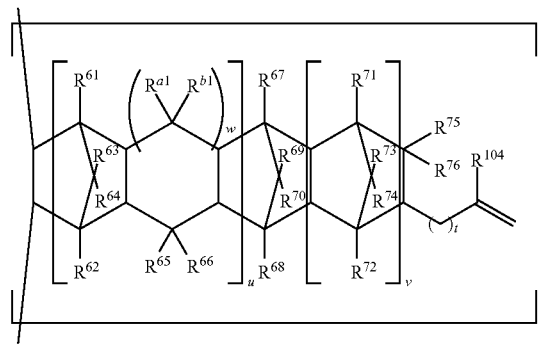
(III)

In General Formula (III), u represents 0 or 1; v represents 0 or a positive integer; w represents 0 or 1; $R^{61}$ to $R^{76}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; $R^{104}$ represents a hydrogen atom or an alkyl group having 1 to 10 carbon atoms; t represents a positive integer of 0 to 10; and $R^{75}$ and $R^{76}$ may form a monocyclic or polycyclic ring by binding to each other.

[Chem. 10]

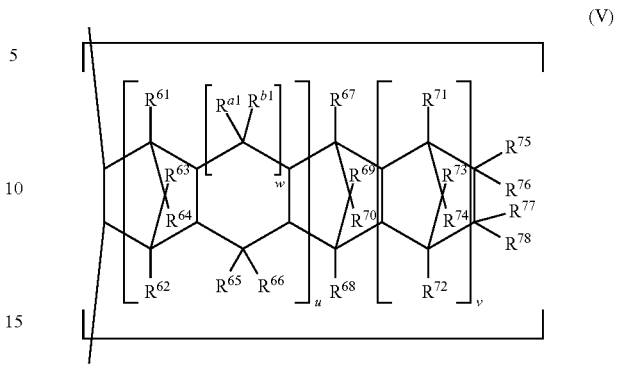
(V)

In General Formula (V), u represents 0 or 1; v represents 0 or a positive integer; w represents 0 or 1; $R^{61}$ to $R^{78}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; and $R^{75}$ to $R^{78}$ may form a monocyclic or polycyclic ring by binding to each other. It should be noted that, when both u and v represent 0, at least one of $R^{67}$ to $R^{70}$ and $R^{75}$ to $R^{78}$ is a substituent other than a hydrogen atom.

In addition, in the case where a total mole number of the repeating units is regarded as 100 mol %, the (B) repeating unit derived from a cyclic non-conjugated diene can be contained in an amount of 19 mol % to 36 mol %, preferably 20 mol % to 33 mol %, and more preferably 25 mol % to 30 mol %.

If the (B) repeating unit derived from a cyclic non-conjugated diene represented by General Formula (III) is contained within the above range, a crosslinked polymer obtained from the cyclic olefin copolymer shows excellent stability of dielectric characteristics over time and excellent thermal resistance. Moreover, it is also possible to obtain a crosslinked polymer (Q) that also has excellent mechanical characteristics, dielectric characteristics, transparency, and gas barrier properties. In other words, it is possible to obtain a crosslinked polymer in which these physical properties are balanced excellently.

In the case where the amount of the (B) constituent unit derived from a cyclic non-conjugated diene exceeds the above range, moldability or solubility of the cyclic olefin copolymer (P) deteriorates, and the dielectric characteristics of the crosslinked polymer deteriorate over time. In the case where the amount is less than the range, the thermal resistance and mechanical characteristics of the crosslinked polymer (Q) that is obtained by crosslinking the cyclic olefin copolymer (P) deteriorate.

An olefin monomer as one of the raw materials for copolymerizing the cyclic olefin copolymer (P) is a monomer that provides a structure represented by the Formula (I) by addition copolymerization. The monomer is an olefin represented by the following Formula (Ia).

[Chem. 11]

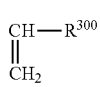

(Ia)

In Formula (Ia), $R^{300}$ represents a hydrogen atom or a linear or branched hydrocarbon group having 1 to 29 carbon atoms. Specifically, examples thereof include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, and the like. Among these, in view of obtaining a crosslinked polymer having excellent thermal resistance, mechanical characteristics, dielectric characteristics, transparency, and gas barrier properties, ethylene and propylene are preferable, and ethylene is particularly preferable. Two or more kinds of the olefin monomer represented by the Formula (Ia) may be used.

The cyclic non-conjugated diene monomer as a raw material for copolymerizing the cyclic olefin copolymer forms a constituent unit represented by the Formula (III) by addition copolymerization. Specifically, the cyclic non-conjugated diene represented by the following General Formula (IIIa) corresponding to the General Formula (III) is used.

[Chem. 12]

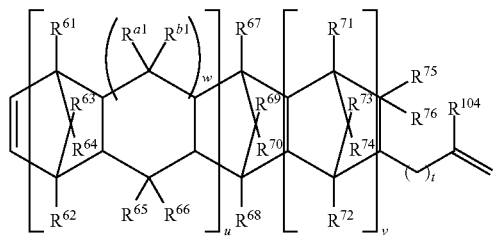

(IIIa)

In the General Formula (IIIa), u represents 0 or 1; v represents 0 or a positive integer; w represents 0 or 1; $R^{61}$ to $R^{76}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; $R^{104}$ represents a hydrogen atom or an alkyl group having 1 to 10 carbon atoms; t represents a positive integer of 0 to 10; and $R^{75}$ and $R^{76}$ may form a monocyclic or polycyclic ring by binding to each other.

Though not particularly limited, examples of the cyclic non-conjugated diene represented by the General Formula (IIIa) include cyclic non-conjugated dienes represented by the following chemical formulae. Among these, 5-vinyl-2-norbornene and 8-vinyl-9-methyltetracyclo[$4.4.0.1^{2,5}.1^{7,10}$]-3-dodecene are preferable, and 5-vinyl-2-norbornene is particularly preferable.

[Chem. 13]

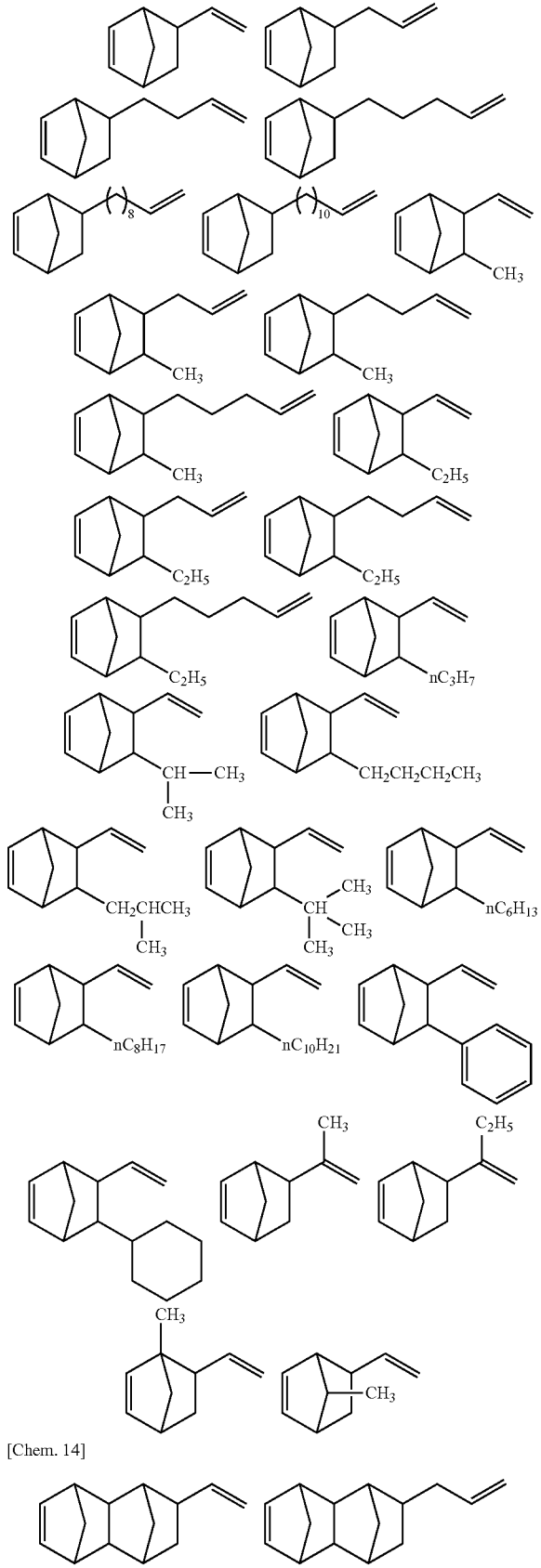

[Chem. 14]

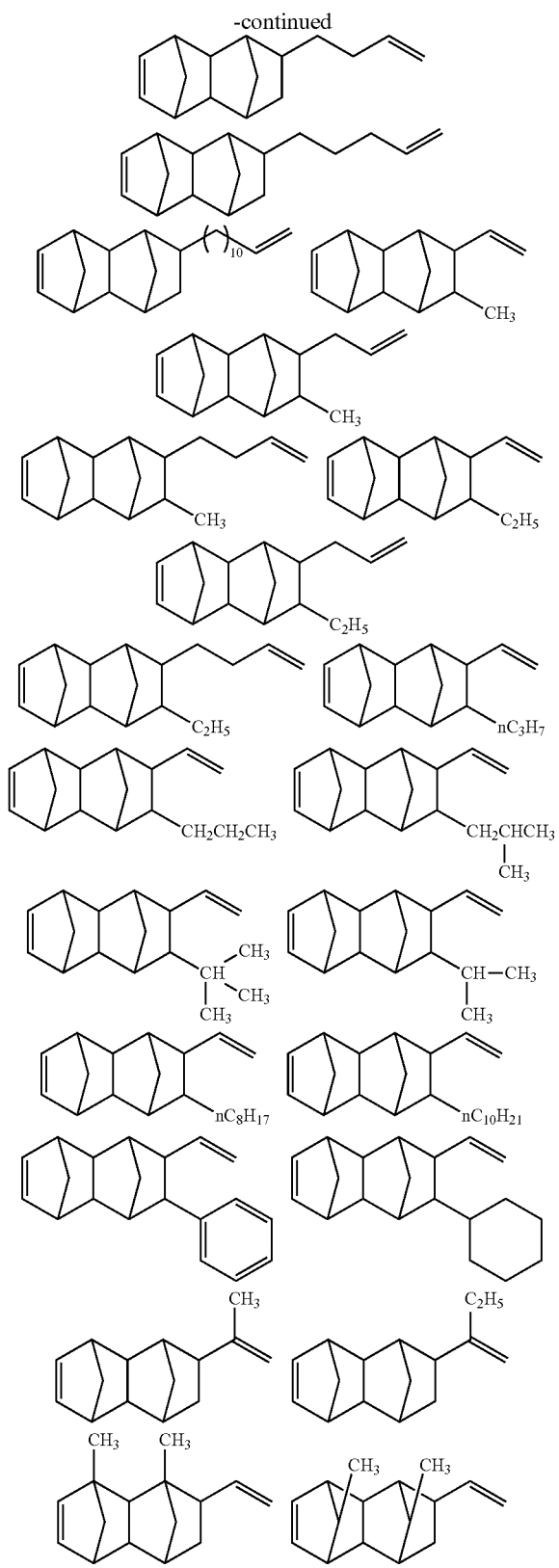

copolymer has a double bond in a portion of a side chain, that is, in a portion other than a main chain of copolymerization.

The cyclic olefin monomer as a raw material for copolymerizing the cyclic olefin copolymer forms a constituent unit represented by the Formula (V) by addition copolymerization. Specifically, a cyclic olefin monomer represented by the following General Formula (Va) corresponding to the General Formula (V) is used.

[Chem. 15]

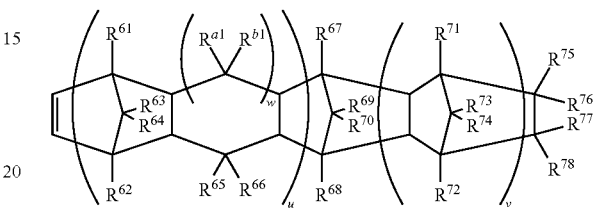

(Va)

In General Formula (Va), u represents 0 or 1; v represents 0 or a positive integer; w represents 0 or 1; $R^{61}$ to $R^{78}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; and $R^{75}$ to $R^{78}$ may form a monocyclic or polycyclic ring by binding to each other.

The amount of the constituent unit derived from the cyclic olefin represented by General Formula (V) contained in the cyclic olefin copolymer (P) according to the present invention is generally 0.1 mol % to 100 mol % and preferably 0.1 mol % to 50 mol %, based on the total moles of the repeating unit derived from one or more kinds of olefins represented by the General Formula (I) and the repeating unit derived from the cyclic non-conjugated diene represented by the General Formula (III).

The olefin monomer represented by General Formula (I) and the cyclic olefin represented by General Formula (Va) are used as copolymerization components, whereby the effects of the present invention are obtained, and the solubility of the cyclic olefin copolymer in a solvent is improved. Accordingly, moldability becomes excellent, and a yield of product increases. As the cyclic olefin represented by General Formula (Va), bicyclo[2.2.1]-2-heptene (norbornene) and tetracyclo[[4.4.0.1$^{2,5}$.1$^{7,10}$]-3-dodecene (tetracyclododecene) are preferably used. Since these cyclic olefins have a rigid cyclic structure, an elastic modulus of the copolymer and a crosslinked polymer thereof is easily maintained. In addition, not having a hetero double bond structure, these olefins bring an advantage that crosslinking is easily controlled.

For the cyclic olefin copolymer (P) according to the present invention, a cyclic olefin monomer other than the cyclic non-conjugated diene and the Formula (Va) and/or a chain-like polyene monomer can be copolymerized, in addition to the olefin monomer, the cyclic non-conjugated diene monomer, and the cyclic olefin monomer represented by the Formula (Va) described above.

The cyclic olefin copolymer (P) of the present invention may be constituted with a cyclic olefin other than the cyclic non-conjugated diene and the Formula (V) and/or a repeating unit derived from a chain-like polyene, in addition to the (A) repeating unit derived from an olefin, the (B) repeating unit The cyclic olefin copolymer (P) according to the present invention is characterized in that since the constituent unit derived from the cyclic non-conjugated diene represented by General Formula (III) is contained in the copolymer, the derived from a cyclic non-conjugated diene represented by the Formula (III), and the (C) repeating unit derived from one or more kinds of cyclic olefins represented by the Formula (V).

As the raw material for copolymerizing the cyclic olefin copolymer (P), it is possible to use a cyclic olefin other than the cyclic non-conjugated diene and the Formula (Va) and a chain-like polyene, in addition to the olefin, the cyclic non-conjugated diene, and the cyclic olefin monomer represented by the Formula (Va) described above. Such a cyclic olefin and linear polyene include a cyclic olefin other than the cyclic non-conjugated diene represented by the following General Formulae (VIa) and (VIIa) and a linear polyene represented by the following General Formula (VIIIa). Two or more different kinds of the cyclic olefin or linear polyene may be used.

[Chem. 16]

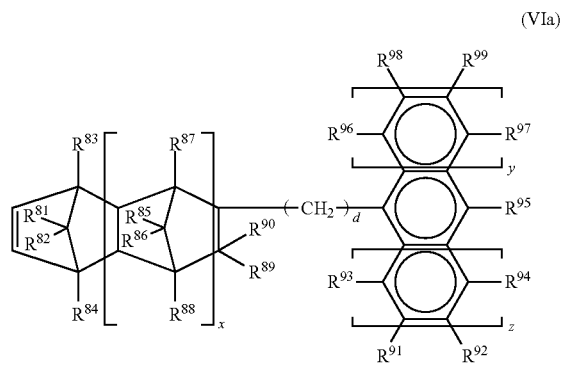

(VIa)

In General Formula (VIa), x and d represent 0 or an integer of 1 or greater; y and z represent 0, 1, or 2; and $R^{81}$ to $R^{99}$ may be the same as or different from each other and represent a hydrogen atom, a halogen atom, an alkyl group having 1 to 20 carbon atoms, an aliphatic hydrocarbon group as a cycloalkyl group having 3 to 15 carbon atoms, or an aromatic hydrocarbon group or an alkoxy group having 6 to 20 carbon atoms. A carbon atom to which $R^{89}$ and $R^{90}$ bind and a carbon atom to which $R^{93}$ binds or a carbon atom to which $R^{92}$ binds may bind to each other directly or via an alkylene group having 1 to 3 carbon atoms. In addition, when y=z=0, $R^{95}$ and $R^{92}$ or $R^{95}$ and $R^{99}$ may form a monocyclic or polycyclic aromatic ring by binding to each other.

[Chem. 17]

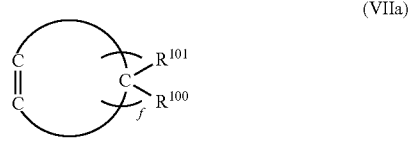

(VIIa)

In General Formula (VIIa), $R^{100}$ and $R^{101}$ may be the same as or different from each other and represent a hydrogen atom or a hydrocarbon group having 1 to 5 carbon atoms, and f satisfies 1≤f≤18.

[Chem. 18]

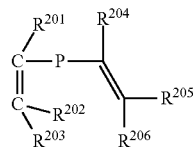

(VIIIa)

In General Formula (VIIIa), $R^{201}$ to $R^{206}$ may be the same as or different from each other and represent a hydrogen atom or a hydrocarbon group having 1 to 20 carbon atoms, and P represents a linear or branched hydrocarbon group that has 1 to 20 carbon atoms and may contain a double bond and/or a triple bond.

As specific examples of the cyclic olefin represented by the General Formulae (Va), (VIa), and (VIIa), the compounds disclosed in Pamphlet of International Publication WO2006/118261 can be used.

Specifically, it is possible to use a bicyclo-2-heptene derivative (bicyclohepto-2-ene derivative), a tricyclo-3-decene derivative, a tricyclo-3-undecene derivative, a tetracyclo-3-dodecene derivative, a pentacyclo-4-pentadecene derivative, a pentacyclopentadecadiene derivative, a pentacyclo-3-pentadecene derivative, a pentacyclo-4-hexadecene derivative, a pentacyclo-3-hexadecene derivative, a hexacyclo-4-heptadecene derivative, a heptacyclo-5-eicosene derivative, a heptacyclo-4-eicosene derivative, a heptacyclo-5-heneicosene derivative, an octacyclo-5-docosene derivative, a nonacyclo-5-pentacosene derivative, a nonacyclo-6-hexacosene derivative, a cyclopentadiene-acenaphthylene adduct, a 1,4-methano-1,4,4a,9a-tetrahydrofluorene derivative, a 1,4-methano-1,4,4a,5,10,10a-hexahydroanthracene derivative, a cycloalkylene derivative having 3 to 20 carbon atoms, and the like.

Specific examples of the linear polyene represented by General Formula (VIIIa) include 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, DMDT, 1,3-butadiene, 1,5-hexadiene, and the like. In addition, cyclized polyene cyclized from polyenes such as 1,3-butdiene and 1,5-hexadiene may be used.

In the case where the cyclic olefin copolymer (P) according to the present invention contains a constituent unit derived from the linear polyene represented by the General Formula (VIIIa) or a constituent unit derived from the cyclic olefin (General Formulae (VIa) and (VIIa)) other than the cyclic non-conjugated diene, the content of the constituent unit is generally 0.1 mol % to 100 mol % and preferably 0.1 mol % to 50 mol %, based on the total moles of the repeating unit derived from one or more kinds of olefins represented by the General Formula (I), the repeating unit derived from the cyclic non-conjugated diene represented by the General Formula (III), and the repeating unit derived from one or more kinds of cyclic olefins represented by the General Formula (V).

In the case where the olefin monomer represented by General Formula (I) described above, the cyclic olefins represented by the General Formulae (VIa) and (VIIa), and the linear polyene represented by General Formula (VIIIa) are used as copolymerization components, the effects of the present invention are obtained. In addition, the solubility of the cyclic olefin copolymer in a solvent further improves, whereby moldability becomes excellent, and the yield of product increases. Among the components, the cyclic olefins represented by General Formulae (VIa) and (VIIa) are preferable. Since these cyclic olefins have a rigid cyclic structure, the elastic modulus of the copolymer and the crosslinked polymer is easily maintained. Moreover, not having a hetero double bond structure, these olefins bring an advantage that crosslinking is easily controlled.

For the cyclic olefin copolymer (P) according to the present invention, according to the desired use, the content of monomers and the glass transition temperature (Tg) can be controlled by the ratio of comonomer. The Tg of the cyclic olefin copolymer (P) is generally not higher than 300° C., preferably not higher than 250° C., even more preferably not higher than 200° C., and still more preferably not higher than 170° C. If the Tg exceeds this range, it is difficult to melt and mold the cyclic olefin copolymer (P).

A limiting viscosity [η] of the cyclic olefin copolymer (P) according to the present invention, which is measured in decalin at 135° C., generally ranges from 0.2 dl/g to 15 dl/g, preferably ranges from 0.5 dl/g to 5 dl/g, and even more preferably ranges from 0.5 dl/g to 3 dl/g. In the case where the limiting viscosity [η] is higher than this range, the moldability deteriorates, and in the case where the limiting viscosity [η] is lower than this range, the thermal resistance or mechanical characteristics of the crosslinked polymer (Q) that is obtained by crosslinking the cyclic olefin copolymer (P) deteriorates.

In addition, the limiting viscosity [η] of the cyclic olefin copolymer (P) can be controlled by polymerization conditions including a polymerization catalyst, a co-catalyst, an amount of $H_2$ added, a polymerization temperature, and the like.

[Method of Producing Cyclic Olefin Copolymer (P)]

In order to produce the cyclic olefin copolymer (P) of the present invention, the following copolymerization catalysts can be used.

(Copolymerization Catalyst)

Examples of preferable copolymerization catalysts that can be used for producing the cyclic olefin copolymer (P) according to the present invention include catalysts including (K) a transition metal compound represented by the following General Formula (IX), and (M) at least one kind of compound selected from (m-1) an organic metal compound, (m-2) an organic aluminum oxy compound, and (m-3) a compound forming an ion pair by reacting with the (K) transition metal compound.

[Chem. 19]

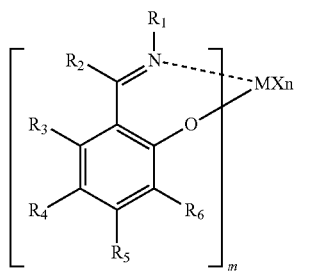

In General Formula (IX), M represents a transition metal of groups 3 to 11. m represents an integer of 1 to 4; $R_1$ to $R_6$ may be the same as or different from each other and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these may form a ring by being linked to each other. In addition, in the case where m is 2 or greater, one group among $R_1$ to $R_6$ contained in one ligand may be linked to one group among $R_1$ to $R_6$ contained in another ligand (here, $R_1$s do not bind to each other). $R_1$s, $R_2$s, $R_3$s, $R_4$s, $R_5$s, and $R_6$s may be the same as or different from each other; n represents a number satisfying the valency of M; X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. in the case where n is 2 or greater, plural groups represented by X may be the same as or different from each other, or plural groups represented by X may form a ring by binding to each other.

(K) Transition Metal Compound

The (K) transition metal compound constituting the copolymerization catalyst preferably used for producing the copolymer according to the present invention is a compound represented by the Formula (IX).

In the Formula (IX), M represents an atom of a transition metal of groups 3 to 11 in the periodic table (group 3 also includes lanthanoids). M is preferably a metal atom of groups 3 to 6, and more preferably a metal atom of group 4 or 5. Specific examples thereof include scandium, titanium, zirconium, hafnium, vanadium, niobium, tantalum, chromium, cobalt, iron, ruthenium, and the like.

Among these, titanium, zirconium, hafnium, and vanadium are preferable, and titanium is particularly preferable. m represents an integer of 1 to 4. m is preferably 1 or 2, and more preferably 2.

In the hydrocarbon group, a hydrogen atom may be substituted with halogen. Examples thereof include a halogenated hydrocarbon group having 1 to 30 carbon atoms and more preferably having 1 to 20 carbon atoms, such as trifluoromethyl group, a pentafluorophenyl group, and a chlorophenyl group.

In addition, the hydrocarbon group may be substituted with another hydrocarbon group, and examples thereof include an aryl group-substituted alkyl group such as a benzyl group and cumyl group.

Moreover, the hydrocarbon group may further have a heterocyclic compound residue; an oxygen-containing group such as an alkoxy group, an aryloxy group, an ester group, an ether group, an acyl group, a carboxyl group, a carbonate group, a hydroxy group, a peroxy group, or a carboxylic anhydride group; a nitrogen-containing group such as an amino group, an imino group, an amide group, an imide group, a hydrazino group, a hydrazono group, a nitro group, a nitroso group, a cyano group, an isocyano group, a cyanic acid ester group, an amidino group, a diazo group, or a group obtained when an amino group turns into an ammonium salt; a boron-containing group such as a boranediyl group, a boranetriyl group, or a diboranyl group; a sulfur-containing group such as a mercapto group, a thioester group, a dithioester group, an alkylthio group, an arylthio group, a thioacyl group, a thioether group, a thiocyanic acid ester group, an isocyanic acid ester group, a sulfonester group, an sulfonamide group, a thiocarboxyl group, a dithiocarboxyl group, a sulfo group, a sulfonyl group, a sulfinyl group, or a sulfenyl group; a phosphorus-containing group such as a phosphido group, a phosphoryl group, a thiophosphoryl group, or a phosphate group, a silicon-containing group, a germanium-containing group, or a tin-containing group.

Among these, a linear or branched alkyl group having 1 to 30 carbon atoms and preferably having 1 to 20 carbon atoms, such as a methyl group, an ethyl group, an n-propyl group, an isopropyl group, an n-butyl group, an isobutyl group, a sec-butyl group, a neopentyl group, or an n-hexyl group; an aryl group having 6 to 30 carbon atoms and preferably having 6 to 20 carbon atoms, such as a phenyl group, a naphthyl group, a biphenyl group, a terphenyl group, a phenanthryl group, or an anthracenyl group; a substituted aryl group obtained by being substituted is substituted with 1 to 5 substituents such as a halogen atom, an alkyl group or an alkoxy group having 1 to 30 carbon atoms and preferably having 1 to 20 carbon atoms, and an aryl group or an aryloxy group having 6 to 30 carbon atoms and preferably having 6 to 20 carbon atoms, and the like are particularly preferable.

Examples of the oxygen-containing group, nitrogen-containing group, boron-containing group, sulfur-containing group, and phosphorus-containing group include the same ones exemplified as above.

Examples of the heterocyclic compound residue include a nitrogen-containing compound such as pyrrole, pyridine, pyrimidine, quinoline, or triazine, an oxygen-containing compound such as furan or pyran, a residue of a sulfur-containing compound such as thiophene, a group obtained when the above heterocyclic compound residue is further substituted with a substituent such as an alkyl group or an alkoxy group having 1 to 30 carbon atoms and preferably having 1 to 20 carbon atoms, and the like.

Examples of the silicon-containing group include a silyl group, a siloxy group, a hydrocarbon-substituted silyl group, a hydrocarbon-substituted siloxy group, and the like. Specific examples thereof include a methylsilyl group, a dimethylsilyl group, a trimethylsilyl group, an ethylsilyl group, a diethylsilyl group, a triethylsilyl group, a diphenylmethylsilyl group, a triphenylsilyl group, a dimethylphenylsilyl group, a dimethyl-t-butyl silyl group, a dimethyl(pentafluorophenyl)silyl group, and the like. Among these, a methylsilyl group, a dimethylsilyl group, a trimethylsilyl group, an ethylsilyl group, a diethylsilyl group, a triethylsilyl group, a dimethylphenylsilyl group, a triphenylsilyl group, and the like are preferable. Particularly, a trimethylsilyl group, a triethylsilyl group, a triphenylsilyl group, and a dimethylphenylsilyl group are preferable. Specific examples of the hydrocarbon-substituted siloxy group include a trimethylsiloxy group and the like.

Examples of the germanium-containing group and tin-containing group include groups obtained by substituting silicon of the silicon-containing group with germanium and tin.

Next, examples of $R_1$ to $R_5$ described above will be described in more detail.

Specific examples of the alkoxy group include a methoxy group, an ethoxy group, an n-propoxy group, an isopropoxy group, an n-butoxy group, an isobutoxy group, a t-butoxy group, and the like.

Specific examples of the alkylthio group include a methylthio group, an ethylthio group, and the like.

Specific examples of the aryloxy group include a phenoxy group, a 2,6-dimethylphenoxy group, a 2,4,6-trimethylphenoxy group, and the like.

Specific examples of the arylthio group include a phenylthio group, a methylphenylthio group, a naphthylthio group, and the like.

Specific examples of the acyl group include a formyl group, an acetyl group, a benzoyl group, a p-chlorobenzoyl group, a p-methoxybenzoyl group, and the like.

Specific examples of the ester group include an acetyloxy group, a benzoyloxy group, a methoxycarbonyl group, a phenoxycarbonyl group, a p-chlorophenoxycarbonyl group, and the like.

Specific examples of the thioester group include an acetylthio group, a benzoylthio group, a methylthiocarbonyl group, a phenylthiocarbonyl group, and the like.

Specific examples of the amide group include an acetamide group, an N-methylacetamide group, an N-methylbenzamide group, and the like.

Specific examples of the imide group include an acetimide group, a benzimide group, and the like.

Specific examples of the amino group include a dimethylamino group, an ethylmethylamino group, a diphenylamino group, and the like.

Specific examples of the imino group include a methylimino group, an ethylimino group, a propylimino group, a butylimino group, a phenylimino group, and the like.

Specific examples of the sulfonester group include a methyl sulfonate group, an ethyl sulfonate group, a phenyl sulfonate group, and the like.

Specific examples of the sulfonamide group include a phenyl sulfonamide group, an N-methylsulfonamide group, and an N-methyl-p-toluenesulfonamide group, and the like.

Among $R_1$ to $R_5$, two or more groups, preferably, adjacent groups may be linked to each other to form an aliphatic ring, an aromatic ring, or a hydrocarbon ring having different atoms such as nitrogen atoms. These rings may further have a substituent.

In addition, $R_6$ represents an aliphatic hydrocarbon group, an alicyclic hydrocarbon group, and an aromatic group of which carbon atoms directly binding to a phenyl group are primary, secondary, and tertiary carbon atoms. Examples of the aliphatic hydrocarbon group that are preferable as $R_6$ include a linear or branched (secondary) alkyl group having 1 to 30 carbon atoms and preferably having 1 to 20 carbon atoms, such as methyl, ethyl, n-propyl, isopropyl, n-butyl, isobutyl, sec-butyl, neopentyl, or n-hexyl; examples of the alicyclic hydrocarbon group include a cyclic saturated hydrocarbon group having 3 to 30 carbon atoms and preferably having 3 to 20 carbon atoms, such as cyclopropyl, cyclobutyl, cyclopentyl, cyclohexyl, 2-methylcyclohexyl, 3-methylcyclohexyl, 4-methylcyclohexyl, 4-tert-butylcyclohexyl, 2,6-dimethylcyclohexyl, 2,4,6-trimethylcyclohexyl, 3,5-dimethylcyclohexyl, 2,3,4,5,6-pentamethylcyclohexyl, 2,2-dimethylcyclohexyl, 2,2,6,6-tetramethylcyclohexyl, 3,5-di-tert-butylcyclohexyl, cycloheptyl, cyclooctyl, or cyclododecyl; and examples of the aromatic group include an aryl group having 6 to 30 carbon atoms and preferably having 6 to 20 carbon atoms, such as phenyl, benzyl, naphthyl, biphenylyl, or triphenylyl. In addition, the examples also preferably include groups obtained by being further substituted with substituents such as an alkyl group having 1 to 30 carbon atoms and preferably having 1 to 20 carbon atoms, or an aryl group having 6 to 30 carbon atoms and preferably having 6 to 20 carbon atoms.

In the present invention, $R_6$ is particularly preferably a group selected from a linear or branched (secondary) alkyl group having 1 to 30 carbon atoms and preferably having 1 to 20 carbon atoms, such as methyl, ethyl, isopropyl, isobutyl, sec-butyl, or neopentyl, and a cyclic saturated hydrocarbon group having 3 to 30 carbon atoms and preferably having 3 to 20 carbon atoms, such as cyclopropyl, cyclobutyl, cyclopentyl, cyclohexyl, cycloheptyl, cyclooctyl, or cyclododecyl. Alternatively, $R_6$ is preferably an aryl group having 6 to 30 carbon atoms and preferably having 6 to 20 carbon atoms, such as phenyl, naphthyl, fluorenyl, anthranyl, or phenanthryl.

In addition, in the case where m is 2 or greater, one group among $R_1$ to $R_6$ contained in one ligand may be linked to one group among $R_1$ to $R_6$ contained in another ligand (wherein, $R_1$s do not bind to each other). Moreover, in the case where m is 2 or greater, $R_1$s, $R_2$s, $R_3$s, $R_4$s, $R_5$s, and $R_6$s may be the same as or different from each other.

n is a number satisfying the valency of M. n is specifically an integer of 0 to 5, preferably an integer of 1 to 4, and more preferably an integer of 1 to 3.

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. In addition, in the case where n is 2 or greater, X may be the same as or different from each other.

Examples of the halogen atom include fluorine, chlorine, bromine, and iodine.

Examples of the hydrocarbon group include the same groups as exemplified above for $R_1$ to $R_5$. Specific examples thereof include an alkyl group such as a methyl group, an ethyl group, a propyl group, a butyl group, a hexyl group, an octyl group, a nonyl group, a dodecyl group, or a eicosyl group; a cycloalkyl group having 3 to 30 carbon atoms, such as a cyclopentyl group, a cyclohexyl group, a norbornyl group, or an adamantyl group; an alkenyl group such as a vinyl group, a propenyl group, or a cyclohexenyl group; an arylalkyl group such as a benzyl group, a phenylethyl group, or a phenylpropyl group; an aryl group such as a phenyl group, a tolyl group, a dimethylphenyl group, a trimethylphenyl group, an ethylphenyl group, a propylphenyl group, a biphenyl group, a naphthyl group, a methylnaphthyl group, an anthryl group, or a phenanthryl group, but the present invention is not limited to these. In addition, these hydrocarbon groups also include halogenated hydrocarbons, specifically, groups obtained when at least one hydrogen atom of a hydrocarbon group having 1 to 20 carbon atoms is substituted with halogen. Among these, a group having 1 to 20 carbon atoms is preferable.

Examples of the heterocyclic compound residue include the same residues as exemplified above for $R_1$ to $R_5$.

Examples of the oxygen-containing group include the same groups as exemplified above for $R_1$ to $R_5$. Specific examples thereof include a hydroxy group; an alkoxy group such as a methoxy group, an ethoxy group, a propoxy group, or a butoxy group; an aryloxy group such as a phenoxy group, a methylphenoxy group, a dimethylphenoxy group, or a naphthoxy group; an arylalkoxy group such as a phenylmethoxy group or a phenylethoxy group; an acetoxy group; a carbonyl group; and the like, but the present invention is not limited to these.

Examples of the sulfur-containing group include the same groups as exemplified above for $R_1$ to $R_5$. Specific examples thereof include a sulfonate group such as a methyl sulfonate group, a trifluoromethane sulfonate group, a phenyl sulfonate group, a benzyl sulfonate group, a p-toluene sulfonate group, a trimethylbenzene sulfonate group, a triisobutylbenzene sulfonate group, a p-chlorobenzene sulfonate group, or a pentafluorobenzene sulfonate group; a sulfinate group such as a methyl sulfinate group, a phenyl sulfinate group, a benzyl sulfinate group, a p-toluene sulfinate group, a trimethylbenzene sulfinate group, or a pentafluorobenzene sulfinate group; an alkylthio group; an arylthio group; and the like, but the present invention is not limited to these.

Specific examples of the nitrogen-containing group include the same groups as exemplified above for $R_1$ to $R_5$. Specific examples thereof include an amino group; an alkylamino group such as a methylamino group, a dimethylamino group, a diethylamino group, a dipropylamino group, a dibutylamino group, or a dicyclohexylamino group; an arylamino group or an alkylarylamino group such as a phenylamino group, a diphenylamino group, a ditolylamino group, a dinaphthylamino group, or a methylphenylamino group; and the like, but the present invention is not limited to these.

Specific examples of the boron-containing group include $BR_4$ (R represents hydrogen, an alkyl group, an aryl group which may have a substituent, a halogen atom, or the like).

Specific examples of the phosphorus-containing group include a trialkylphosphine group such as a trimethylphosphine group, a tributylphosphine group, or a tricyclohexylphosphine group; a triarylphosphine group such as a triphenylphosphine group or a tritolylphosphine group; a phosphite group (phosphide) group such as a methyl phosphite group, an ethyl phosphite group, or a phenyl phosphite group; a phosphonic acid group; a phosphinic acid group; and the like, but the present invention is not limited to these.

Specific examples of the silicon-containing group include the same groups as exemplified above for $R_1$ to $R_6$. Specific examples thereof include a hydrocarbon-substituted silyl group such as a phenylsilyl group, a diphenylsilyl group, a trimethylsilyl group, a triethylsilyl group, a tripropylsilyl group, a tricyclohexylsilyl group, a triphenylsilyl group, a methyldiphenylsilyl group, a tritolylsilyl group, or a trinaphthylsilyl group; a hydrocarbon-substituted silyl ether group such as a trimethylsilyl ether group; a silicon-substituted alkyl group such as a trimethylsilyl methyl group; a silicon-substituted aryl group such as a trimethylsilylphenyl group; and the like.

Specific examples of the germanium-containing group include the same groups as exemplified above for $R_1$ to $R_6$. Specific examples thereof include groups obtained by substituting silicon of the above silicon-containing group with germanium.

Specific examples of the tin-containing group include the same groups as exemplified above for $R_1$ to $R_5$. More specific examples thereof include groups obtained by substituting silicon of the above silicon-containing group with tin.

Specific examples of the halogen-containing group include a fluorine-containing group such as $PF_6$ or $BF_4$, a chlorine-containing group such as $ClO_4$ or $SbC_{16}$, and a iodine-containing group such as $IO_4$, but the present invention is not limited to these.

Specific examples of the aluminum-containing group include $AlR_4$ (R represents hydrogen, an alkyl group, an aryl group which may have a substituent, a halogen atom, or the like), but the present invention is not limited thereto.

In addition, in the case where n is 2 or greater, the plural groups represented by X may be the same as or different from each other, or the plural groups represented by X may form a ring by being linked to each other.

In the present invention, as the above (K) transition metal compound, if the transition metal atom represented by the following General Formula (X) is used among the transition metal compounds represented by the Formula (IX), this is preferable since a copolymer having more desirable characteristics can be produced.

[Chem. 20]

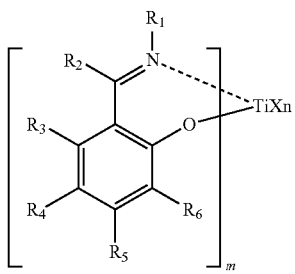

In General Formula (X), m represents an integer of 1 to 4; $R_1$ to $R_5$ may be the same as or different from each other and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and $R_6$ is selected from an aliphatic hydrocarbon group of which a carbon atom binding to a phenyl group is a primary, secondary, or tertiary carbon atom, an alicyclic hydrocarbon group of which a carbon atom binding to a phenyl group is a primary, secondary, or tertiary carbon atom, and an aromatic group, wherein two or more groups among these may form a ring by being linked to each other. In addition, in the case where m is 2 or greater, one group among $R_1$ to $R_6$ contained in one ligand may be linked to one group among $R_1$ to $R_6$ contained in another ligand (wherein, R's do not bind to each other); $R_1$s, $R_2$s, $R_3$s, $R_4$s, $R_5$s, and $R_6$s may be the same as or different from each other; n represents a number satisfying the valency of Ti; X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. In the case where n is 2 or greater, plural groups represented by X may be the same as or different from each other, or plural groups represented by X may form a ring by being linked to each other.

Specific examples of the (K) transition metal compound suitably used as a component of the copolymerization catalyst in the present invention will be shown below, but the present invention is not limited thereto.

[Chem. 21]

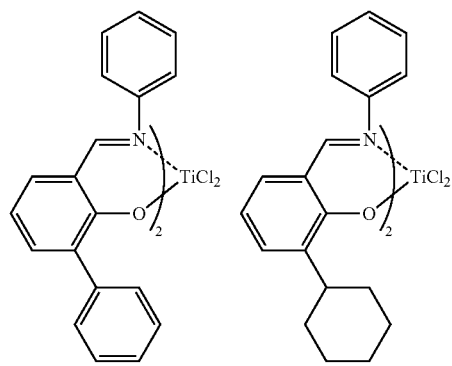

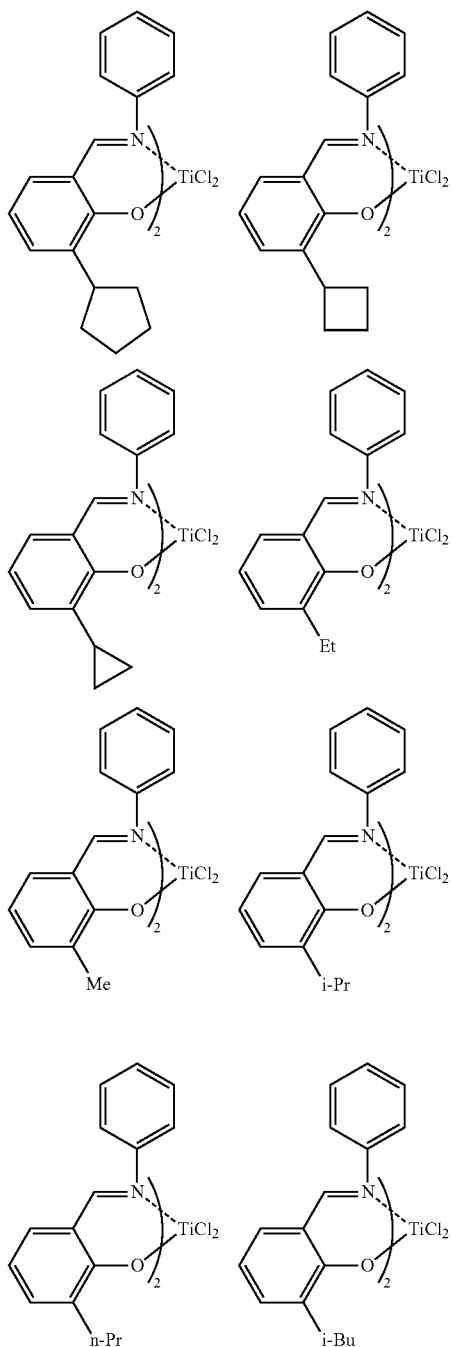

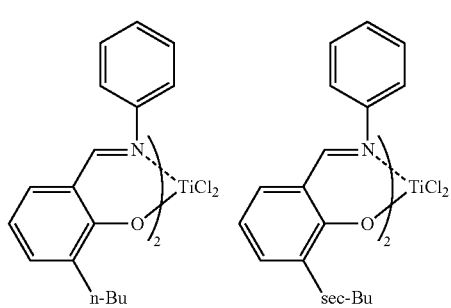

-continued
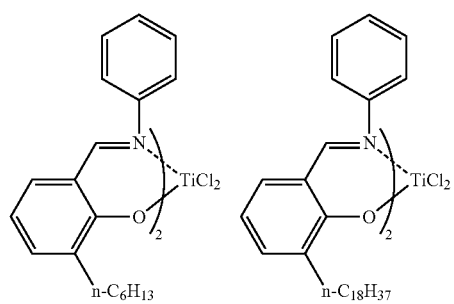
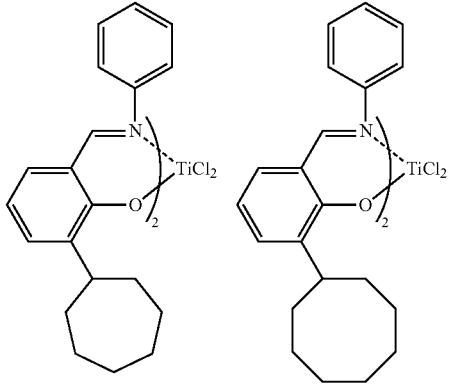
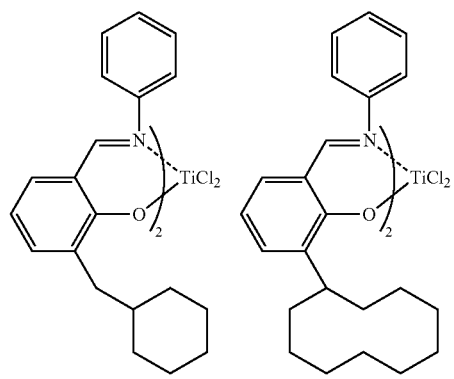
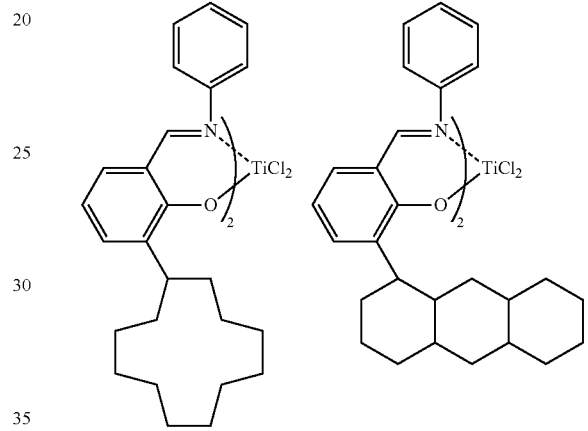
[Chem. 22]
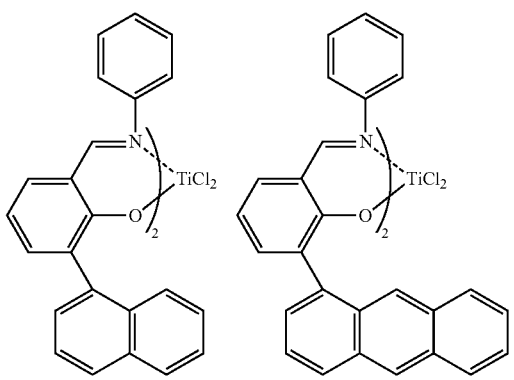
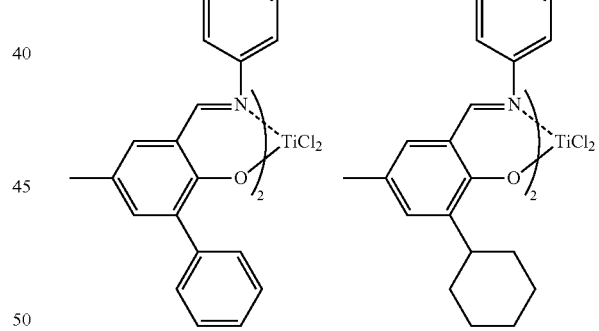
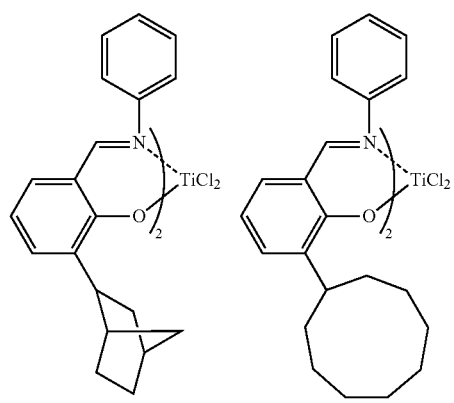
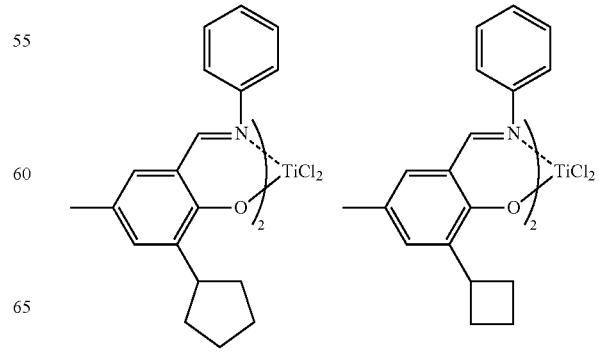

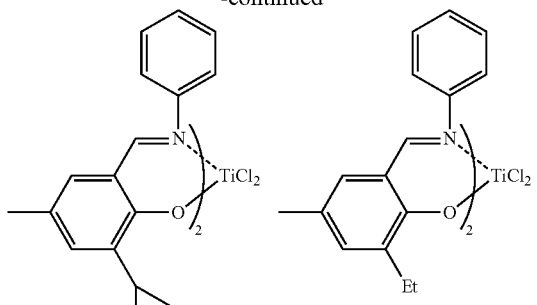
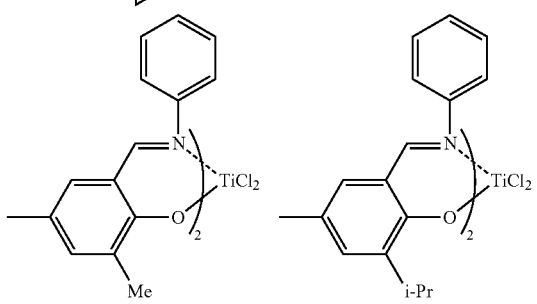
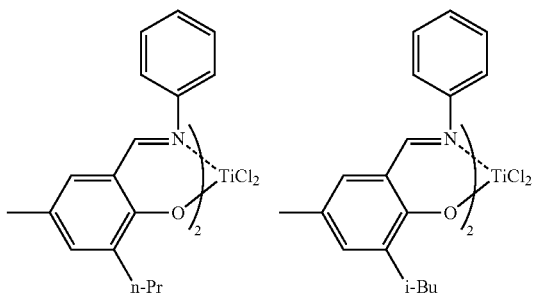
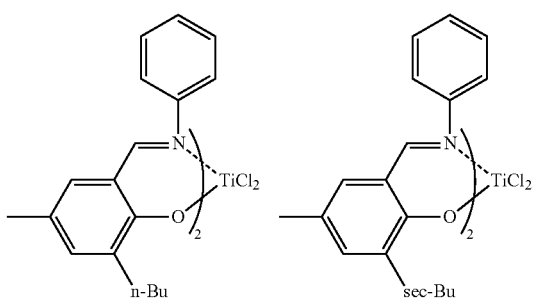
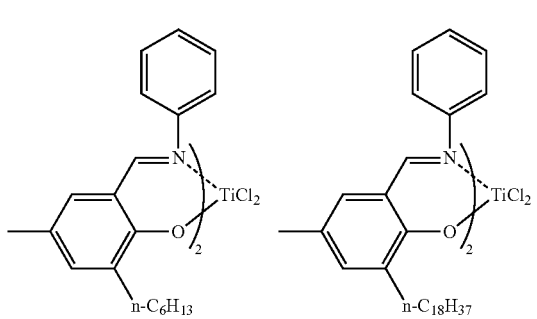
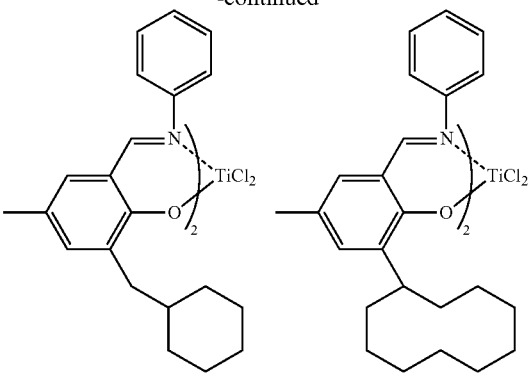
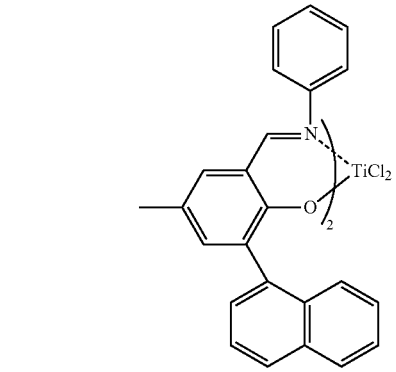
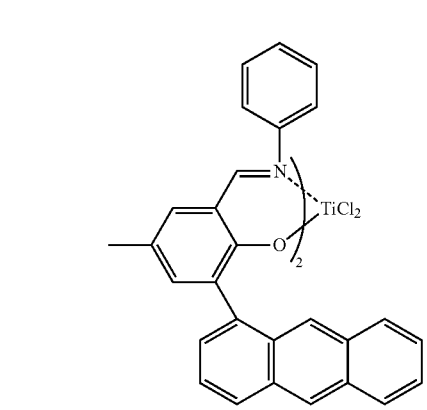
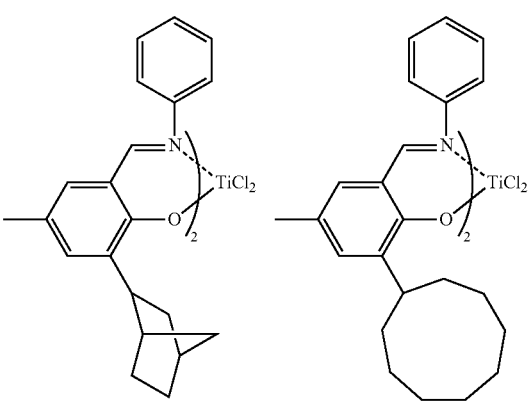

-continued
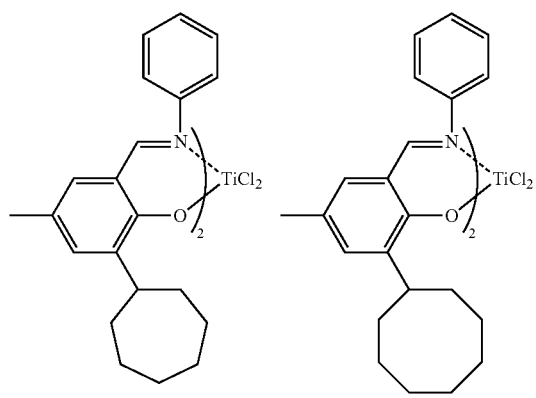
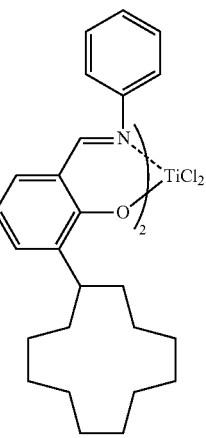
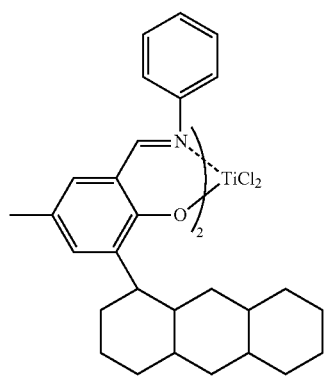
[Chem. 23]
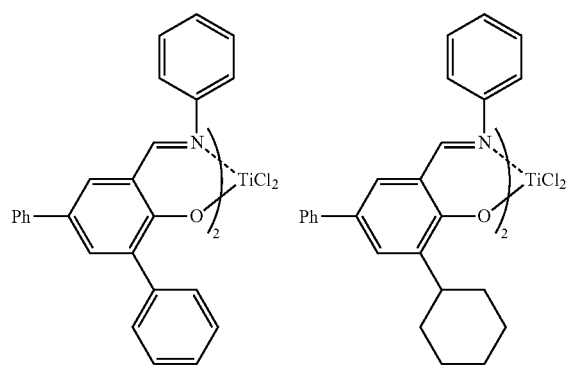
-continued
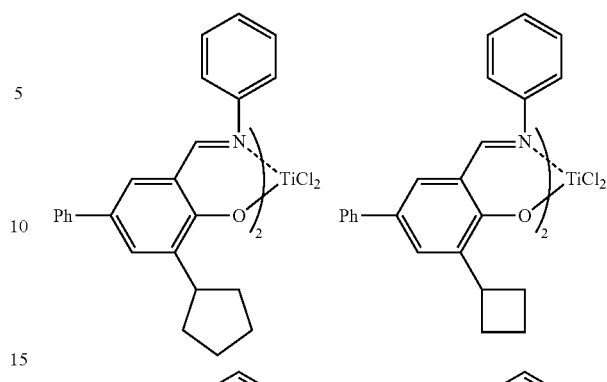
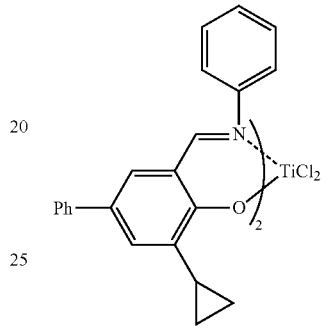
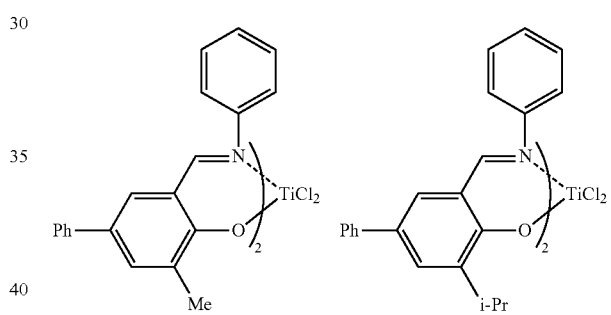
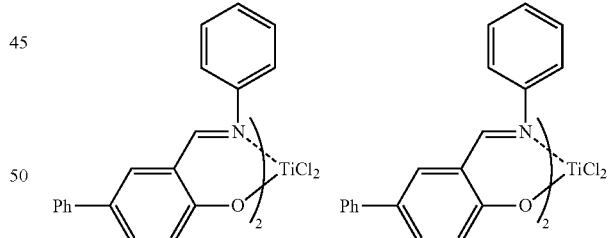
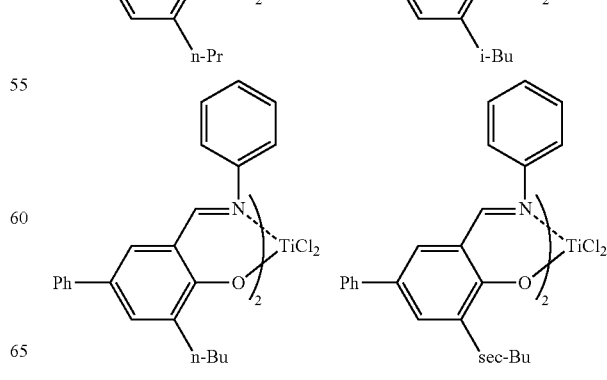

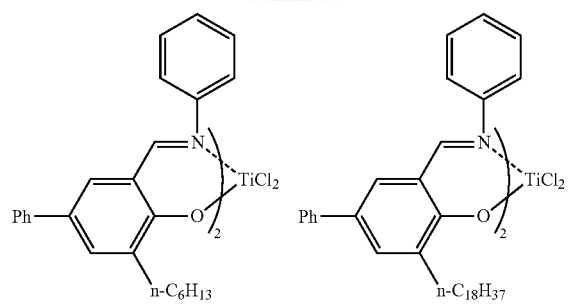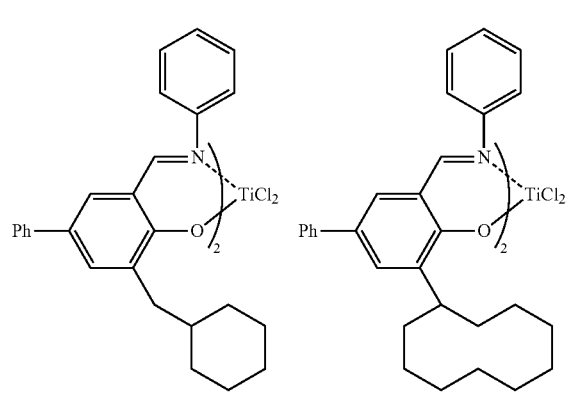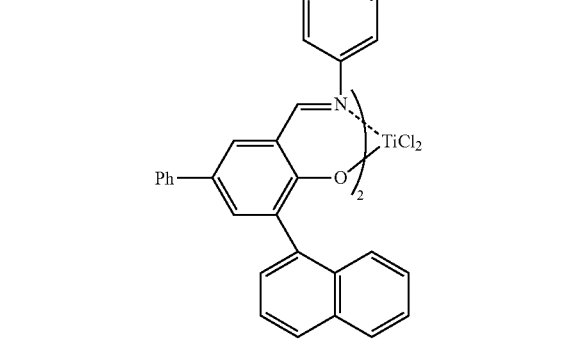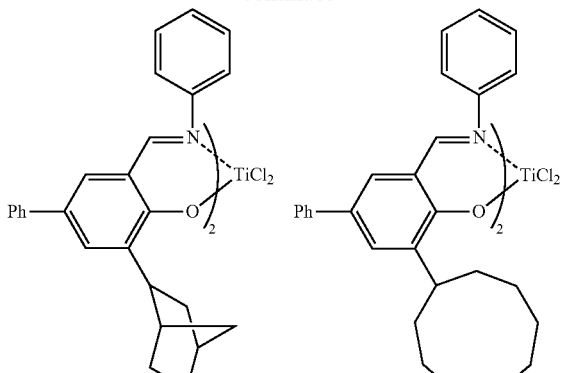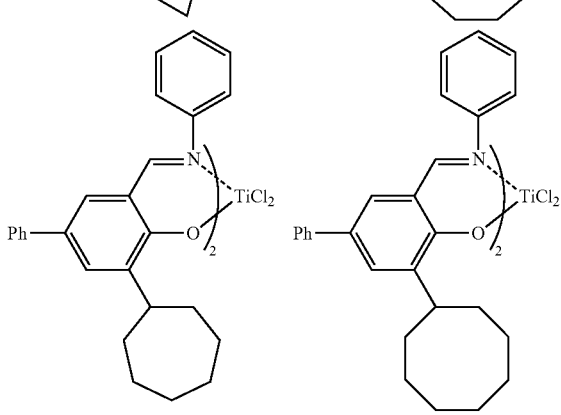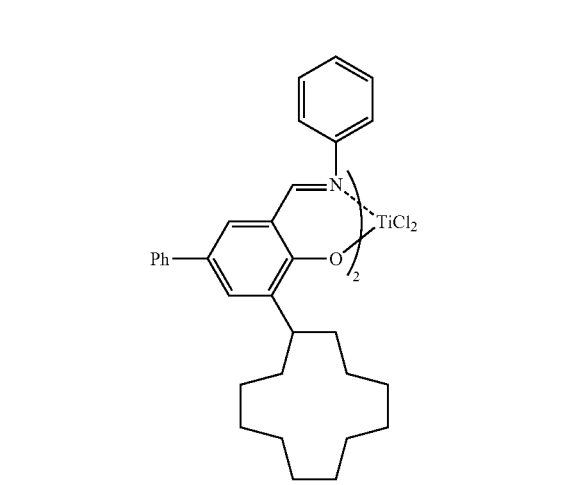

-continued
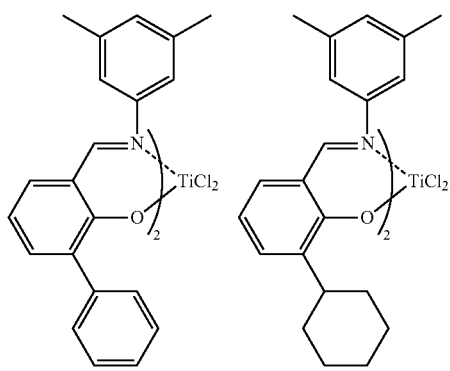
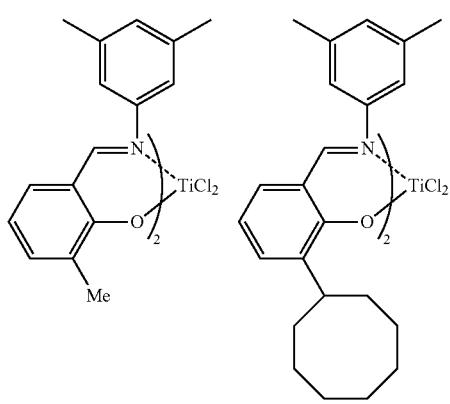
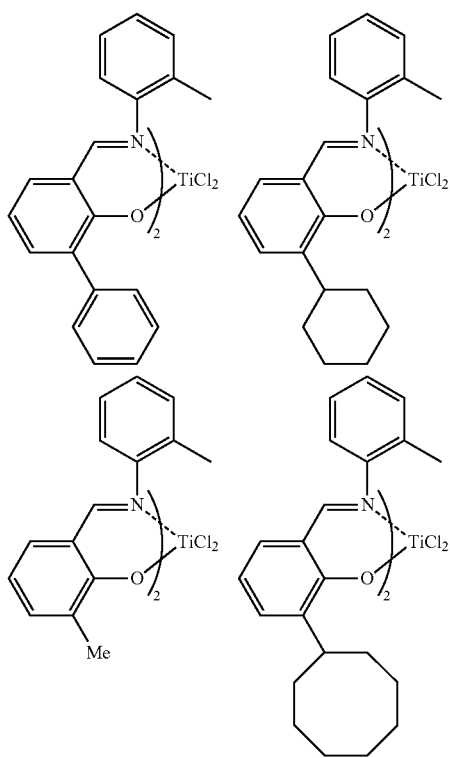
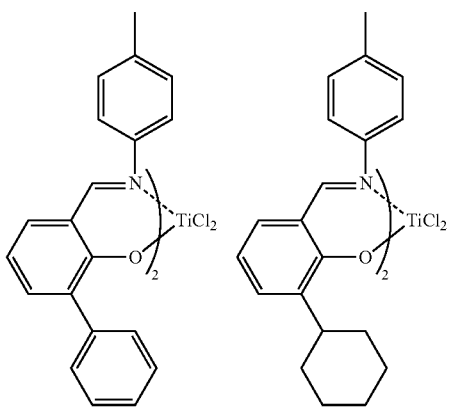
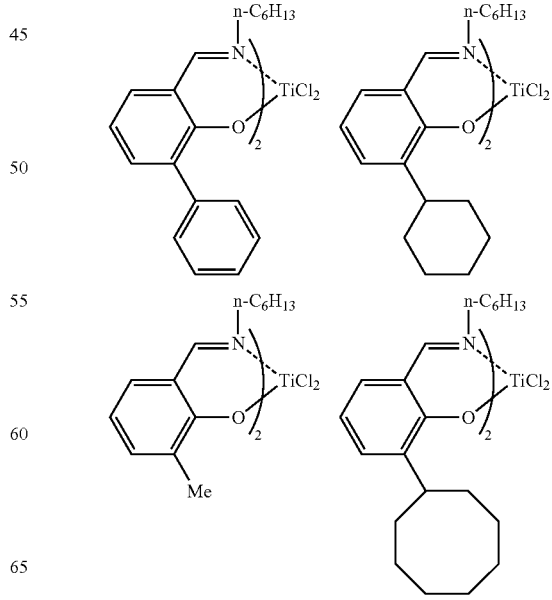

-continued
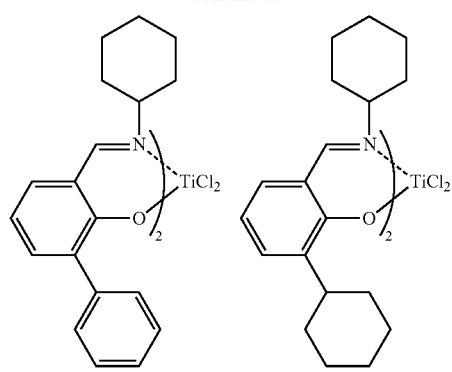
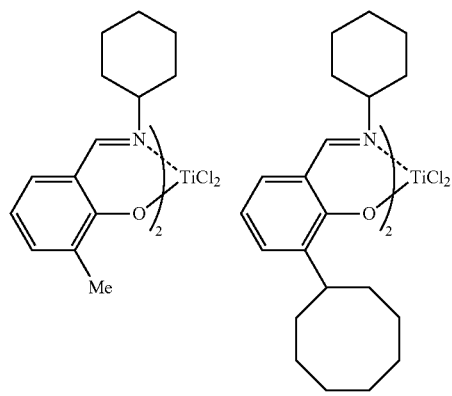
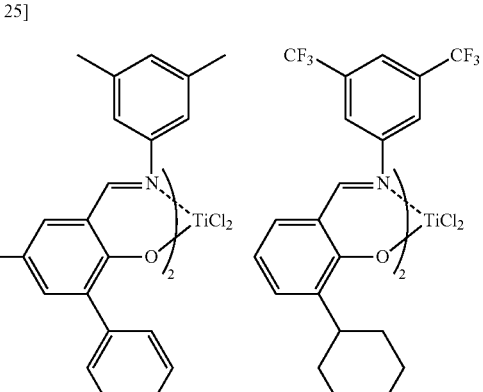
[Chem. 25]
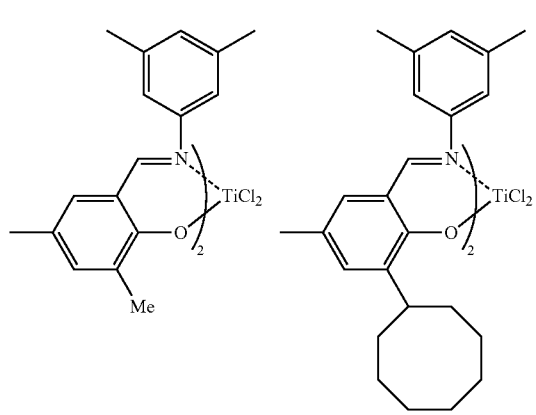
-continued
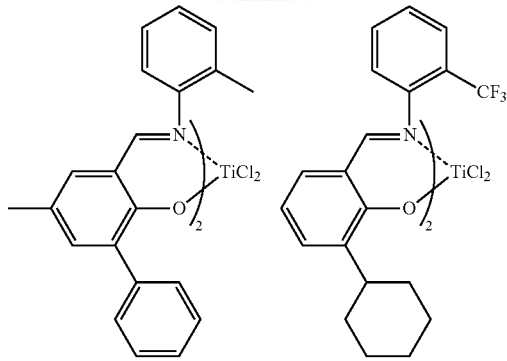
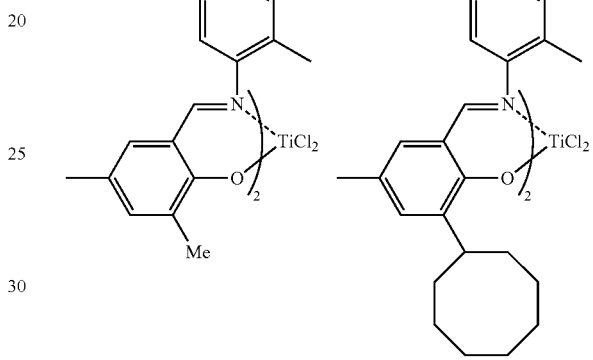
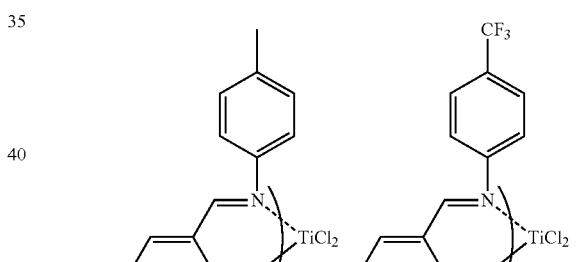

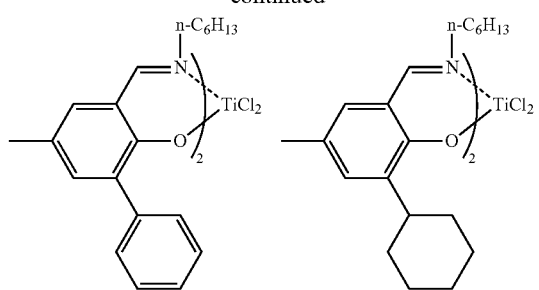
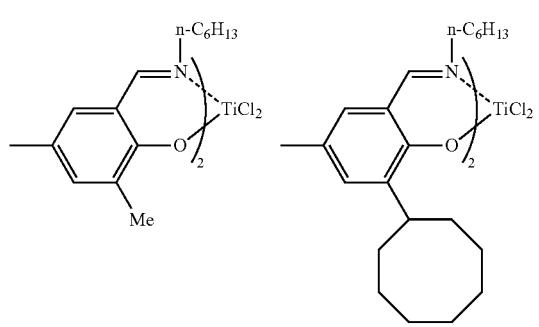
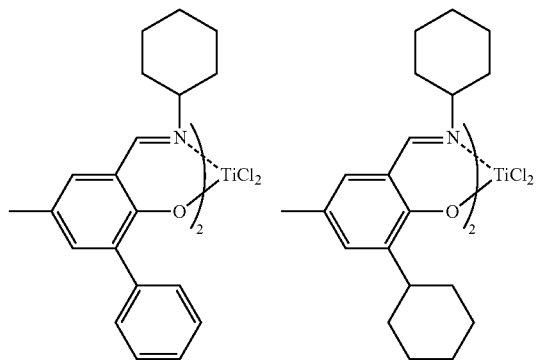
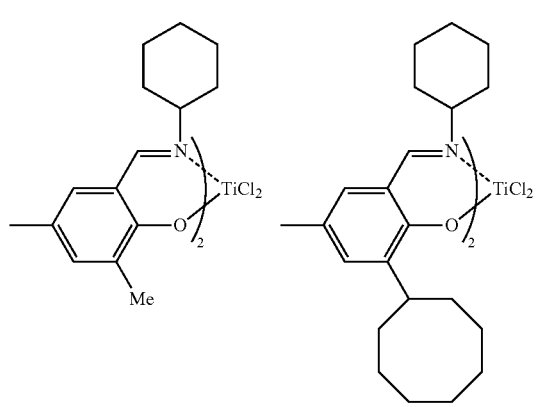
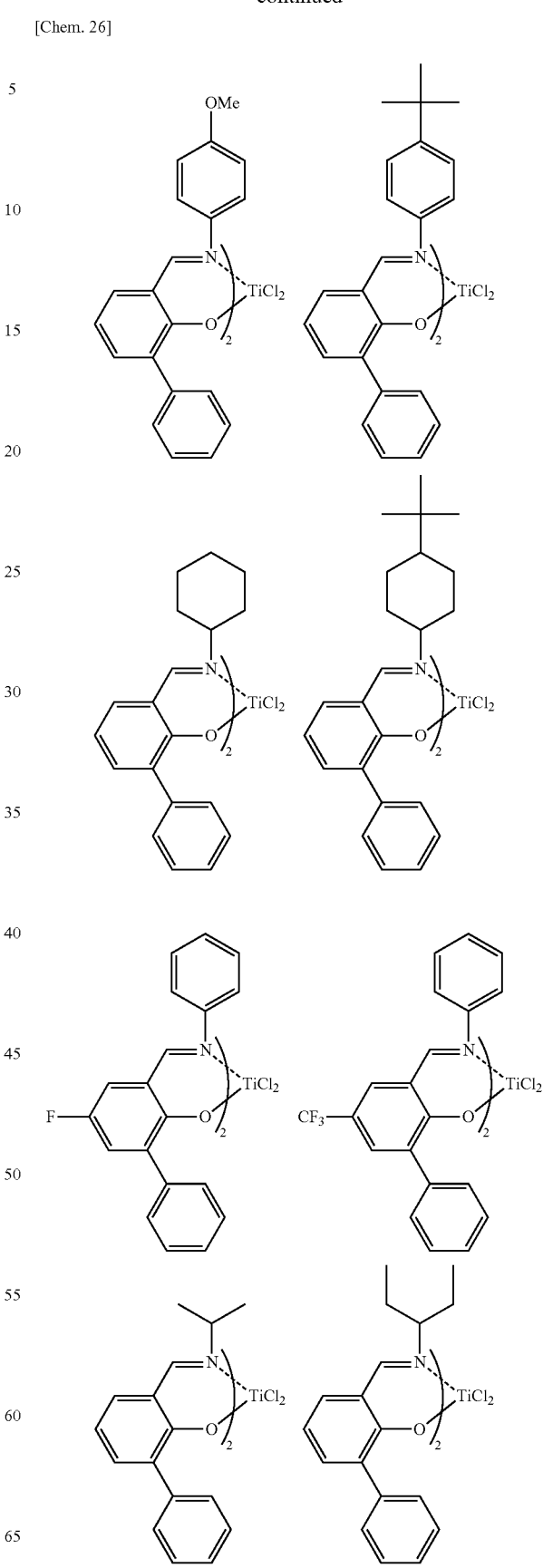

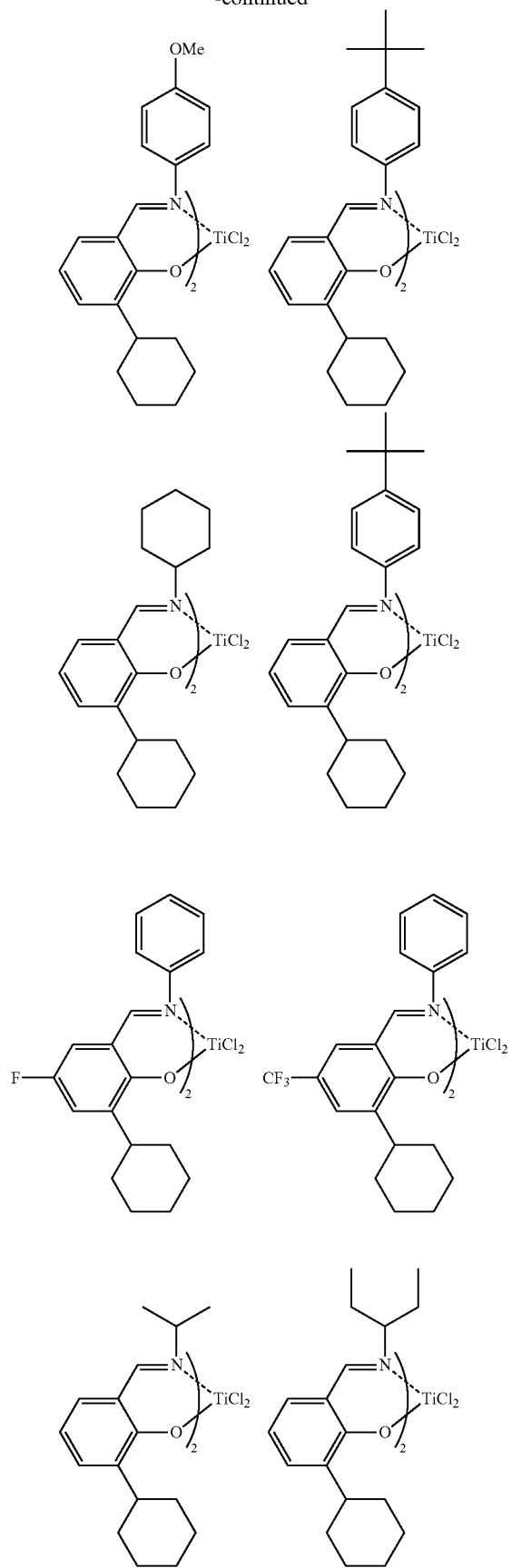
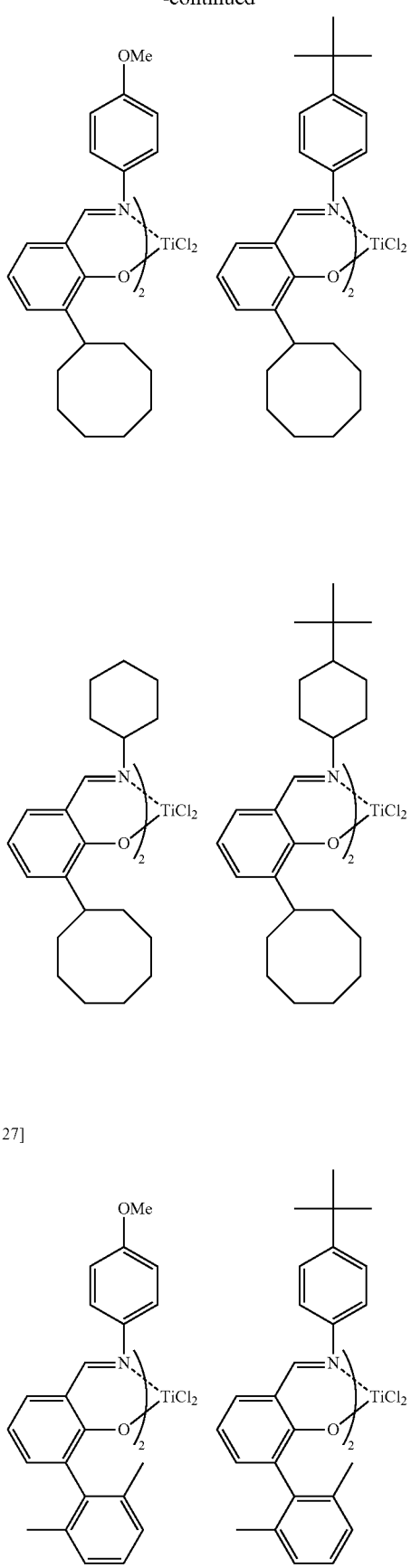
[Chem. 27]

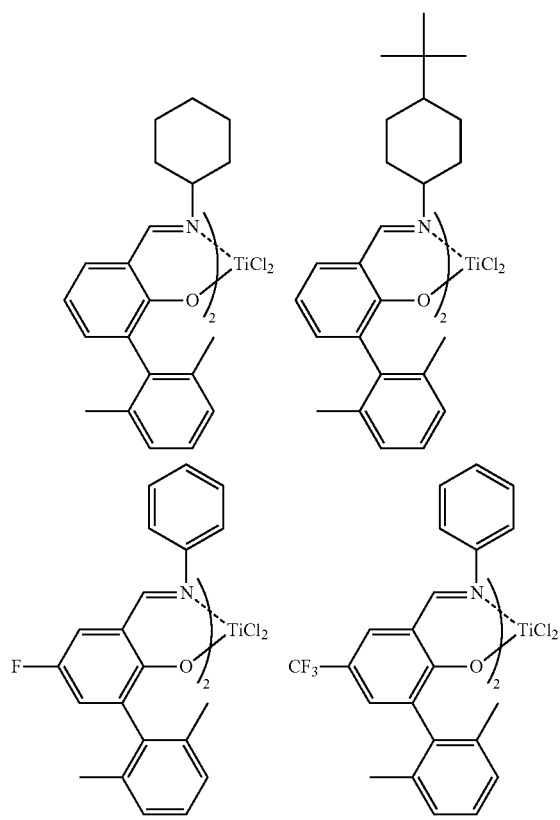
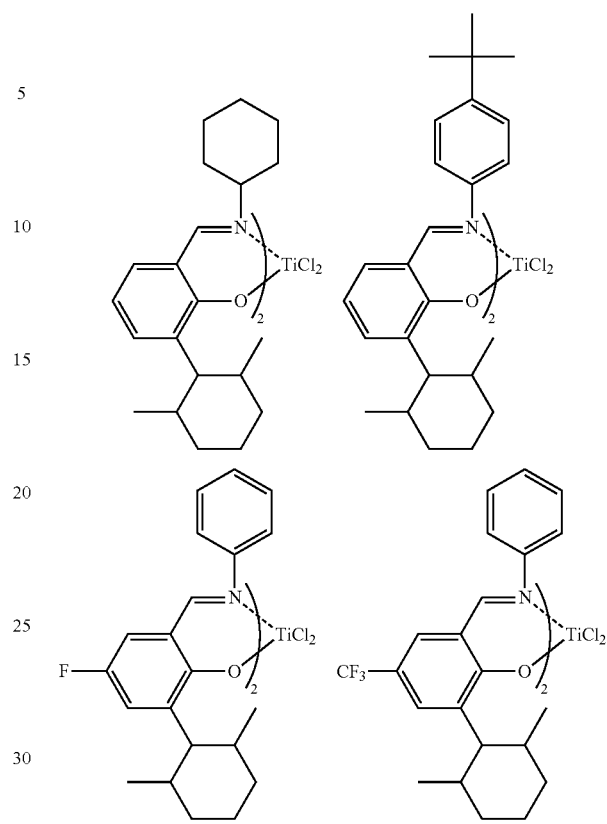
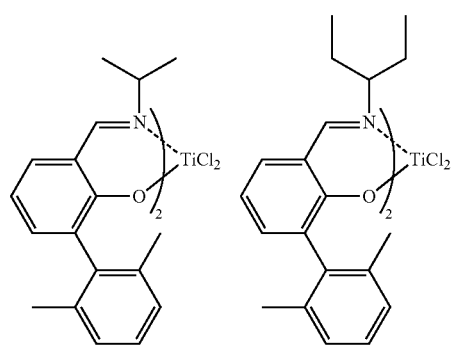
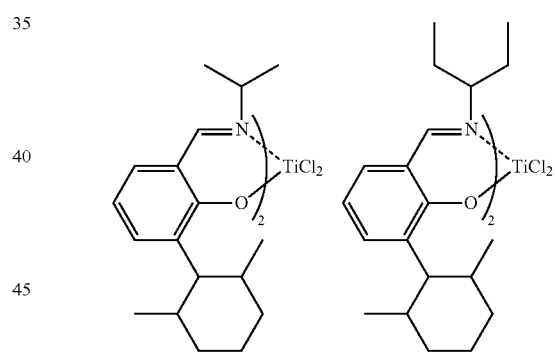
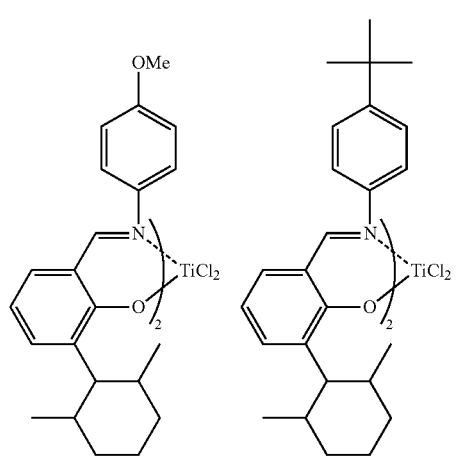
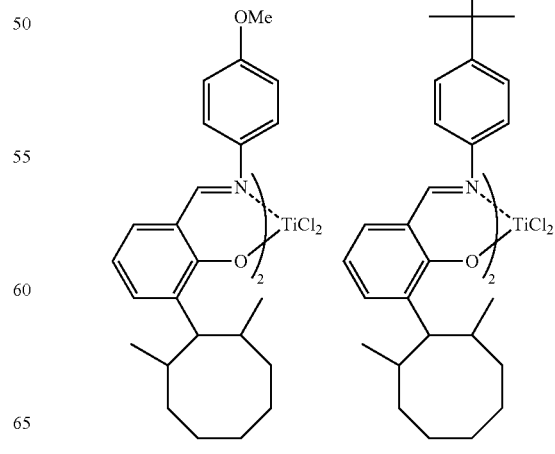

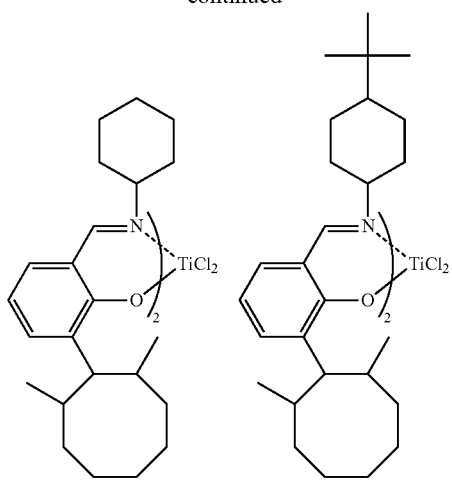
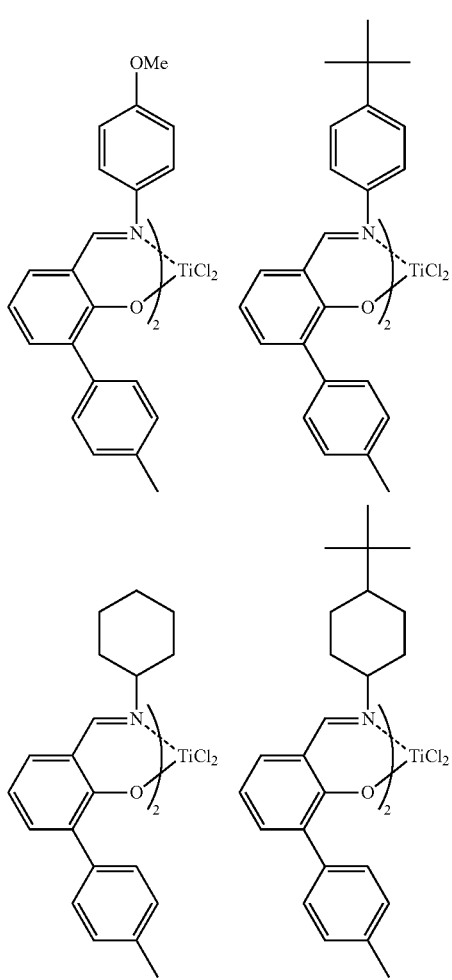
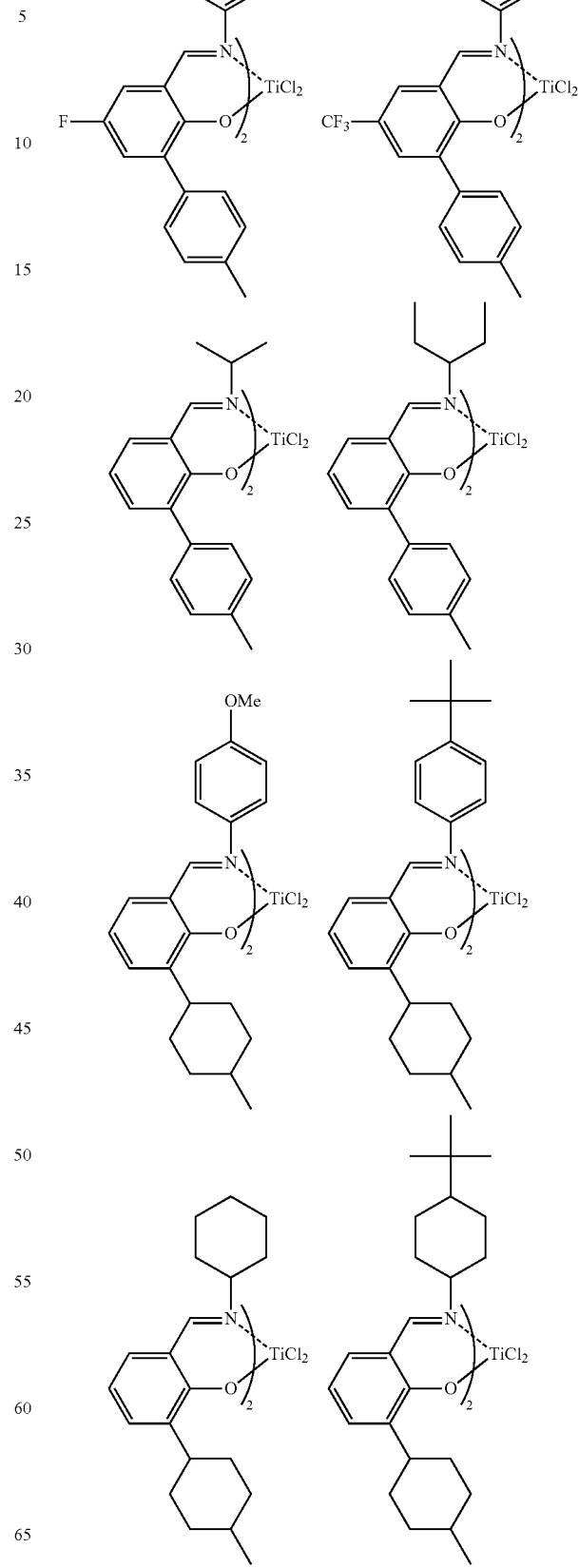
[Chem. 28]

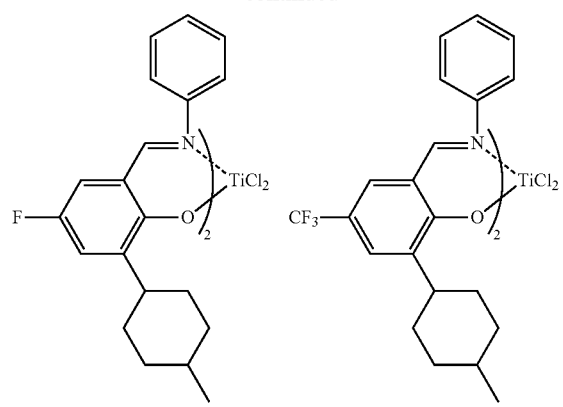
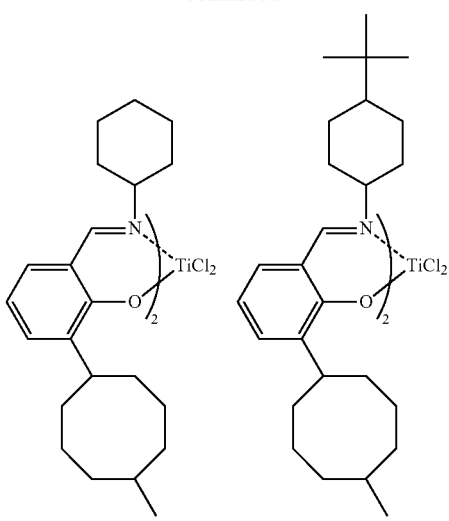
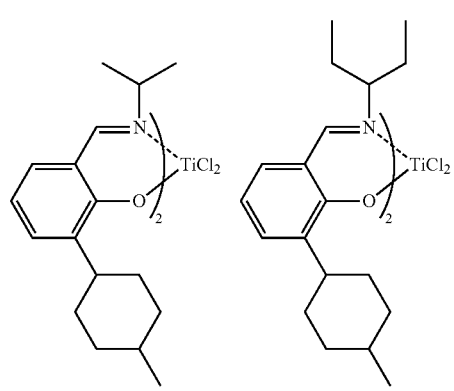
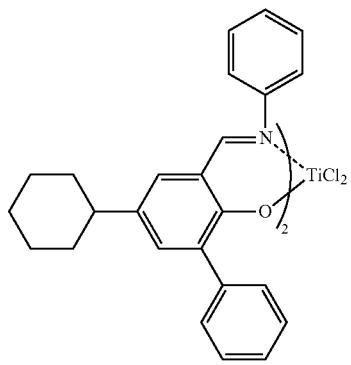
[Chem. 29]
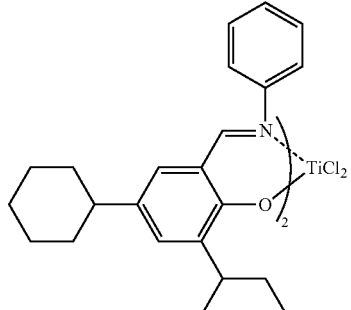
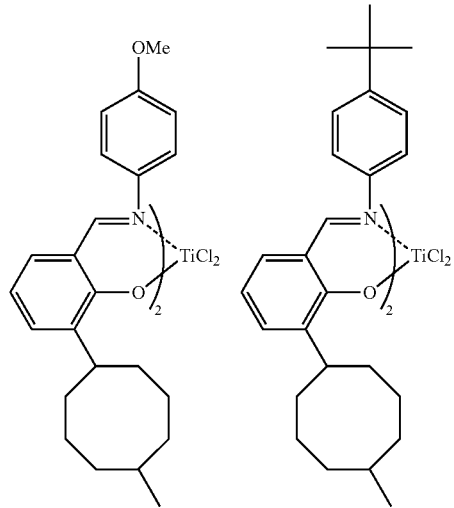

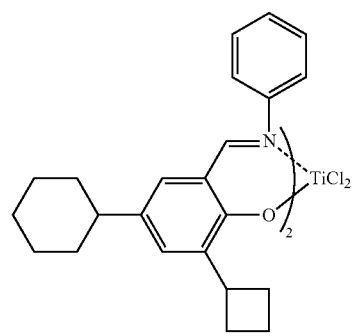
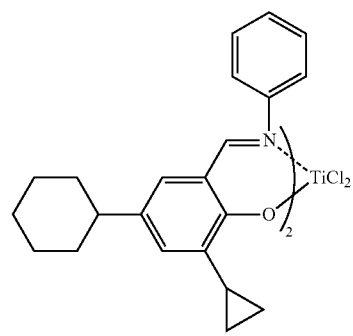
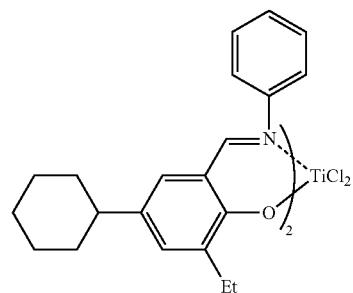
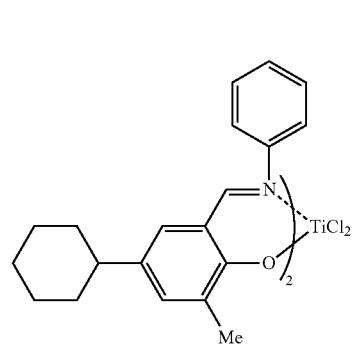
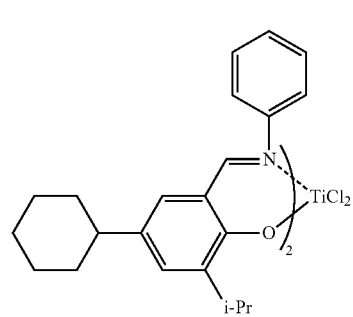
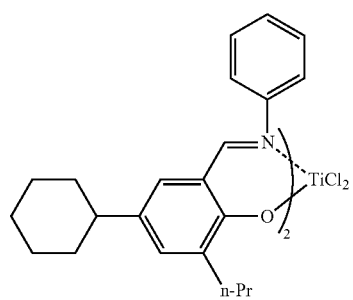
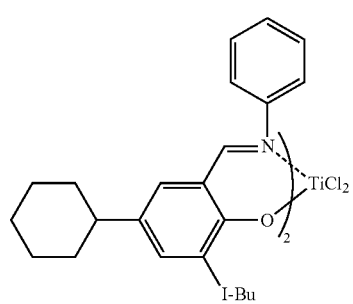
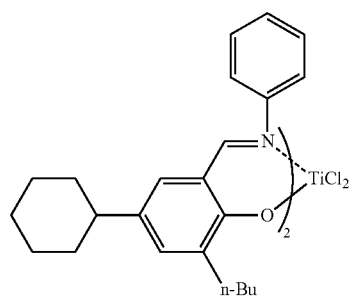
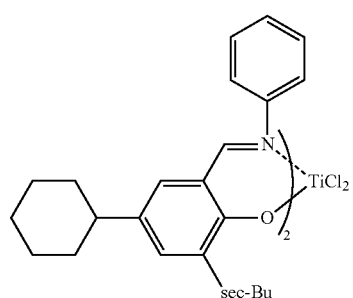
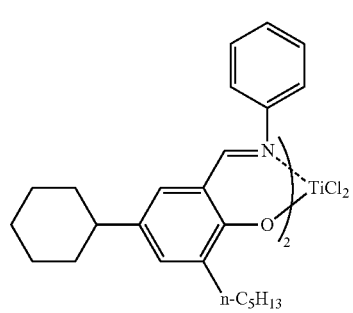

-continued
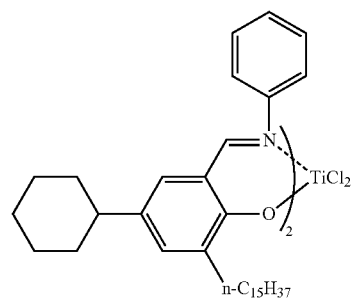
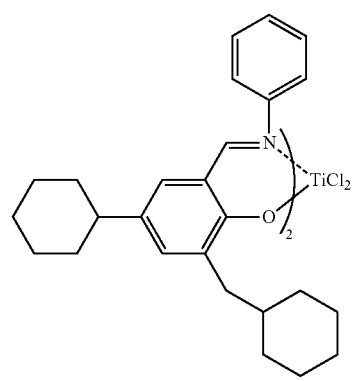
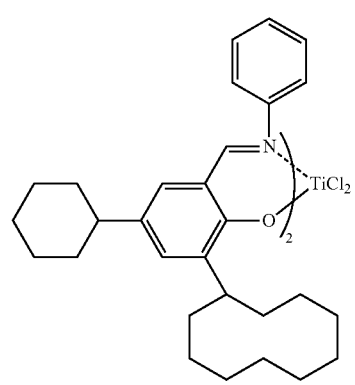
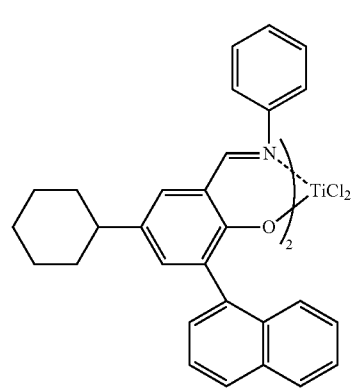
-continued
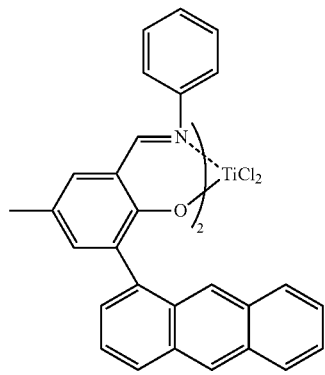
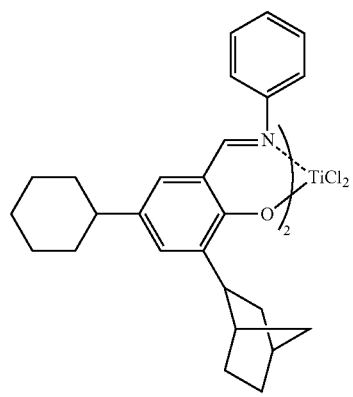
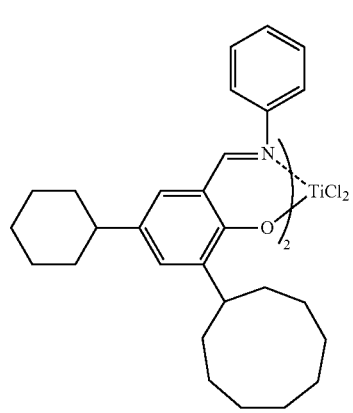
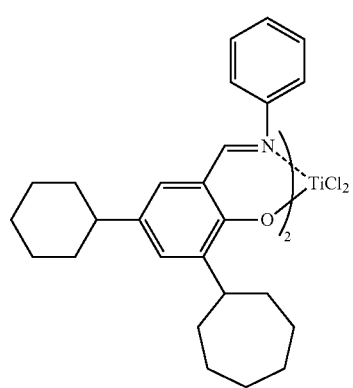

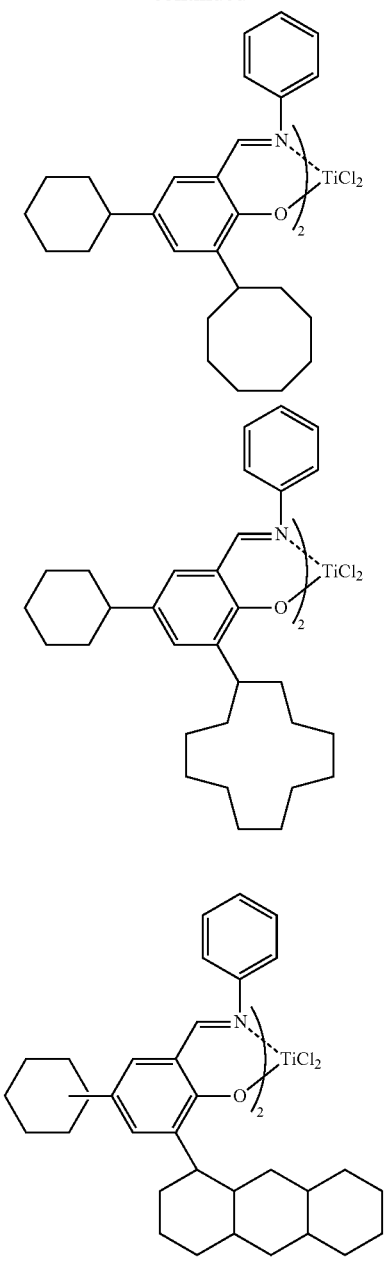
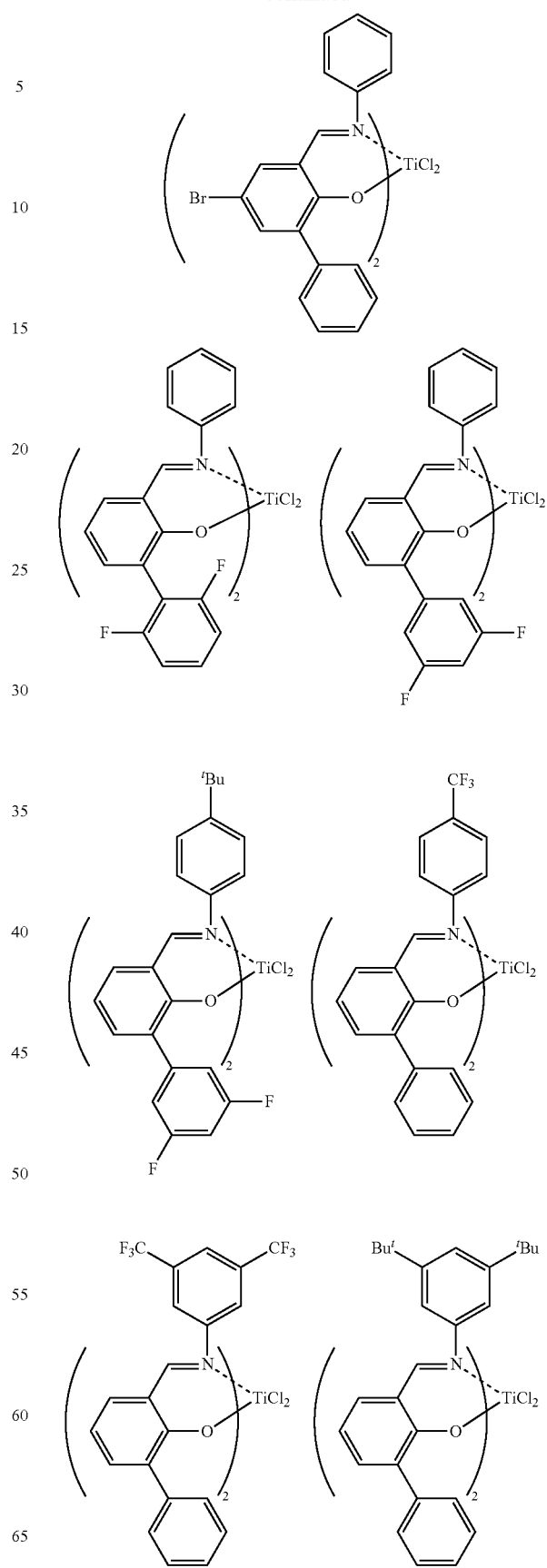
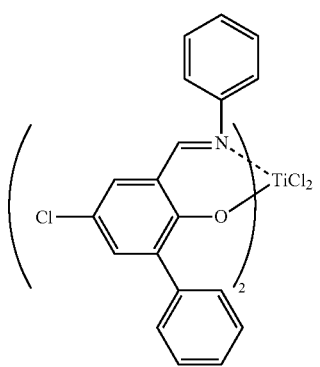
[Chem. 30]
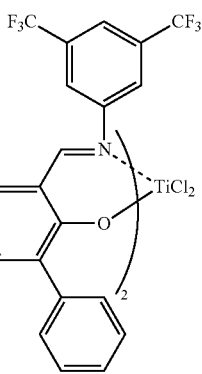
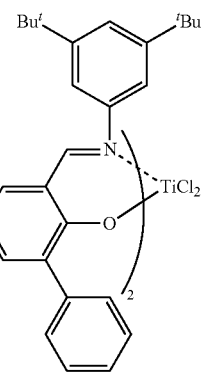

-continued

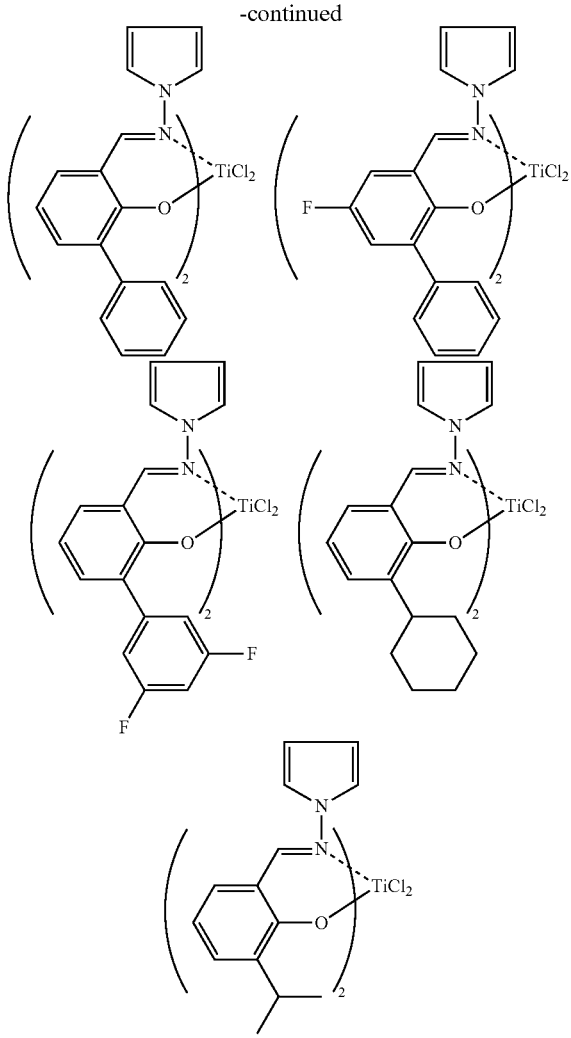

In addition, in the above examples, Me represents a methyl group, Et represents an ethyl group, n-Pr represents an n-propyl group, i-Pr represents an isopropyl group, n-Bu represents an n-butyl group, i-Bu represents an isobutyl group, t-Bu represents a tert-butyl group, an Ph represents a phenyl group.

Methods of producing the above transition metal compound (K) are not particularly limited. For example, the compound can be produced in the following manner.

First, a ligand constituting the transition metal compound (K) can be obtained by reacting salicylaldehyde compounds with primary amine compounds represented by a formula $R^1$—$NH_2$ ($R^1$ has the same definition as described above), for example, alkylamine compounds. Specifically, starting compounds of both compounds are dissolved in a solvent. As the solvent, those generally used for such a reaction can be used, but among these, an alcohol solvent such as methanol or ethanol or a hydrocarbon solvent such as toluene is preferable. Next, the compounds are stirred for about 1 to 48 hours under a reflux condition from room temperature, whereby corresponding ligands are obtained with an excellent yield. For synthesizing ligand compounds, an acidic catalyst such as formic acid, acetic acid, or para-toluene sulfonic acid may be used as a catalyst. Moreover, if molecular sieves, anhydrous magnesium sulfate, or anhydrous sodium sulfate are used as a dehydrating agent, or the reaction is performed while a Dean-Stark apparatus is used for dehydration, the reaction proceeds effectively.

Thereafter, by reacting the ligand obtained in this manner with a compound containing the transition metal M, it is possible to synthesize the corresponding transition metal compound. Specifically, the synthesized ligand is dissolved in a solvent, and brought into contact with a base if necessary to produce a phenoxide salt. Subsequently, the resultant is mixed with a metal compound such as a metal halide or an alkylated metal at a low temperature, and stirred for about 1 to 48 hours at a temperature from −78° C. to room temperature or under a reflux condition. As the solvent, those generally used in such a reaction can be used, and among these, a polar solvent such as ether or tetrahydrofuran (THF), a hydrocarbon solvent such as toluene, or the like is preferably used. Moreover, examples of the base used for producing the phenoxide salt include a lithium salt such as n-butyl lithium, a metal salt such as a sodium salt like sodium hydride, triethylamine, pyridine, and the like, but the present invention is not limited to these.

Further, depending on the properties of the compound, it is possible to synthesize the corresponding transition metal compound by directly reacting the ligand with the metal compound, without producing the phenoxide salt. In addition, it is also possible to exchange the metal M in the synthesized transition metal compound with another transition metal by a common method. Moreover, for example, in the case where one or more of $R_1$ to $R_6$ are hydrogen, it is possible to introduce a substituent other than hydrogen at any stage of synthesis.

In addition, it is also possible to use the reaction solution of the ligand and the metal compound without isolating the transition metal compound.

(Catalyst Component (M))

The catalyst component (M) suitably used together with the transition metal compound (K) described above is at least one kind of compound selected from a group consisting of (m-1) an organic metal compound, (m-2) an organic aluminum oxy compound, and (m-3) a compound forming an ion pair by reacting with the transition metal compound (K).

(m-1) Organic Metal Compound

As the (m-1) organic metal compound suitably used in the present invention, specifically, the following organic metal compounds of groups 1 and 2 and groups 12 and 13 in the periodic table are used.

(m-1a) An Organic Aluminum Compound Represented by General Formula $R^a{}_m Al(OR^b)_n H_p X_q$ (In the general formula, $R^a$ and $R^b$ may be the same as or different from each other and represent a hydrocarbon group having 1 to 15 carbon atoms and preferably having 1 to 4 carbon atoms; X represents a halogen atom; m represents a number satisfying 0<m≤3; n represents a number satisfying 0≤n<3; p represents a number satisfying 0≤p<3; q represents a number satisfying 0≤q<3; and m+n+p+q=3.)

(m-1b) An Alkylated Complex of a Metal of Group 1 of the Periodic Table and Aluminum Represented by General Formula $M^2 Al R^a{}_4$ (In the general formula, $M^2$ represents Li, Na, or K; and $R^a$ represents a hydrocarbon group having 1 to 15 carbon atoms and preferably having 1 to 4 carbon atoms.)

(m-1c) A Dialkyl Compound of a Metal of Group 2 or 12 in the Periodic Table Represented by General Formula $R^a R^b M^3$ (In the general formula, $R^a$ and $R^b$ may be the same as or different from each other and represent a hydrocarbon group having 1 to 15 carbon atoms and preferably having 1 to 4 carbon atoms; and $M^3$ represents Mg, Zn, or Cd.)

Examples of the organic aluminum compound belonging to the (m-1a) include the following compounds.

An Organic Compound Represented by General Formula $R^a{}_m Al(OR^b)_{3-m}$ (In the general formula, $R^a$ and $R^b$ may be the same as or different from each other and represent a hydrocarbon group having 1 to 15 carbon atoms and preferably having 1 to 4 carbon atoms; and m preferably represents a number satisfying $1.5 \le m \le 3$), an organic aluminum compound represented by General Formula $R^a{}_m AlX_{3-m}$ (In the general formula, $R^a$ represents a hydrocarbon group having 1 to 15 carbon atoms and preferably having 1 to 4 carbon atoms; X represents a halogen atom; and m preferably satisfies $0 < m < 3$), an organic aluminum compound represented by General Formula $R^a{}_m AlH_{3-m}$ (In the general formula, $R^a$ represents a hydrocarbon group having 1 to 15 carbon atoms and preferably having 1 to 4 carbon atoms; and m preferably satisfies $2 \le m < 3$), and an organic aluminum compound represented by General Formula $R^a{}_m Al(OR^b)_n X_q$ (In the general formula, $R^a$ and $R^b$ may be the same as or different from each other and represent a hydrocarbon group having 1 to 15 carbon atoms and preferably having 1 to 4 carbon atoms; X represents a halogen atom; m represents a number satisfying $0 < m \le 3$; n represents a number satisfying $0 \le n < 3$; q represents a number satisfying $0 \le q < 3$; and $m+n+q=3$.)

More specific examples of the organic aluminum compound belonging to (m-1a) include tri-n-alkyl aluminum such as trimethyl aluminum, triethyl aluminum, tri-n-butyl aluminum, tripropyl aluminum, tripentyl aluminum, trihexyl aluminum, trioctyl aluminum, or tridecyl aluminum; tri-branched alkyl aluminum such as triisopropyl aluminum, triisobutyl aluminum, tri-sec-butyl aluminum, tri-tert-butyl aluminum, tri-2-methylbutyl aluminum, tri-3-methylbutyl aluminum, tri-2-methylpentyl aluminum, tri-3-methylpentyl aluminum, tri-4-methylpentyl aluminum, tri-2-methylhexyl aluminum, tri-3-methylhexyl aluminum, or tri-2-ethylhexyl aluminum; tricycloalkyl aluminum such as tricyclohexyl aluminum or tricyclooctyl aluminum; triaryl aluminum such as triphenyl aluminum or tritolyl aluminum; dialkyl aluminum hydride such as diisobutyl aluminum hydride; trialkenyl aluminum such as triisoprenyl aluminum represented by $(i\text{-}C_4H_9)_x Al_y (C_5H_{10})_z$ or the like (in the formula, x, y, and z represent a positive number, and $z \le 2x$); alkyl aluminum alkoxide such as isobutyl aluminum methoxide, isobutyl aluminum ethoxide, or isobutyl aluminum isopropoxide; dialkyl aluminum alkoxide such as dimethyl aluminum methoxide, diethyl aluminum ethoxide, or dibutyl aluminum butoxide; alkyl aluminum sesquialkoxide such as ethyl aluminum sesquiethoxide or butyl aluminum sesquibutoxide; alkyl aluminum which has an average composition represented by $R^a{}_{2.5} Al(OR^b)_{0.5}$ or the like and is partially alkoxylated; dialkyl aluminum aryloxide such as diethyl aluminum phenoxide, diethyl aluminum(2,6-di-t-butyl-4-methylphenoxide), ethyl aluminum bis(2,6-di-t-butyl-4-methylphenoxide), diisobutyl aluminum(2,6-di-t-butyl-4-methylphenoxide), or isobutyl aluminum bis(2,6-di-t-butyl-4-methylphenoxide); dialkyl aluminum halide such as dimethyl aluminum chloride, diethyl aluminum chloride, dibutyl aluminum chloride, diethyl aluminum bromide, or diisobutyl aluminum chloride; alkyl aluminum sesquihalide such as ethyl aluminum sesquichloride, butyl aluminum sesquichloride, or ethyl aluminum sesquibromide; partially halogenated alkyl aluminum such as alkyl aluminum dihalide like ethyl aluminum dichloride, propyl aluminum dichloride, or butyl aluminum dibromide; dialkyl aluminum hydride such as diethyl aluminum hydride or dibutyl aluminum hydride; other partially hydrogenated alkyl aluminum such as alkyl aluminum dihydride like ethyl aluminum dihydride or propyl aluminum dihydride; partially alkoxylated and halogenated alkyl aluminum such as ethyl aluminum ethoxychloride, butyl aluminum butoxychloride, or ethyl aluminum ethoxybromide; and the like.

Compounds similar to (m-1a) can also be used, and examples thereof include an organic aluminum compound in which two or more aluminum compounds bind to each other via a nitrogen atom. Specific examples of such a compound include $(C_2H_5)_2 AlN(C_2H_5) Al(C_2H_5)_2$ and the like.

Examples of compounds belonging to the (m-1b) include $LiAl(C_2H_5)_4$, $LiAl(C_7H_{15})_4$, and the like. In addition to these, as the (m-1) organic metal compound, methyl lithium, ethyl lithium, propyl lithium, butyl lithium, methyl magnesium bromide, methyl magnesium chloride, ethyl magnesium bromide, ethyl magnesium chloride, propyl magnesium bromide, propyl magnesium chloride, butyl magnesium bromide, butyl magnesium chloride, dimethyl magnesium, diethyl magnesium, dibutyl magnesium, butyl ethyl magnesium, and the like can also be used.

In addition, compounds that may be formed by the above organic aluminum compound in the polymerization system, for example, a combination of aluminum halide and alkyl lithium or a combination of aluminum halide and alkyl magnesium can also be used.

Among those (m-1) organic metal compounds, an organic aluminum compound is preferable. One kind of the (m-1) organic metal compound described above may be used alone, or two or more kinds thereof may be used in combination.

(m-2) Organic Aluminum Oxy Compound

The (m-2) organic aluminum oxy compound used in the present invention may be aluminoxane known in the related art, or the benzene-insoluble organic aluminum oxy compound that is exemplified in Japanese Unexamined Patent Publication No. 2-78687.

The aluminoxane known in the related art can be produced by, for example, the following methods (1) to (3), and generally obtained as a solution in a hydrocarbon solvent.

(1) A method of adding an organic aluminum compound such as trialkyl aluminum to a compound containing adsorbed water or salts containing crystallization water, for example, a hydrocarbon medium suspension of a magnesium chloride hydrate, a copper sulfate hydrate, an aluminum sulfate hydrate, a nickel sulfate hydrate, a cerous chloride hydrate, and reacting the adsorbed water or the crystallization water with the organic aluminum compound.

(2) A method of causing water, ice, or vapor to directly act on an organic aluminum compound such as trialkyl aluminum, in a medium such as benzene, toluene, ethyl ether, or tetrahydrofuran.

(3) A method of reacting an organic tin oxide such as dimethyl tin oxide or dibutyl tin oxide with an organic aluminum compound such as trialkyl aluminum, in a medium such as decane, benzene, or toluene.

In addition, the aluminoxane may contain a small amount of organic metal component. Moreover, from the collected solution of the aluminoxane, the solvent or the unreacted organic aluminum compound is distilled away and removed, and then the resultant may be dissolved again in a solvent or suspended in a poor solvent of the aluminoxane.

Specific examples of the organic aluminum compound used for preparing the aluminoxane include the same organic aluminum compounds as exemplified as the organic aluminum compound belonging to the (m-1a).

Among these, trialkyl aluminum and tricycloalkyl aluminum are preferable, and trimethyl aluminum and triisobutyl aluminum are particularly preferable.

One kind of the above organic aluminum compound is used alone, or two or more kinds thereof are used in combination.

Examples of the solvent used for preparing the aluminoxane include aromatic hydrocarbons such as benzene, toluene, xylene, cumene, or cymene, aliphatic hydrocarbons such as pentane, hexane, heptane, octane, decane, dodecane, hexadecane, or octadecane; alicyclic hydrocarbons such as cyclopentane, cyclohexane, cyclooctane, or methyl cyclopentane, oil fractions such as gasoline, kerosene, or light oil, halides of the aromatic hydrocarbons, aliphatic hydrocarbons, and alicyclic hydrocarbons described above, and particularly, a hydrocarbon solvent such as a chlorinated substance or a brominated substance. In addition, ethers such as ethyl ether and tetrahydrofuran can also be used. Among these solvents, the aromatic hydrocarbon or the aliphatic hydrocarbon is particularly preferable.

In addition, as the benzene-insoluble organic aluminum oxy compound used in the present invention, a compound in which the proportion of an Al component dissolved in benzene at 60° C. is generally not more than 10% expressed in terms of Al atoms, preferably not more than 5%, and particularly preferably not more than 2% is preferable. That is, a compound that is insoluble or poorly soluble in benzene is preferable.

Examples of the organic aluminum oxy compound used in the present invention include an organic aluminum oxy compound containing boron represented by the following general formula.

[Chem. 31]

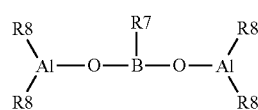

(In the boron compound represented by the above formula, $R^7$ represents a hydrocarbon group having 1 to 10 carbon atoms. $R^8$s may be the same as or different from each other and represent a hydrogen atom, a halogen atom, or a hydrocarbon group having 1 to 10 carbon atoms.)

The organic aluminum oxy compound containing boron represented by the above formula can be prepared by reacting alkyl boronate represented by the following general formula which is

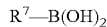

(in the general formula, $R^7$ has the same definition as above) with an organic aluminum compound, in an inert solvent under an inert gas atmosphere, at a temperature ranging from −80° C. to room temperature for 1 minute to 24 hours.

Specific examples of the alkyl boronate represented by the above general formula include methyl boronate, ethyl boronate, isopropyl boronate, n-propyl boronate, n-butyl boronate, isobutyl boronate, n-hexyl boronate, cyclohexyl boronate, phenyl boronate, 3,5-difluoroboronate, heptafluorophenyl boronate, 3,5-bis(trifluoromethyl)phenyl boronate, and the like. Among these, methyl boronate, n-butyl boronate, isobutyl boronate, 3,5-difluorophenyl boronate, and heptafluorophenyl boronate are preferable. One kind of these may be used alone, or two or more kinds thereof may be used in combination.

Specific examples of the organic aluminum compound reacted with the alkyl boronate include the same organic aluminum compounds as exemplified as the organic aluminum compound belonging to the (m-1a).

Among these, trialkyl aluminum and tricycloalkyl aluminum are preferable, and trimethyl aluminum, triethyl aluminum, and triisobutyl aluminum are particularly preferable. One kind of these is used alone, or two or more kinds thereof are used in combination.

One kind of the (m-2) organic aluminum oxy compound described above can be used alone, or two or more kinds thereof can be used in combination.

(m-3) Compound Forming Ion Pair by Reacting with Transition Metal Compound (K)

Examples of the compound (m-3) (hereinafter, called a "ionizing ionic compound") that forms an ion pair by reacting with the transition metal compound (A) used in the present invention include the Lewis acids, ionic compounds, borane compounds, carborane compounds, and the like disclosed in Japanese Unexamined Patent Publication Nos. 1-501950, 1-502036, 3-179005, 3-179006, 3-207703, and 3-207704, U.S. Pat. No. 5,321,106, and the like. The examples also include heteropoly compounds and isopoly compounds.

Specific examples of the Lewis acid include compounds represented by $BR^3$ (R represents a phenyl group or fluorine that may have a substituent such as fluorine, a methyl group, or a trifluoromethyl group). Examples thereof include trifluoroboron, triphenyl boron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, tris(3,5-dimethylphenyl)boron, and the like.

Examples of the ionic compound include the compounds represented by the following General Formula (XI).

[Chem. 32]

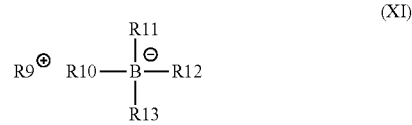

In Formula (XI), R9+ represents $H^+$ or a cation, and R10 to R13 may be the same as or different from each other and represent an organic group and preferably represent an aryl group or a substituted aryl group. Examples of the cation include a carbonium cation, an oxonium cation, an ammonium cation, a phosphonium cation, a cycloheptyl trienyl cation, a ferrocenium cation having a transition metal, and the like.

Specific examples of the carbonium cation include tri-substituted carbonium cations such as a triphenyl carbonium cation, a tri(methylphenyl)carbonium cation, and a tri(dimethylphenyl)carbonium cation.

Specific examples of the ammonium cation include trialkyl ammonium cations such as a trimethyl ammonium cation, a triethyl ammonium cation, a tripropyl ammonium cation, a tributyl ammonium cation, and a tri(n-butyl)ammonium cation; N,N-dialkylanilinium cations such as an N,N-dimethylanilinium cation, an N,N-diethylanilinium cation, and an N,N-2,4,6-pentamethylanilinium cation; dialkyl ammonium cations such as a di(isopropyl)ammonium cation and a dicyclohexyl ammonium cation; and the like.

Specific examples of the phosphonium cation include triaryl phosphonium cations such as a triphenyl phosphonium cation, a tri(methylphenyl)phosphonium cation, and a tri(dimethylphenyl)phosphonium cation.

As R9+, a carbonium cation, an ammonium cation, and the like are preferable, and a triphenyl carbonium cation, an N,N-dimethylanilinium cation, and an N,N-diethylanilinium cation are particularly preferable.

In addition, examples of the ionic compound include a trialkyl substituted ammonium salt, an N,N-dialkylanilinium salt, a dialkyl ammonium salt, a triaryl phosphonium salt and the like.

Specific examples of the trialkyl substituted ammonium salt include triethyl ammonium tetra(phenyl)boron, tripropyl ammonium tetra(phenyl)boron, tri(n-butyl)ammonium tetra(phenyl)boron, trimethyl ammonium tetra(p-tolyl)boron, trimethyl ammonium tetra(o-tolyl)boron, tri(n-butyl)ammonium tetra(pentafluorophenyl)boron, tripropyl ammonium tetra(o,p-dimethylphenyl)boron, tri(n-butyl)ammonium tetra(m,m-dimethylphenyl)boron, tri(n-butyl)ammonium tetra(p-trifluoromethylphenyl)boron, tri(n-butyl)ammonium tetra(3,5-ditrifluoromethylphenyl)boron, tri(n-butyl)ammonium tetra(o-tolyl)boron, and the like.

Specific examples of the N,N-dialkylanilinium salt include N,N-dimethylanilinium tetra(phenyl)boron, N,N-diethylanilinium tetra(phenyl)boron, N,N-2,4,6-pentamethylanilinium tetra(phenyl)boron, and the like.

Specific examples of the dialkyl ammonium salt include di(1-propyl)ammonium tetra(pentafluorophenyl)boron, dicyclohexyl ammonium tetra(phenyl)boron, and the like.

In addition, examples of the ionic compound also include triphenyl carbenium tetrakis(pentafluorophenyl)borate, N,N-dimethylanilinium tetrakis(pentafluorophenyl)borate, ferrocenium tetra(pentafluorophenyl)borate, a triphenyl carbenium pentaphenyl cyclopentadienyl complex, an N,N-diethylanilinium pentaphenyl cyclopentadienyl complex, a boron compound represented by the following Formula (XII) or (XIII), and the like.

[Chem. 33]

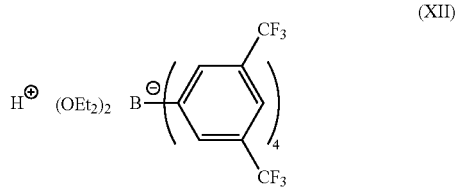

(XII)

(In General Formula (XII), Et represents an ethyl group.)

[Chem. 34]

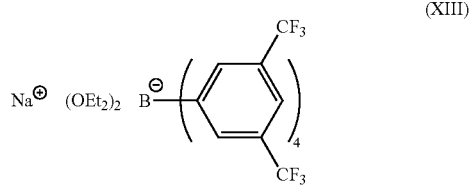

(XIII)

(In General Formula (XIII), Et represents an ethyl group.)

Specific examples of the borane compound include decaborane; salts of anions such as bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorododecaborate, and bis[tri(n-butyl)ammonium] dodecachlorododecaborate; salts of metal borane anions such as tri(n-butyl)ammonium bis(dodecahydridedodecaborate) cobaltate (III) and bis[tri(n-butyl)ammonium]bis(dodecahydridedodecaborate) nickelate (III); and the like.

Examples of the carborane compound include salts of anions such as 4-carbanonaborane, 1,3-dicarbanonaborane, 6,9-dicarbadecaborane,dodecahydride-1-phenyl-1,3-dicarbanonaborane, dodecahydride-1-methyl-1,3-dicarbanonaborane, undecahydride-1,3-dimethyl-1,3-dicarbanonaborane, 7,8-dicarbaundecaborane, 2,7-dicarbaundecaborane, undecahydride-7,8-dimethyl-7,8-dicarbaundecaborane, dodecahydride-11-methyl-2,7-dicarbaundecaborane, tri(n-butyl)ammonium 1-carbadecaborate, tri(n-butyl)ammonium 1-carbaundecaborate, tri(n-butyl)ammonium 1-carbadodecaborate, tri(n-butyl)ammonium 1-trimethylsilyl-1-carbadecaborate, tri(n-butyl)ammoniumbromo-1-carbadodecaborate, tri(n-butyl)ammonium 6-carbadecaborate, tri(n-butyl)ammonium 6-carbadecaborate, tri(n-butyl)ammonium 7-carbaundecaborate, tri(n-butyl)ammonium 7,8-dicarbaundecaborate, tri(n-butyl)ammonium 2,9-dicarbaundecaborate, tri(n-butyl)ammonium dodecahydride-8-methyl-7,9-dicarbaundecaborate, tri(n-butyl)ammonium undecahydride-8-ethyl-7,9-dicarbaundecaborate, tri(n-butyl)ammonium undecahydride-8-butyl-7,9-dicarbaundecaborate, tri(n-butyl)ammonium undecahydride-8-allyl-7,9-dicarbaundecaborate, tri(n-butyl)ammonium undecahydride-9-trimethylsilyl-7,8-dicarbaundecaborate, and tri(n-butyl)ammonium undecahydride-4,6-dibromo-7-carbaundecaborate; salts of metal carborane anions such as tri(n-butyl)ammonium bis(nonahydride-1,3-dicarbanonaborate)cobaltate (III), tri(n-butyl)ammonium bis(undecahydride-7,8-dicarbaundecaborate) ferrate (III), tri(n-butyl)ammonium bis(undecahydride-7,8-dicarbaundecaborate)cobaltate (III), tri(n-butyl) ammonium bis(undecahydride-7,8-dicarbaundecaborate) nickelate (III), tri(n-butyl)ammonium bis(undecahydride-7,8-dicarbaundecaborate) cuprate (III), tri(n-butyl)ammonium bis(undecahydride-7,8-dicarbaundecaborate)aurate (III), tri(n-butyl)ammonium bis(nonahydride-7,8-dimethyl-7,8-dicarbaundecaborate)ferrate (III), tri(n-butyl)ammonium bis(nonahydride-7,8-dimethyl-7,8-dicarbaundecaborate) chromate (III), tri(n-butyl)ammonium bis(tribromooctahydride-7,8-dicarbaundecaborate)cobaltate (III), tris[tri(n-butyl)ammonium]bis(undecahydride-7-carbaundecaborate) chromate (III), bis[tri(n-butyl)ammonium]bis(undecahydride-7-carbaundecaborate) manganate (IV), bis[tri(n-butyl) ammonium]bis(undecahydride-7-carbaundecaborate)cobaltate (III), and bis[tri(n-butyl)ammonium]bis(undecahydride-7-carbaundecaborate) nickelate (IV); and the like.

The heteropoly compound consists of an atom selected from silicon, phosphorus, titanium, germanium, arsenic, and tin and one or two or more kinds of atoms selected from vanadium, niobium, molybdenum, and tungsten. Specifically, phosphorus vanadate, germanovanadate, arsenic vanadate, phosphorus niobate, germanoniobate, silicon molybdate, phosphorus molybdate, titanium molybdate, germanomolybdate, arsenic molybdate, tin molybdate, phosphorus tungstate, germanotungstate, tin tungstate, phosphorus molybdovanadate, phosphorus tungstovanadate, germanotungstovanadate, phosphorus molybdotungstovanadate, germanomolybdotungstovanadate, phosphorus molybdotungstate, phosphorus molybdoniobate, and salts of these acids, for example, metals of group 1 or 2 in the periodic table, specifically, salts with lithium, sodium, potassium, rubidium, cesium, beryllium, magnesium, calcium, strontium, barium, and the like, organic salts with a triphenyl ethyl salt, can be used, but the present invention is not limited to these.

The (m-3) compound (ionizing ionic compound) forming an ion pair by reacting with the transition metal compound (K) described above is used alone as a single kind thereof, or used as a combination of two or more kinds thereof.

In the present invention, in the case where the transition metal compound (K) is used as a catalyst component, this compound is used concurrently with the organic aluminum oxy compound (m-2) such as methyl aluminoxane as a co-catalyst component, whereby an extremely high degree of polymerization activity is exhibited with respect to the olefin compound.

In addition, as the catalyst for polymerizing olefin according to the present invention, if necessary, a support (N) described later can also be used together with the above transition metal compound (K) and at least one kind of the compound (M) selected from the (m-1) organic metal compound, the (m-2) organic aluminum oxy compound, and the (m-3) compound (ionizing ionic compound) forming an ion pair by reacting with the transition metal compound (K).

(Support (N))

The support (N) usable in the present invention is an inorganic or organic compound and a granule-like or fine particle-like solid.

Among these, as the inorganic compound, porous oxides, inorganic chlorides, clay, clay minerals, and ion-exchangeable layered compounds are preferable.

As the porous oxide, $SiO_2$, $Al_2O_3$, MgO, ZrO, $TiO_2$, $B_2O_3$, CaO, ZnO, BaO, $ThO_2$, and a complex or mixture containing these are used specifically. For example, natural or synthesized zeolite, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO, and the like can be used. Among these, those containing $SiO_2$ and/or $Al_2O_3$ as a main component are preferable. In addition, the above inorganic oxide may contain a small amount of carbonate, sulfate, nitrate, and oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and $Li_2O$.

Such porous oxides have different properties depending on the type and the production process thereof. However, a particle size of the support preferably used in the present invention is 10 μm to 300 μm and desirably 20 μm to 200 μm, a specific surface area thereof ranges from 50 $m^2$/g to 1000 $m^2$/g and desirably ranges from 100 $m^2$/g to 700 $m^2$/g, and a pore volume thereof desirably ranges from 0.3 $cm^3$/g to 3.0 $cm^3$/g. If necessary, such a support is used by being fired at 100° C. to 1000° C. and preferably at 150° C. to 700° C.

As the inorganic chloride, $MgCl_2$, $MgBr_2$, $MnCl_2$, $MnBr_2$, and the like are used. The inorganic chloride may be used as is, or used after being pulverized by a ball mill or a vibrating mill. In addition, it is also possible to use substances that are obtained by dissolving the inorganic chloride in a solvent such as alcohol and then precipitating the resultant as a fine particle-like substance by using a precipitation agent.

The clay used in the present invention is generally constituted with clay mineral as a main component. In addition, the ion-exchangeable layered compound used in the present invention is a compound having a crystalline structure in which planes constituted with an ionic bond or the like are stacked on each other in parallel by a weak binding force, and ions contained in this compound are exchangeable. Most of the clay minerals are the ion-exchangeable layered compound. Moreover, the clay, clay mineral, and ion-exchangeable layered compound are not limited to natural products, and artificially synthesized products can also be used.

Further, examples of the clay, clay mineral, and ion-exchangeable layered compound include clay, clay minerals, ionic crystalline compounds having a layered crystalline structure such as a hexagonal close packing type, an antimony type, a $CdCl_2$ type, and a $CdI_2$ type, and the like.

Examples of those clay and clay mineral include kaolin, bentonite, Kibushi clay, gairome clay, allophane, hisingerite, pyrophyllite, mica groups, a montmorillonite groups, vermiculite, a chlorite group, palygorskite, kaolinite, nacrite, dickite, halloysite, and the like. Examples of the ion-exchangeable layered compound include crystalline acidic salts of polyvalent metals such as α-Zr$(HAsO_4)_2$.$H_2O$, α-Zr$(HPO_4)_2$, α-Zr$(KOP_4)_2$.3$H_2O$, α-Ti$(HPO_4)_2$, α-Ti$(HAsO_4)_2$.$H_2O$, α-Sn$(HPO_4)_2$.$H_2O$, gamma-Zr$(HPO_4)_2$, gamma-Ti$(HPO_4)_2$, and gamma-Ti$(NH_4PO_4)_2$.$H_2O$.

The volume of pores with a radius of 20 Å or greater of the clay, clay mineral, and ion-exchangeable layered compound, which is measured by a mercury intrusion technique, is preferably 0.1 cc/g or more, and particularly preferably 0.3 cc/g to 5 cc/g. Herein, the pore volume is measured by a mercury intrusion technique using a mercury porosimeter within the range of a pore radius of 20 Å to 30000 Å.

In the case where a material having a volume of pores with a radius of 20 Å or greater of smaller than 0.1 cc/g is used as a support, a high degree of polymerization activity tends not to be easily obtained.

It is preferable to perform chemical treatment on the clay and clay mineral used in the present invention. As the chemical treatment, any of surface treatment for removing impurities attached onto the surface and treatment exerting influence on the crystalline structure of the clay can be used. Examples of the chemical treatment specifically include acid treatment, alkali treatment, treatment using bases, treatment using organic materials, and the like. By the acid treatment, not only the impurities on the surface are removed, but also the surface area increases since cations such as Al, Fe, and Mg in the crystalline structure are eluted. In the alkali treatment, the crystalline structure of the clay is destroyed, so the structure of the clay is changed. In addition, in the treatment using bases and the treatment using organic materials, an ion complex, a molecular complex, an organic derivative, and the like are formed, whereby the surface area or interlayer distance can be changed.

The ion-exchangeable layered compound used in the present invention may be a layered compound which is in a state where a gap between layers are enlarged in a manner in which the exchangeable ions between the layers are exchanged with other great and bulky ions by using ion exchangeability. Such bulky ions play a role of a supporter supporting the layered structure, and are generally called a pillar. In addition, introduction of other materials between the layers of the layered compound is called intercalation. Examples of guest compounds to be intercalated include cationic inorganic compounds such as $TiCl_4$ and $ZrCl_4$, metal alkoxides such as Ti$(OR)_4$, Zr$(OR)_4$, PO$(OR)_3$, and B$(OR)_3$ (R represents a hydrocarbon group or the like), metal hydroxide ions such as $[Al_{13}O_4(OH)_{24}]^{7+}$, $[Zr_4(OH)_{14}]^{2+}$, and $[Fe_3O(OCOCH_3)_6]^+$, and the like. These compounds may be used alone, or used in combination of two or more kinds thereof. Moreover, when these compounds are intercalated, polymerized materials obtained by performing hydrolysis on metal alkoxides such as Si$(OR)_4$, Al$(OR)_3$, and Ge$(OR)_4$ (R represents a hydrocarbon group or the like), colloidal inorganic compounds such as $SiO_2$, and the like can also be intercalated together. Moreover, examples of the pillar include oxides that are generated by intercalating the above metal hydroxide ions between layers and then performing heating and dehydration, and the like.

The clay, clay mineral, ion-exchangeable layered compound used in the present invention may be used as they are, or used after undergoing treatment such a ball mill treatment or sieving. In addition, they may be used after water is newly added and adsorbed thereto or after heating and hydrating treatment is performed. Moreover, they may be used alone, or used in combination of two or more kinds thereof.

Among these, the clay and clay mineral are preferable, and montmorillonite, vermiculite, pectolite, taeniolite, and synthetic mica are particularly preferable.

Examples of the organic compound include granule-like or fine particle-like solids of which a particle size ranges from 10 μm to 300 μm. Specific examples thereof include (co)polymers or vinylcyclohexane generated using an olefin having 2 to 14 carbon atoms as a main component, such as ethylene, propylene, 1-butene, 4-methyl-1-pentene, co(polymers) generated using styrene as a main component, and a modified substances of these.

The method of using the respective catalyst components and the order of adding the components during polymerization are arbitrarily selected, but the following methods can be exemplified.
  (1) A method of putting the component (K) alone into a polymerization vessel
  (2) A method of putting the components (K) and (M) into a polymerization vessel in any order
  (3) A method of putting a catalyst component in which the component (K) is supported by a carrier (N) and the component (M) into a polymerization vessel in any order
  (4) A method of putting a catalyst component in which the component (M) is supported by the carrier (N) and the component (K) into a polymerization vessel in any order
  (5) A method of putting a catalyst component in which the components (K) and (M) are supported by the carrier (N) into a polymerization vessel In the respective methods (2) to (5), at least two or more of the respective catalyst components may be brought into contact with each other in advance.

In the respective methods (4) and (5) in which the component (M) is supported by the carrier (N), the component (M) not being supported may be added in any order if necessary. In this case, the components (M) may be the same as or different from each other.

In addition, in the solid catalyst component in which the component (K) is supported by the component (N), and in the solid catalyst component in which the components (K) and (M) are supported by the component (N), an olefin may be polymerized in advance. Alternatively, another catalyst component may be supported on the solid catalyst component polymerized in advance.

In the method of producing the copolymer according to the present invention, in the presence of the above catalyst for polymerizing an olefin, one or more kinds of olefins represented by the above General Formula (Ia), the cyclic non-conjugated diene represented by the above General Formula (IIIa), and the cyclic olefin represented by the above General Formula (Va) are subjected to addition polymerization, whereby the cyclic olefin copolymer (P) of the present invention can be obtained. In addition, as raw materials for copolymerization of the cyclic olefin copolymer (P), a cyclic olefin other than the cyclic non-conjugated diene represented by the above General Formulae (VIa) and (VIIa), or the chain-like polyene represented by the above General Formula (VIIIa) can also be used.

In the present invention, polymerization can be performed by either liquid-phase polymerization such as dissolution polymerization and suspension polymerization or gas-phase polymerization. Specific examples of an inert hydrocarbon medium used in the liquid-phase polymerization include aliphatic hydrocarbons such as propane, butane, pentane, hexane, heptanes, octane, decane, dodecane, and kerosene; alicyclic hydrocarbons such as cyclopentane, cyclohexane, and methyl cyclopentane; aromatic hydrocarbons such as benzene, toluene, and xylene; halogenated hydrocarbons such as ethylene chloride, chlorobenzene, and dichloromethane; and mixture of these; and the like. An olefin itself can also be used as a solvent.

When an olefin is polymerized using the above catalyst for polymerizing an olefin, the amount of the component (K) used is generally $10^{-12}$ mol to $10^{-2}$ mol and preferably $10^{-10}$ mol to $10^{-3}$ mol per 1 L of reaction volume.

The component (m-1) is used in such an amount that a molar ratio [(m-1)/Metal] between the component (m-1) and all transition metal atoms (Metal) in the component (K) becomes generally 0.01 to 100000 and preferably 0.05 to 50000. The component (m-2) is used in such an amount that a molar ratio [(m-2)/Metal] between aluminum atoms in the component (m-2) and all transition metals (Metal) in the component (K) becomes generally 10 to 500000 and preferably 20 to 100000. The component (m-3) is used in such an amount that the a molar ratio [(m-3)/Metal] between the component (m-3) and transition metal atoms (Metal) in the component (K) becomes generally 1 to 10 and preferably 1 to 5.

In addition, the polymerization temperature of the olefin using such a catalyst for polymerizing an olefin ranges generally from −50° C. to +200° C. and preferably from 0° C. to 170° C. The polymerization pressure is under conditions such as normal pressure to 100 kg/cm² in general and preferably normal pressure to 50 kg/cm². The polymerization reaction can be performed using any of the methods such as batchwise polymerization, semicontinuous polymerization, and continuous polymerization. In addition, the polymerization can also be performed by being divided into two or more stages differing in the reaction conditions.

The molecular weight of the obtained copolymer can be adjusted by allowing hydrogen to be present in the polymerization system, or by varying the polymerization temperature. Moreover, the molecular weight can also be adjusted by the amount of the component (M). The proportion of the constituent unit derived from the cyclic non-conjugated diene in the copolymer that is obtained using the catalysts described above can be set to 19 mol % to 36 mol % in the total constituent units.

The molecular weight of the copolymer obtained using the catalysts described above can be arbitrarily controlled by selecting components of the above catalysts and selecting the polymerization conditions.

Regarding the molecular weight distribution of the copolymer obtained using the catalysts described above, by selecting components of the catalysts and selecting the polymerization conditions, it is possible to synthesize a polymer showing a narrow molecular weight distribution, such as a polymer having Mw/Mn of not more than 3, preferably not more than 2.7, and more preferably not more than 2.3.

Regarding the glass transition temperature (Tg) of the copolymer obtained using the catalysts described above, by selecting components of the catalysts and selecting the polymerization conditions, it is possible to synthesize a polymer having a high Tg, such as a polymer having a Tg of 70° C. or higher, preferably 100° C. or higher, and more preferably 130° C. or higher.

The cyclic olefin copolymer (P) obtained in the present invention is used for producing the crosslinked polymer (Q) in a state of a varnish dissolved in an organic solvent. In addition, as the varnish, the reaction solution at the time when the cyclic olefin copolymer (P) is obtained can be used as is. Alternatively, the varnish can be prepared by purifying the cyclic olefin copolymer (P) and then separately adding an organic solvent.

[Method of Producing Crosslinked Polymer (Q)]

The crosslinked polymer (modified cyclic olefin copolymer) (Q) of the present invention is obtained by crosslinking the cyclic olefin copolymer (P). The method of crosslinking the cyclic olefin copolymer (P) is not particularly limited, and examples of the method include a method of crosslinking the copolymer while molding the copolymer into any shape or crosslinking the copolymer after molding, by using a radical polymerization initiator or sulfur and electron beams or other types of radiation.

For the crosslinking using a radical polymerization initiator, a crosslinking method using a general radical polymerization initiator that is applied to a polyolefin can be applied as is. That is, a radical polymerization initiator such as dicumyl peroxide is mixed into the cyclic olefin copolymer (P) according to the present invention, followed by heating and crosslinking. Though not particularly limited, the proportion of the radical polymerization initiator mixed in is about 0.02 parts by weight to 20 parts by weight, preferably 0.05 parts by weight to 10 parts by weight, and more preferably 0.5 parts by weight to 10 parts by weight, based on 100 parts by weight of the cyclic olefin copolymer (P). If the proportion of the radical polymerization initiator mixed in exceeds the above range, this is not preferable since the dielectric characteristics of the crosslinked polymer (Q) deteriorate. If the proportion is lower than the range, this is not preferable since the thermal resistance and mechanical characteristics of the crosslinked polymer (Q) deteriorate.

In the present invention, as the radical polymerization initiator, a known thermal radical polymerization initiator, a photo initiator, and a combination of these can be used. When a thermal radical initiator is used among these radical polymerization initiators, in view of storage stability, a half-life temperature for 10 hours thereof is generally 80° C. or higher and preferably 120° C. or higher. Specific examples of such an initiator include dialkyl peroxides such as dicumyl peroxide, t-butylcumyl peroxide, 2,5-bis(t-butylperoxy)2,5-dimethylhexane, 2,5-bis(t-butylperoxy)2,5-dimethylhexyne-3, di-t-butyl peroxide, isopropylcumyl-t-butyl peroxide, and bis(α-t-butylperoxyisopropyl)benzene; peroxyketals such as 1,1-bis(t-butylperoxy)cyclohexane, 1,1-bis(t-butylperoxy)3, 3,5-trimethylcyclohexane, 1,1-bis(t-butylperoxy)cyclododecane, n-butyl-4,4-bis(t-butylperoxy)valerate, ethyl-3,3-bis(t-butylperoxy)butyrate, and 3,3,6,6,9,9-hexamethyl-1,2,4,5-tetraoxycyclononane; peroxyesters such as bis(t-butylperoxy)isophthalate, t-butylperoxybenzoate, and t-butylperoxyacetate; hydroperoxides such as t-butylhydroperoxide, t-hexylhydroperoxide, cumin hydroperoxide, 1,1,3,3-tetramethylbutyl hydroperoxide, diisopropyl benzene hydroperoxide, and p-methanehydroperoxide; bibenzyl compounds such as 2,3-dimethyl-2,3-diphenylbutane; and 3,3,5,7,7-pentamethyl-1,2,4-trioxepane.

Among the radical polymerization initiators, specific examples of the photoradical initiator include benzoin alkyl ether, benzyl dimethyl ketal, 1-hydroxycyclohexyl phenyl ketone, 2-hydroxy-2-methyl-1-phenylpropan-1-one, benzophenone, methyl benzoyl formate, isopropyl thioxanthone, a mixture of two or more kinds of these, and the like. In addition, the photoradical initiator can be used together with a sensitizer. Examples of the sensitizer include carbonyl compounds such as anthraquinone, 1,2-naphthoquinone, 1,4-naphthoquinone, benzanthrone, p,p'-tetramethyldiaminobenzophenone, and chloranil; nitro compounds such as nitrobenzene, p-dinitrobenzene, and 2-nitrofluorene; aromatic hydrocarbons such as anthracene and chrysene; sulfur compounds such as diphenyl disulfide; nitrogen compounds such as nitroaniline, 2-chloro-4-nitroaniline, 5-nitro-2-aminotoluene, and tetracyanoethylene, and the like.

When crosslinking is performed using sulfur or the like, a sulfur-based compound, and, if necessary, a vulcanizing accelerator and a vulcanizing accelerating aid are mixed into the cyclic olefin copolymer (P), followed by heating to cause a crosslinking reaction. The amount of the sulfur-based compound mixed in is not limited. However, in view of causing the crosslinking reaction to proceed efficiently and improving properties of the obtained crosslinked material, and in view of economic efficiency, the sulfur-based compound is used in a range of from 0.1 parts by weight to 10 parts by weight in general, and preferably in a range of from 0.3 parts by weight to 5 parts by weight, based on 100 parts by weight of the cyclic olefin copolymer (P). When the vulcanizing accelerator or the vulcanizing accelerating aid is used concurrently, these are used in a range of from 0.1 parts by weight to 20 parts by weight, and preferably in a range of from 0.2 parts by weight to 10 parts by weight. As the sulfur-based compound used for causing the crosslinking reaction, various known compounds can be used, and examples thereof include sulfur, sulfur monochloride, sulfur dichloride, morpholine disulfide, alkyl phenol disulfide, tetramethyl thiuram disulfide, selenium dimethyldithiocarbamate, and the like. Moreover, as the vulcanizing accelerator, various compounds can be used, and examples thereof include thiazole-based compounds such as N-cyclohexyl-2-benzothiazole-sulfenamide, N-oxydiethylene-2-benzothiazole-sulfenamide, N,N-diisopropyl-2-benzothiazole-sulfenamide, 2-mercaptobenzothiazole, 2-(2,4-dinitrophenyl)mercaptobenzothiazole, 2-(2,6-diethyl-4-morpholinothio)benzothiazole, and benzothiazyl-disulfide; guanidine-based compounds such as diphenyl guanidine, triphenyl guanidine, di-o-tolyl guanidine, o-tolyl biguanidine, and diphenyl guanidine phthalate; acetaldehyde-aniline reaction products; butylaldehyde-aniline condensed product; aldehyde amines such as hexamethylenetetramine and acetaldehyde ammonia; aldehyde-ammonia-based compounds; imidazoline-based compounds such as 2-mercaptoimidazoline; thiourea-based compounds such as thiocarbanilide, diethylthiourea dibutylthiourea, trimethylthiourea, and di-o-tolyl thiourea; thiuram-based compounds such as tetramethylthiuram monosulfide, tetramethylthiuram disulfide, tetraethylthiuram disulfide, tetrabutylthiuram disulfide, and dipentamethylenethiuram tetrasulfide; dithioic acid salt-based compounds such as zinc dimethyldithio carbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, and tellurium diethyldithiocarbamate; xanthate-based compounds such as zinc dibutylxanthate; and the like. Examples of the vulcanizing accelerator include metal oxide-based compounds such as zinc oxide, active zinc oxide, zinc carbonate, complex zinc oxide, magnesium oxide, litharge, red lead, and basic lead carbonate; fatty acid-based compounds such as stearic acid, oleic acid, lauric acid, and lead stearate; organic amine-glycol-based compounds such as triethanolamine and diethylene glycol, and the like.

The temperature for crosslinking the cyclic olefin copolymer (P) of the present invention is generally 100° C. to 300° C., preferably 120° C. to 250° C., and more preferably 120° C. to 200° C., in both the crosslinking using a radical initiator and crosslinking using sulfur. The crosslinking may be performed by varying the temperature stepwise. If the temperature is lower than 100° C., crosslinking does not proceed sufficiently in some cases. In addition, if the temperature exceeds 300° C., this leads to problems that the obtained crosslinked polymer is colored markedly or the required high temperature cannot respond to the existing process in some cases. Moreover, polybutadiene which is a typical double bond-containing polymer cannot be crosslinked under the above conditions in general, and requires a crosslinking condition of a high temperature such as 300° C.

The method of crosslinking by using electron beams or other types of radiation has an advantage that the method is not restricted by the temperature and fluidity at the time of molding. Examples of the radiation include gamma rays, UV, and the like in addition to electron beams.

In any of the method using the radical polymerization initiator or sulfur and the method of performing crosslinking by using radiation, crosslinking can be performed using a crosslinking aid concurrently.

The crosslinking aid is not particularly limited, and specific examples thereof include oximes such as p-quinone dioxime, and p,p'-dibenzoylquinone dioxime; acrylates or methacrylates such as ethylene dimethacrylate, polyethylene glycol dimethacrylate, trimethylolpropane trimethacrylate, cyclohexyl methacrylate, an acrylic acid/zinc oxide mixture, and allyl methacrylate; vinyl monomers such as divinyl benzene, vinyl toluene, and vinyl pyridine; allyl compounds such as hexamethylene diallyl nadimide, diallyl itaconate, diallyl phthalate, diallyl isophthalate, diallyl monoglycidyl isocyanurate, triallyl cyanurate, and triallyl isocyanurate; maleimide compounds such as N,N'-m-phenylenebismaleimide and N,N'-(4,4'-methylenediphenylene)dimaleimide; and cyclic non-conjugated dienes such as vinyl norbornene, ethylidene norbornene, and dicyclopentadiene. These crosslinking aids may be used alone, or used in combination.

If necessary, a thermal stabilizer, a weathering stabilizer, an antistatic agent, a slip agent, an anti-blocking agent, an anti-fog agent, a lubricant, a dye, a pigment, natural oil, synthetic oil, wax, and an organic or inorganic filler can be mixed into the crosslinked polymer (Q) of the present invention, to such a degree that does not impair the object of the present invention. The proportion of these mixed in is set appropriately. Specific examples of a stabilizer mixed in as an optional component include phenol-based antioxidants such as tetrakis[methylene-3(3,5-di-t-butyl-4-hydroxyphenyl)propionate]m ethane, β-(3,5-di-t-butyl-4-hydroxyphenyl) propionate alkyl ester, and 2,2'-oxamidebis[ethyl-3(3,5-di-t-butyl-4-hydroxyphenyl)propionate; fatty acid metal salts such as zinc stearate, calcium stearate, and calcium 12-hydroxystearate; polyol fatty acid esters such as glycerin monostearate, glycerin monolaurate, glycerin distearate, pentaerythritol monostearate, pentaerythritol distearate, and pentaerythritol tristearate; and the like. These may be mixed in alone, or mixed in as a combination. Examples of the combination include a combination of tetrakis[methylene-3(3,5-di-t-butyl-4-hydroxyphenyl)propionate]m ethane with zinc stearate and glycerin monostearate, and the like.

Examples of the organic or inorganic filler include silica, diatomaceous earth, alumina, titanium oxide, magnesium oxide, pumice powder, a pumice balloon, aluminum hydroxide, magnesium hydroxide, basic magnesium carbonate, dolomite, calcium sulfate, potassium titanate, barium sulfate, calcium sulfite, talc, clay, mica, asbestos, glass fiber, glass flake, glass beads, calcium silicate, montmorillonite, bentonite, graphite, aluminum powder, molybdenum sulfide, boron fiber, silicon carbide fiber, polyethylene fiber, polypropylene fiber, polyester fiber, polyamide fiber, and the like.

For mixing the crosslinked polymer (Q) with various additives, it is possible to use a method of melting and blending the cyclic olefin copolymer (P) with various additives by using an extruder and the like, and a solution blending method in which the cyclic olefin copolymer (P) and various additives are dissolved and dispersed in an appropriate solvent, for example, a saturated hydrocarbon such as heptane, hexane, decane, or cyclohexane; and an aromatic hydrocarbon such as toluene, benzene, or xylene.

The crosslinking reaction can be performed by making the cyclic olefin copolymer (P) and a mixture of compounds provided for the crosslinking, such as the above radical polymerization initiator, be in a melted state, or can be performed in a state of a solution in which the mixture is dissolved or dispersed. Alternatively, from the solution state in which the mixture is dissolved in a solvent, the solvent is evaporated to mold the resultant into any shape such as a film and a coating, and then the crosslinking reaction can be further performed.

When the reaction is performed in the melted state, a kneading device such as a mixing roll, a Banbury mixer, an extruder, a kneader, or a continuous mixer is used to melt and knead the mixture of the raw materials so as to cause the reaction. In addition, after the mixture is molded by any method, the crosslinking reaction can be further caused.

As the solvent used in a case of performing the reaction in a solution state, the same solvent as the solvent used in the above solution blending method can be used.

When the crosslinking reaction is performed using electron beams, other types of radiation, or UV, the reaction can be performed after the mixture of raw materials is shaped by any method.

[Crosslinked Polymer (Q)]

The crosslinked polymer (Q) of the present invention that is obtained by the above method is produced by crosslinking the cyclic olefin copolymer containing the repeating unit (B) derived from a cyclic non-conjugated diene in an amount of 19 mol % to 36 mol %. The crosslinked polymer (Q) has extremely excellent dielectric characteristics and shows extremely excellent stability of the dielectric characteristics over time. An initial dielectric tangent (tan $\delta_0$) thereof at 12 GHz is not more than 0.0017 and preferably not more than 0.0015, and a rate of change between tan $\delta_0$ and a dielectric tangent (tan $\delta_t$) measured after 5 hours of an accelerated deterioration test is not more than 50% and preferably not more than 20%.

In addition, in the solid dynamic viscoelasticity measurement performed at a frequency of 1 Hz in a tension mode, a maximum value of a loss tangent (tan $\delta$) thereof at a temperature ranging from 30° C. to 300° C. is not more than 0.6 and preferably not more than 0.45.

In this way, if the maximum value of the loss tangent (tan $\delta$) is in the above range, the crosslink density of the crosslinked polymer (Q) becomes high, and a Coefficient of Thermal Expansion (CTE) thereof becomes low. Accordingly, for example, the crosslinked polymer (Q) exhibits thermal resistance even at a process temperature (step of forming a silicon film: about 200° C. to 250° C.) in producing a thin film solar cell or at a process temperature (soldering step: about 260° C.) in producing a high-frequency circuit, and has excellent dimensional stability as a substrate or a film (including a sheet).

In the solid dynamic viscoelasticity measurement performed under the same conditions as above, a storage elastic modulus (E') is 0.1 GPa or greater, preferably 0.2 GPa or greater, more preferably ranges from 0.25 GPa to 1.0 GPa. Such a crosslinked polymer (Q) exhibits excellent thermal resistance, and is suitable in the field of electronic devices requiring a high degree of thermal resistance.

In addition, in the solid dynamic viscoelasticity measurement performed at a frequency of 1 Hz in a tension mode, if a storage elastic modulus (E') at 260° C. is denoted as A, and a storage elastic modulus (E') at 30° C. is denoted as B, a Formula: A/B≥0.05 is satisfied.

In DSC measurement, a clear glass transition temperature of the crosslinked polymer (Q) of the present invention is not confirmed, but its glass transition temperature is present around a temperature of about 200° C. to 250° C. However, in a molded product formed of the crosslinked polymer (Q) of the present invention, the storage elastic modulus (E') is not lowered even if the temperature exceeds the glass transition temperature. That is, even in a high-temperature range exceeding the glass transition temperature, a high elastic modulus can be maintained, and the thermal resistance is excellent. Therefore, the crosslinked polymer (Q) can be suitably used in the field of electronic devices as above that require a high degree of thermal resistance.

In addition, the crosslinked polymer (Q) of the present invention has excellent vapor barrier properties, and a vapor permeation coefficient thereof measured based on JIS K 7129 at 40° C. and 90% RH is not more than 2 cc·mm/m²·day·atm, and preferably not more than 0.5 cc·mm/m²·day·atm. Accordingly, the crosslinked polymer (Q) can be suitably used as a substrate for a liquid crystal display that is disposed by interposing a liquid crystal material or a transparent electrode therebetween, or a substrate for a solar cell.

As described above, the cyclic olefin copolymer of the present invention contains a repeating unit derived from a predetermined cyclic non-conjugated diene in a predetermined molar amount, so dielectric characteristics of the crosslinked polymer thereof is stable over time. In addition, since solubility of the cyclic olefin copolymer in a solvent is improved, the moldability becomes excellent, and a yield of product further increases. Moreover, the cyclic olefin copolymer can be crosslinked with high density, and a crosslinked polymer having excellent thermal resistance, mechanical characteristics, dielectric characteristics, transparency, and gas barrier properties can be provided.

[Use]

The crosslinked polymer (Q) of the present invention has excellent solvent resistance, thermal resistance, mechanical strength, and transparency. Therefore, a molded body formed of the crosslinked polymer can be utilized for various uses such as optical fiber, an optical waveguide, an optical disk base, an optical filter, a lens, an adhesive for optical uses, an optical film for PDP, a coating material for organic EL, a base film substrate of a solar cell in the aerospace field, a coating material of a solar cell or a thermal control system, an electronic device of a semiconductor device, a light-emitting diode, and various types of memories, and an overcoating material or interlayer insulating material of a hybrid IC, MCM, an electric circuit board for high frequency, or a display device. Particularly, the crosslinked polymer (Q) shows excellent stability of dielectric characteristics over time, and also has excellent thermal resistance, transparency, and mechanical characteristics. Consequently, the crosslinked polymer (Q) can be suitably utilized for uses for high frequency, such as a high-frequency circuit board. In addition, having excellent gas barrier properties, the crosslinked polymer (Q) can be suitably used as a substrate, a film, or a sheet of liquid crystal display or a solar cell.

Hereinafter, the present invention will be described in more detail based on synthesis examples and examples, but the present invention is not limited thereto.

In addition, the composition and limiting viscosity [η] of the cyclic olefin copolymer (P) used in synthesis examples, examples, and comparative examples were measured by the following method.

Composition; ¹H-NMR measurement was performed to calculate the content of the cyclic non-conjugated diene from the strength of a peak derived from hydrogen directly binding to a double-bonded carbon and a peak of other hydrogen.

Limiting viscosity [η]; limiting viscosity was measured in decalin at 135° C.

Dynamic Mechanical Analysis(DMA); dynamic viscoelasticity measurement was measured using RSA-III manufactured by TA-Instruments under nitrogen. Herein, a storage elastic modulus (E') and a loss elastic modulus (E") are terms constituting a complex modulus showing the relationship between stress and strain at the time when sinusoidal vibration strain is applied to a viscoelastic material, and values obtained by measuring tensile viscoelasticity by using RSA-III manufactured by TA-Instruments at a temperature increase rate of 3° C./min, a frequency of 1 Hz, and a strain of 0.1. A glass transition temperature was determined by a top peak of loss tangent (tan δ)=E'/E".

DSC; by using DSC-6220 manufactured by Seiko Instruments Inc., DSC was performed by increasing temperature at 10° C./min in a temperature range of 20° C. to 200° C. under a nitrogen gas flow, then decreasing temperature at 10° C./min in a temperature range of 200° C. to 20° C., and increasing temperature again at 10° C./min in a temperature range of 20° C. to 300° C.

Evaluation of dielectric characteristics (12 GHz); by a method using a cylindrical cavity resonator, a dielectric constant and a dielectric tangent at 12 GHz were measured.

The following raw materials were used for the experiment.

Transition Metal Compound (I)

(synthesized by the method disclosed in Japanese Unexamined Patent Publication No. 2004-331965)

[Chem. 35]

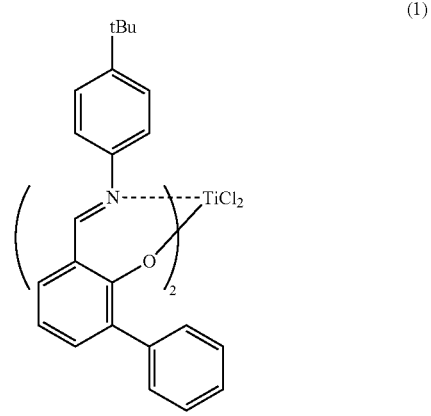

Transition metal compound

Methylaluminoxane (manufactured by Albemarle Corporation: 20% MAO toluene solution)

Cyclohexane (manufactured by Wako Pure Chemical Industries, Ltd.: special grade product of this company)

Toluene (manufactured by Wako Pure Chemical Industries, Ltd.: special grade product of this company)

Xylene (manufactured by Wako Pure Chemical Industries, Ltd.: special grade product of this company)
Dicyclopentadiene (manufactured by KANTO KAGAKU: reagent of first grade purity)
5-Vinyl-2-norbornene (manufactured by TOKYO CHEMICAL INDUSTRY CO., LTD.)
Tetracyclo[4.4.0.1$^{2,5}$.1$^{7,10}$]-3-dodecene (manufactured by Mitsui Chemicals, Inc.)
2,3-Dimethyl-2,3-diphenylbutane (purchased from KANTO KAGAKU.)

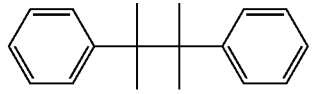

2,3-Dimethyl-2,3-diphenylbutane (DMDPB)

Synthesis Example 1

1500 ml of cyclohexane, 36.5 g of 5-vinyl-2-norbornene (VNB), and 16.3 g of tetracyclo[4.4.0.1$^{2,5}$.1$^{7,10}$]-3-dodecene (TD) were put in a glass autoclave having an internal volume of 2 L that was sufficiently purged with nitrogen, and the liquid phase and gas phase were saturated with ethylene gas at a flow rate of 100 NL/h. Thereafter, methylaluminoxane in an amount of 3 mmol expressed in terms of aluminum atoms and subsequently 0.010 mmol of the transition metal compound (1) were dissolved in 1 ml of toluene and put in the autoclave, and polymerization was started. The reaction was performed for 25 minutes at 25° C. under normal pressure in the ethylene gas atmosphere, and then a small amount of isobutyl alcohol was added thereto to stop polymerization. After polymerization ended, the reaction product was poured into a mixed solvent of 5600 ml of acetone to which 20 mL of concentrated hydrochloric acid was added and 1900 ml of methanol to precipitate a total amount of polymer, followed by stirring, and then the resultant was filtered through filter paper. This operation was repeated until the reaction product was exhausted, the entire polymer thus obtained was dried under reduced pressure at 80° C. for 10 hours, and then 4.6 g of an ethylene/TD/VNB copolymer was obtained. A limiting viscosity [η] thereof was 0.83 (dL/g), and compositional proportions, which were determined by NMR, of a VNB-derived structure and a TD-derived structure in the polymer were 29.2 mol % and 6.2 mol % respectively.

Synthesis examples 2 to 9

By performing polymerization under the conditions shown in Table 1 in the same order as in [Synthesis example 1], polymers were obtained.

TABLE 1

|  | Synthesis example 1 | Synthesis example 2 | Synthesis example 3 | Synthesis example 4 | Synthesis example 5 | Synthesis example 6 | Synthesis example 7 | Synthesis example 8 | Synthesis example 9 |
|---|---|---|---|---|---|---|---|---|---|
| Catalyst (mmol) | 0.010 | 0.020 | 0.015 | 0.016 | 0.006 | 0.015 | 0.0018 | 0.0017 | 0.01 |
| MAO (mmol) | 3.00 | 6.00 | 3.00 | 4.80 | 1.8 | 4.5 | 0.54 | 0.51 | 3 |
| Cyclohexane (ml) | 1500 | 1500 | 1500 | 1500 | 0 | 0 | 0 | 0 | 0 |
| Toluene (ml) | 0 | 0 | 0 | 0 | 1500 | 1500 | 1500 | 1500 | 1500 |
| Ethylene (NL/h) | 100 | 100 | 100 | 100 | 100 | 100 | 100 | 100 | 100 |
| Hydrogen (NL/h) | 3 | 3 | 4 | 3 | 5 | 3 | 6 | 10 | 6 |
| VNB (g) | 36.5 | 15.8 | 0 | 45 | 18 | 58.5 | 0 | 4.2 | 24 |
| DCPD (g) | 0 | 0 | 24 | 0 | 0 | 0 | 17 | 0 | 0 |
| TD (ml) | 16.3 | 15.3 | 0 | 0 | 8 | 18 | 0 | 10.7 | 0 |
| Polymerization time (min) | 25 | 25 | 20 | 30 | 25 | 25 | 5.2 | 25 | 25 |
| Yield (g) | 4.6 | 8.4 | 10.3 | 6.5 | 5.38 | 9.5 | 3.1 | 2.775 | 6.3 |
| VNB (mol %) | 29.2 | 19.8 | 0 | 39.0 | 26.1 | 33.7 | 0 | 10.5 | 30.3 |
| DCPD (mol %) | 0.00 | 0.00 | 36.4 | 0.00 | 0 | 0 | 29.8 | 0 | 0 |
| TD (mol %) | 6.2 | 9.2 | 0 | 0 | 8.8 | 7.8 | 6.1 | 18.1 | 0 |
| [η] (dl/g) | 0.83 | 0.81 | 0.87 | 1.04 | 0.91 | 0.78 | 0.85 | 0.72 | — |

Example 1

4.2 g of the ethylene/TD/VNB copolymer obtained in Synthesis example 1 and 210 mg of 2,3-dimethyl-2,3-diphenylbutane (DMDPB) represented by the above chemical formula were dissolved in 14.7 mL of xylene, thereby obtaining a varnish. The obtained varnish was coated onto a PET film at a gap of 300 μm by using an applicator. Thereafter, the resultant was heated for 60 minutes at 40° C. in a air-blow dryer under a nitrogen flow. Subsequently, the temperature was increased to 140° C. over 30 minutes, and then the resultant was heated for an hour, thereby obtaining a film. The film was peeled from PET and cut into a film having sides of 6 cm. 12 sheets of the film obtained by repeating the same operation as above were stacked on each other, and pressed for 2 minutes under a pressure of 10 MPa and then for 2 hours under a pressure of 10 MPa at 140° C., and further pressed for 2 hours under a pressure of 10 MPa at 240° C. by using Mini Test Press (manufactured by TOYO SEIKI SEISAKY-SHO, LTD., thereby producing a press-molded plate having a thickness of 0.75 mm.

By using the press-molded plate, a dielectric constant ($\in r_0$) and a dielectric tangent (tan $\delta_0$) at 12 GHz were measured, and then the molded plate was stored for 5 hours in an oven heated at 110° C. Thereafter, a dielectric constant ($\in r_t$) and a dielectric tangent (tan $\delta_t$) at 12 GHz were measured again. The results are shown in Table 2.

Examples 2, 5, and 6

Comparative Examples 1 and 2 and 5 to 7

The copolymers obtained in Synthesis examples 2 to 9 were treated according to the conditions shown in Table 2 in the same manner as in Example 1, thereby producing press-molded plates. By using the press-molded plate, a dielectric constant ($\in r_0$) and a dielectric tangent (tan $\delta_0$) at 12 GHz were measured, and then the molded plate was stored for 5 hours in an oven heated at 110° C. Thereafter, a dielectric constant ($\in r_t$) and a dielectric tangent (tan $\delta_t$) at 12 GHz were measured again. The results are shown in Table 2.

Example 3

0.5 g of the ethylene/TD/VNB copolymer obtained in Synthesis example 1 and 25 mg of 2,3-dimethyl-2,3-diphenylbutane (DMDPB) represented by the above chemical formula were dissolved in 1.75 mL of xylene, thereby obtaining a varnish. The obtained varnish was coated onto a PET film at a gap of 300 μm by using an applicator. Thereafter, the resultant was heated for 60 minutes at 40° C. in a air-blow dryer under a nitrogen flow. Subsequently, the temperature was increased to 140° C. over 30 minutes, and then the resultant was heated for an hour, thereby obtaining a film. The film was peeled from PET and cut into two sheets of films of 3 cm×6 cm. The obtained films were stacked on each other, and the resultant was subjected to heat press for 2 minutes under a pressure of 10 MPa at 140° C., for 2 hours under a pressure of 10 MPa at 220° C., and for 2 hours under a pressure of 10 MPa at 240° C. by using a Mini Test Press (manufactured by TOYO SEIKI SEISAKY-SHO, LTD., thereby obtaining a press film having a thickness of 0.09 mm.

By using the press film, dynamic viscoelasticity measurement and DSC measurement were performed. The results are shown in Table 3.

Examples 4 and 7 to 8

Comparative Examples 3 and 4 and 8 to 10

The respective copolymers obtained in Synthesis examples 2 to 9 were crosslinked under the conditions shown in Table 3 in the same order as in Example 3, thereby obtaining a film.

TABLE 2

| | Polymer | | Solvent | | Radical initiator | | Curing temperature | Initial dielectric characteristics | | Dielectric characteristics after thermal treatment | | Rate of change in tan $\delta$ |
|---|---|---|---|---|---|---|---|---|---|---|---|---|
| | Type | g | Type | ml | Type | mg | (° C.) | $\in r_0$ | tan $\delta_0$ | $\in r_t$ | tan $\delta_t$ | % |
| Example 1 | Synthesis example 1 | 4.2 | Xylene | 14.7 | DMDPB | 210 | 140° C. 2 min→220° C. 2 h→240° C. 2 h | 2.4 | 0.0013 | 2.4 | 0.0015 | 15 |
| Example 2 | Synthesis example 2 | 4.2 | Xylene | 14.7 | DMDPB | 210 | 140° C. 2 min→220° C. 2 h→240° C. 2 h | 2.4 | 0.0008 | 2.4 | 0.0009 | 13 |
| Example 5 | Synthesis example 5 | 4.2 | Xylene | 14.7 | DMDPB | 210 | 140° C. 2 min→220° C. 2 h→240° C. 2 h | 2.4 | 0.0012 | 2.4 | 0.0014 | 17 |
| Example 6 | Synthesis example 6 | 4.2 | Xylene | 14.7 | DMDPB | 210 | 140° C. 2 min→220° C. 2 h→240° C. 2 h | 2.4 | 0.0014 | 2.4 | 0.0016 | 14 |
| Comparative Example 1 | Synthesis example 3 | 4.2 | Xylene | 14.7 | DMDPB | 210 | 140° C. 2 min→280° C. 2 h | 2.4 | 0.0008 | 2.5 | 0.0017 | 113 |
| Comparative Example 2 | Synthesis example 4 | 4.2 | Xylene | 14.7 | DMDPB | 210 | 140° C. 2 min→220° C. 2 h→240° C. 2 h | 2.4 | 0.0018 | 2.4 | 0.0021 | 17 |
| Comparative Example 5 | Synthesis example 7 | 4.2 | Xylene | 14.7 | DMDPB | 210 | 140° C. 2 min→280° C. 2 h | 2.4 | 0.0009 | 2.4 | 0.0016 | 78 |
| Comparative Example 6 | Synthesis example 8 | 4.2 | Xylene | 14.7 | DMDPB | 210 | 140° C. 2 min→220° C. 2 h-240° C. 2 h | 2.4 | 0.0009 | 2.4 | 0.0009 | 0 |
| Comparative Example 7 | Synthesis example 9 | 4.2 | Xylene | 14.7 | DMDPB | 210 | Solvent-insoluble, not determinable | | | | | |

The obtained film was subjected to solid dynamic viscoelasticity measurement and DSC measurement. The results are shown in Table 3.

[In the General Formula (I), $R^{300}$ represents a hydrogen atom or a linear or branched hydrocarbon group having 1 to 29 carbon atoms.]

TABLE 3

| | Polymer | | Solvent | | Radical initiator | | Curing temperature | E'@ 30° C. | E'@ 260° C. | E'@ 260° C./E' | Tg (° C.) by | Tg (° C.) by | Maximum value of |
|---|---|---|---|---|---|---|---|---|---|---|---|---|---|
| | Type | g | Type | ml | Type | mg | (° C.) | (GPa) | (GPa) | @30° C. | DSC | DMA | tan δ |
| Example 3 | Synthesis example 1 | 0.5 | Xylene | 1.75 | DMDPB | 25 | 140° C. 2 min →220° C. 2 h→240° C. 2 h | 2.3 | 0.55 | 0.24 | n.d. | 196 | 0.15 |
| Example 4 | Synthesis example 2 | 0.5 | Xylene | 1.75 | DMDPB | 25 | 140° C. 2 min →220° C. 2 h→240° C. 2 h | 2.3 | 0.15 | 0.07 | n.d. | 195 | 0.24 |
| Example 7 | Synthesis example 5 | 0.5 | Xylene | 1.75 | DMDPB | 25 | 140° C. 2 min →220° C. 2 h→240° C. 2 h | 2.3 | 0.36 | 0.16 | n.d. | 188 | 0.15 |
| Example 8 | Synthesis example 6 | 0.5 | Xylene | 1.75 | DMDPB | 25 | 140° C. 2 min →220° C. 2 h→240° C. 2 h | 2.5 | 0.39 | 0.16 | n.d. | 182 | 0.10 |
| Comparative Example 3 | Synthesis example 3 | 0.5 | Xylene | 1.75 | DMDPB | 25 | 140° C. 2 min →280° C. 2 h | 2.6 | 0.22 | 0.08 | n.d. | 211 | 0.14 |
| Comparative Example 4 | Synthesis example 4 | 0.5 | Xylene | 1.75 | DMDPB | 25 | 140° C. 2 min →220° C. 2 h→240° C. 2 h | 2.2 | 0.73 | 0.33 | n.d. | 165 | 0.10 |
| Comparative Example 8 | Synthesis example 7 | 0.5 | Xylene | 1.75 | DMDPB | 25 | 140° C. 2 min →280° C. 2 h | 2.4 | 0.0025 | 0.0010 | 160.2 | 174 | 0.52 |
| Comparative Example 9 | Synthesis example 8 | 0.5 | Xylene | 1.75 | DMDPB | 25 | 140° C. 2 min →220° C. 2 h→240° C. 2 h | 2.7 | 0.022 | 0.0081 | 121.6 | 145 | 0.81 |
| Comparative Example 10 | Synthesis example 9 | 0.5 | Xylene | 1.75 | DMDPB | 25 | Solvent-soluble, not determinable | | | | | | |

From the results of examples, it was confirmed that the cyclic olefin copolymer of the present invention can provide a crosslinked polymer which shows excellent stability of dielectric characteristics over time and excellent thermal resistance and has excellent transparency, mechanical characteristics, and dielectric characteristics. In addition, it was presumed that having excellent stability of dielectric characteristics over time, thermal resistance, transparency, and mechanical characteristics, the crosslinked polymer of the present invention may be suitably utilized for uses for high frequency, such as a high-frequency circuit board.

The present invention can also include the following embodiments

[a1] A cyclic olefin copolymer including (A) a repeating unit derived from one or more kinds of olefins represented by General Formula (I), and (B) a repeating unit derived from a cyclic non-conjugated diene represented by the following General Formula (III), wherein when a total mole number of the repeating units is regarded as 100 mol %, the (B) repeating unit derived from a cyclic non-conjugated diene is contained in an amount of 19 mol % to 36 mol %.

[Chem. 37]

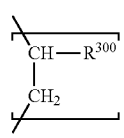

(I)

[Chem. 38]

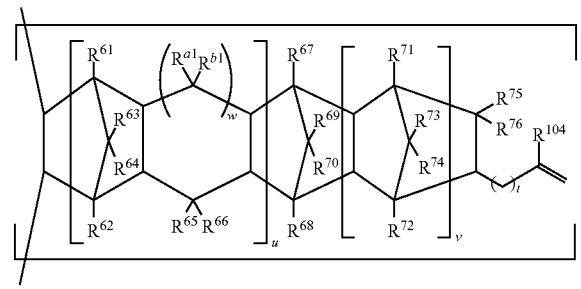

(III)

[In General Formula (III), u represents 0 or 1; v represents 0 or a positive integer; w represents 0 or 1; $R^{61}$ to $R^{76}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; $R^{104}$ represents a hydrogen atom or an alkyl group having 1 to 10 carbon atoms; t represents a positive integer of 0 to 10; and $R^{75}$ and $R^{76}$ may form a monocyclic or polycyclic ring by binding to each other.]

[a2] The cyclic olefin copolymer according to embodiment [a1], wherein the cyclic non-conjugated diene constituting the (B) repeating unit derived from a cyclic non-conjugated diene is 5-vinyl-2-norbornene or 8-vinyl-9-methyltetracyclo[4.4.0.1$^{2,5}$.1$^{7,10}$]-3-dodecene.

[a3] The cyclic olefin copolymer according to embodiment [a1], wherein the cyclic non-conjugated diene constituting the (B) repeating unit derived from a cyclic non-conjugated diene is 5-vinyl-2-norbornene.

[a4] The cyclic olefin copolymer according to any one of embodiments [a1] to [a3], further including a repeating unit derived from one or more kinds of cyclic olefins represented by General Formula (V).

[Chem. 39]

(V)

[In General Formula (V), u represents 0 or 1; v represents 0 or a positive integer; w represents 0 or 1; $R^{61}$ to $R^{78}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; and $R^{75}$ to $R^{78}$ may form a monocyclic or polycyclic ring by binding to each other. Herein, when both u and V represent 0, at least one of $R^{67}$ to $R^{70}$ and $R^{75}$ to $R^{78}$ is a substituent other than a hydrogen atom.]

[a5] The cyclic olefin copolymer according to embodiment [a4], wherein the cyclic olefin constituting the repeating unit derived from the cyclic olefin is tetracyclo[4.4.0.1$^{2,5}$.1$^{7,10}$]-3-dodecene.

[a6] A method of producing a cyclic olefin copolymer, including performing addition polymerization of a monomer containing one or more kinds of olefins represented by the following General Formula (Ia) and a cyclic non-conjugated diene represented by the following General Formula (IIIa), in the presence of a catalyst including a transition metal compound (K) represented by the following General Formula (IX) and at least one kind of compound (M) selected from a group consisting of an organic metal compound (m-1), an organic aluminum oxy compound (m-2), and a compound (m-3) forming an ion pair by reacting with the transition metal compound (K).

[Chem. 40]

(IX)

[In General Formula (IX), M represents a transition metal of groups 3 to 11. m represents an integer of 1 to 4; $R_1$ to $R_6$ may be the same as or different from each other and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, and two or more of these may form a ring by being linked to each other. In addition, in the case where m is 2 or greater, one group among $R_1$ to $R_6$ contained in one ligand may be linked to one group among $R_1$ to $R_6$ contained in another ligand (wherein, $R_1$s do not bind to each other). $R_1$s, $R_2$s, $R_3$s, $R_4$s, $R_5$s, and $R_6$s may be the same as or different from each other; n represents a number satisfying the valency of M; X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. in the case where n is 2 or greater, plural groups represented by X may be the same as or different from each other, or plural groups represented by X may form a ring by binding to each other.]

[Chem. 41]

(Ia)

$$CH-R^{300}$$
$$\|$$
$$CH_2$$

[In the General Formula (Ia), $R^{300}$ represents a hydrogen atom or a linear or branched hydrocarbon group having 1 to 29 carbon atoms.]

[Chem. 42]

(IIIa)

[In General Formula (IIIa), u represents 0 or 1; v represents 0 or a positive integer; w represents 0 or 1; $R^{61}$ to $R^{76}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; $R^{104}$ represents a hydrogen atom or an alkyl group having 1 to 10 carbon atoms; t represents a positive integer of 0 to 10; and $R^{75}$ and $R^{76}$ may form a monocyclic or polycyclic ring by binding to each other.]

[a7] The method of producing a cyclic olefin copolymer (P) according to embodiment [a6], wherein the monomer contains a cyclic olefin represented by General Formula (Va), and the olefin and the cyclic non-conjugated diene are subjected to addition polymerization together with the cyclic olefin.

[Chem. 43]

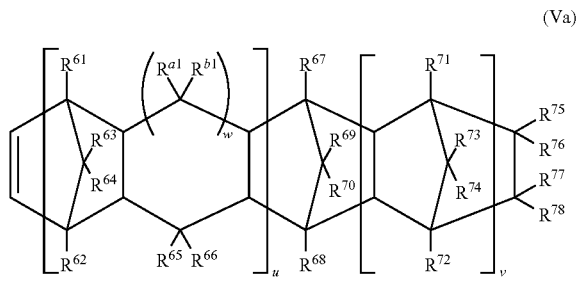

(Va)

[In General Formula (Va), u represents 0 or 1; v represents 0 or a positive integer; w represents 0 or 1; $R^{61}$ to $R^{78}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; and $R^{75}$ to $R^{78}$ may form a monocyclic or polycyclic ring by binding to each other.]

[a8] A varnish containing the cyclic olefin copolymer according to any one of embodiments [a1] to [a5] and an organic solvent.

[a9] A crosslinked polymer obtained by crosslinking the cyclic olefin copolymer according to any one of embodiments [a1] to [a5].

[a10] The crosslinked polymer according to embodiment [a9] produced by heating the cyclic olefin copolymer according to any one of embodiments [a1] to [a5] in the presence of a radical polymerization initiator.

[a11] The crosslinked polymer according to embodiment [a10], wherein the radical polymerization initiator is bibenzyl compounds.

[a12] The crosslinked polymer according to any one of embodiments [a8] to [a12] that has a maximum value of a loss tangent (tan δ) in a temperature range of 30° C. to 300° C. of not more than 0.6 which is measured by solid dynamic viscoelasticity measurement performed at a frequency of 1 Hz in a tension mode.

[a13] The crosslinked polymer according to any one of embodiments [a8] to [a12] that has a storage elastic modulus (E') of 0.1 GPa or greater which is measured by solid dynamic viscoelasticity measurement performed at a frequency of 1 Hz in a tension mode at 260° C.

[a14] The crosslinked polymer according to any one of embodiments [a8] to [a13] that satisfies a formula: A/B≥0.05 when a storage elastic modulus (E') at 260° C. is denoted as A and a storage elastic modulus (E') at 30° C. is denoted as B in solid dynamic viscoelasticity measurement performed at a frequency of 1 Hz in a tension mode.

[a15] A molded product containing the crosslinked polymer according to any one of embodiments [a9] to [a14].

[a16] The molded product according to embodiment [a15] that is a film or a sheet.

[a17] The molded product according to embodiment [a14] that is a high-frequency circuit board.

[a18] The molded product according to embodiment [a14] that is a substrate for liquid crystal display.

The present application claims priority based on Japanese Patent Application No. 2010-226926 filed Oct. 6, 2010, the entire content of which is incorporated herein.

The invention claimed is:

1. A crosslinked polymer obtained by crosslinking a radical polymerization initiator and a cyclic olefin copolymer having a crosslinkable group, comprising:

(A) a repeating unit derived from one or more kinds of olefins represented by the following General Formula (I);

(B) a repeating unit derived from a cyclic non-conjugated diene represented by the following General Formula (III); and (C) a repeating unit derived from one or more kinds of cyclic olefins represented by the following General Formula (V), wherein when a total mole number of the repeating units is regarded as 100 mol %, the (B) repeating unit derived from a cyclic non-conjugated diene is contained in an amount of 19 mol % to 36 mol %,

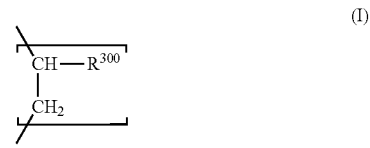

(I)

in the General Formula (I), $R^{300}$ represents a hydrogen atom or a linear or branched hydrocarbon group having 1 to 29 carbon atoms,

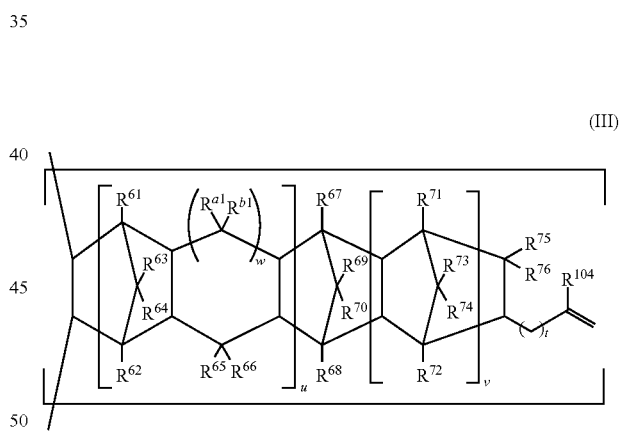

(III)

in General Formula (III), u represents 0 or 1; v represents 0 or a positive integer; w represents 0 or 1; $R^{61}$ to $R^{76}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; $R^{104}$ represents a hydrogen atom or an alkyl group having 1 to 10 carbon atoms; t represents a positive integer of 0 to 10; and $R^{75}$ and $R^{76}$ may form a monocyclic or polycyclic ring by binding to each other,

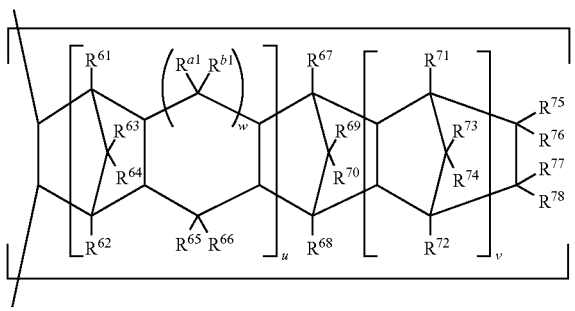

(V)

in General Formula (V), u represents 0 or 1; v represents 0 or a positive integer; w represents 0 or 1; $R^{61}$ to $R^{78}$ as well as $R^{a1}$ and $R^{b1}$ may be the same as or different from each other and represent a hydrogen atom, a halogen atom, an alkyl group having 1 to 20 carbon atoms, an alkyl halide group having 1 to 20 carbon atoms, a cycloalkyl group having 3 to 15 carbon atoms, or an aromatic hydrocarbon group having 6 to 20 carbon atoms; and $R^{75}$ to $R^{78}$ may form a monocyclic or polycyclic ring by binding to each other wherein when both u and v represent 0, at least one of $R^{67}$ to $R^{70}$ and $R^{75}$ to $R^{78}$ is a substituent other than a hydrogen atom, wherein the crosslinked polymer has a maximum value of a loss tangent (tan δ) in a temperature range of 30° C. to 300° C. of not more than 0.6 which is measured by solid dynamic viscoelasticity measurement performed at a frequency of 1 Hz in a tension mode, the crosslinked polymer satisfies a formula: A/B≥0.05 when a storage elastic modulus (E') at 260° C. is denoted as A and a storage elastic modulus (E') at 30° C. is denoted as B in solid dynamic viscoelasticity measurement performed at a frequency of 1 Hz in a tension mode, and the proportion of the radical polymerization initiator mixed in is equal to or more than 0.02 parts by weight and equal to or less than 20 parts by weight, based on 100 parts by weight of the cyclic olefin copolymer.

2. The crosslinked polymer according to claim 1, wherein the cyclic non-conjugated diene constituting the (B) repeating unit derived from a cyclic non-conjugated diene is 5-vinyl-2-norbornene or 8-vinyl-9-methyltetracyclo[4.4.0.1$^{2,5}$.1$^{7,10}$]-3-dodecene.

3. The crosslinked polymer according to claim 1, wherein the cyclic non-conjugated diene constituting the (B) repeating unit derived from a cyclic non-conjugated diene is 5-vinyl-2-norbornene.

4. The crosslinked polymer according to claim 1, wherein the cyclic olefin constituting the (C) repeating unit derived from a cyclic olefin is bicyclo[2.2.1]-2-heptene or tetracyclo[[4.4.0.1$^{2,5}$.1$^{7,10}$]-3-dodecene.

5. The crosslinked polymer according to claim 1, wherein the cyclic olefin constituting the (C) repeating unit derived from a cyclic olefin is tetracyclo[4.4.0.1$^{2,5}$.1$^{7,10}$]-3-dodecene.

6. The crosslinked polymer according to claim 1, wherein the cyclic non-conjugated diene constituting the (B) repeating unit derived from a cyclic non-conjugated diene is 5-vinyl-2-norbornene, and the cyclic olefin constituting the (C) repeating unit derived from a cyclic olefin is tetracyclo[4.4.0.1$^{2,5}$1$^{7,10}$]-3-dodecene.

7. A varnish comprising:
the crosslinked polymer of claim 1, and
an organic solvent.

8. The crosslinked polymer according to claim 1, produced by heating the cyclic olefin copolymer in the presence of a radical polymerization initiator.

9. The crosslinked polymer according to claim 8, wherein the radical polymerization initiator is a bibenzyl compound.

10. The crosslinked polymer according to claim 1 that has a storage elastic modulus (E') of 0.1 GPa or greater which is measured by solid dynamic viscoelasticity measurement performed at a frequency of 1 Hz in a tension mode at 260° C.

11. A molded product containing the crosslinked polymer according to claim 1.

12. The molded product according to claim 11 that is a film or a sheet.

13. The molded product according to claim 11 that is a high-frequency circuit board.

14. The molded product according to claim 11 that is a substrate for a liquid crystal display.

15. The crosslinked polymer according to claim 1, that is a film or a sheet.

16. A high-frequency circuit board comprising the film or sheet according to claim 15.

* * * * *